(12) United States Patent  
Scaife

(10) Patent No.: US 11,548,009 B2
(45) Date of Patent: Jan. 10, 2023

(54) SELECTIVE SHREDDING, SIEVING, AND/OR SEPARATING DEVICE CONNECTED TO A HYGIENIC PRODUCTION OR OPERATING IN AN OFF-LINE LOCATION

(71) Applicant: MOBIAIR PTE LTD., Singapore (SG)

(72) Inventor: Martin Scaife, Singapore (SG)

(73) Assignee: DIAPER RECYCLING TECHNOLOGY PTE. LTD., Singapore (SG)

( * ) Notice: Subject to any disclaimer, the term of this patent is extended or adjusted under 35 U.S.C. 154(b) by 1269 days.

(21) Appl. No.: 14/771,489

(22) PCT Filed: Feb. 28, 2014

(86) PCT No.: PCT/IB2014/000667
§ 371 (c)(1),
(2) Date: Aug. 28, 2015

(87) PCT Pub. No.: WO2014/132128
PCT Pub. Date: Sep. 4, 2014

(65) Prior Publication Data
US 2016/0001296 A1    Jan. 7, 2016

Related U.S. Application Data

(60) Provisional application No. 61/771,008, filed on Feb. 28, 2013.

(51) Int. Cl.
*B02C 13/06* (2006.01)
*B02C 23/14* (2006.01)
*B02C 23/38* (2006.01)
*B02C 13/20* (2006.01)
*B02C 17/00* (2006.01)
*B02C 17/02* (2006.01)
*B02C 13/28* (2006.01)
*B03B 9/06* (2006.01)
(Continued)

(52) U.S. Cl.
CPC .............. *B02C 23/14* (2013.01); *B02C 13/02* (2013.01); *B02C 13/06* (2013.01); *B02C 13/20* (2013.01); *B02C 13/2804* (2013.01); *B02C 17/002* (2013.01); *B02C 17/007* (2013.01); *B02C 17/02* (2013.01); *B02C 18/0084* (2013.01); *B02C 23/38* (2013.01); *B03B 9/061* (2013.01); *B07B 7/08* (2013.01); *B65G 37/00* (2013.01); *B02C 2201/06* (2013.01); *Y02W 30/52* (2015.05)

(58) Field of Classification Search
CPC ......... B02C 23/14; B02C 23/38; B02C 17/02; B02C 17/007; B02C 17/08; B02C 13/02; B02C 13/2804; B02C 13/20; B02C 13/06
USPC ................................ 241/74, 236, 176, 152.1
See application file for complete search history.

(56) References Cited

U.S. PATENT DOCUMENTS 236,497 A * 1/1881 Howland ................ B02C 15/08
241/46.15
2,202,936 A * 6/1940 Williams ................ A47J 42/38
241/276
(Continued)

FOREIGN PATENT DOCUMENTS

CH    676938 A5    3/1991

*Primary Examiner* — Faye Francis
(74) *Attorney, Agent, or Firm* — Jordan IP Law, LLC

(57) ABSTRACT

System having an apparatus (10) for shredding hygiene products (12), which operates within a revolving device (22).

10 Claims, 46 Drawing Sheets

(51) Int. Cl.
*B02C 18/00* (2006.01)
*B02C 13/02* (2006.01)
*B07B 7/08* (2006.01)
*B65G 37/00* (2006.01)

(56) References Cited

U.S. PATENT DOCUMENTS

| | | | | |
|---|---|---|---|---|
| 2,943,800 A * | 7/1960 | Wultsch | ............ | D21D 5/06 241/42 |
| 3,817,463 A * | 6/1974 | Krigbaum | ............ | B02C 18/142 241/152.1 |
| 3,931,935 A * | 1/1976 | Holman | ............ | B02C 17/002 241/24.1 |
| 4,061,278 A * | 12/1977 | Ehinger | ............ | B02C 18/0007 241/222 |
| 4,142,688 A * | 3/1979 | Johnson | ............ | B02C 18/142 241/236 |
| 4,243,183 A | 1/1981 | Eirich et al. | | |
| 4,632,320 A * | 12/1986 | Holz | ............ | D21B 1/32 241/101.8 |
| 5,322,792 A | 6/1994 | Peguy | | |
| 5,361,457 A * | 11/1994 | Gordo | ............ | A01C 1/00 19/41 |
| 5,549,250 A * | 8/1996 | Stricker | ............ | B03B 1/02 241/23 |
| 5,829,692 A * | 11/1998 | Walters | ............ | B02C 13/04 241/62 |
| 5,992,777 A * | 11/1999 | Aagaard | ............ | B02C 18/14 241/236 |
| 6,164,572 A * | 12/2000 | Tudahl | ............ | B02C 4/08 241/152.2 |
| 8,017,021 B1 * | 9/2011 | Staples | ............ | B02C 18/0092 210/773 |
| 8,727,253 B2 * | 5/2014 | Smith | ............ | B02C 4/42 241/152.1 |
| 8,888,029 B2 * | 11/2014 | Black | ............ | B02C 21/007 241/152.1 |
| 2006/0043223 A1 * | 3/2006 | Filgueiras | ............ | B03B 5/00 241/152.1 |
| 2008/0099592 A1 | 5/2008 | Sharp | | |
| 2015/0230482 A1 * | 8/2015 | Kumisaka | ............ | A23B 4/06 426/518 |

* cited by examiner

SELECTIVE SHREDDING, SIEVING, AND/OR SEPARATING DEVICE CONNECTED TO A HYGIENIC PRODUCTION OR OPERATING IN AN OFF-LINE LOCATION

CROSS REFERENCE TO RELATED APPLICATION

This application is related to and claims priority benefits from U.S. Provisional Application No. 61/771,008, filed on Feb. 28, 2013, entitled SELECTIVE SHREDDING, SIEVING, and/or Separating DEVICE ("the '008 application"). The '008 application is hereby incorporated herein in its entirety by this reference.

FIELD OF THE INVENTION

The present invention relates to shredding devices for woven and nonwoven products.

BACKGROUND

It is known to reduce size of various material, in particular waste, such as household waste, in rotary drums, and to separate components of such materials. In CH1676938, a system is described with a rotary drum, a part of which may be perforated, an a rotating element, which, when interacting with radial extension of the drum, shreds the materials. In U.S. Pat. No. 4,243,183 a crushing system is described with a rotary drum rotating at a speed. However both of these systems do not perform at sufficient separation function, require significant space and energy. In US 2012/0085848 a comminution apparatus for processing variety of wastes e.g. green wastes is described, which has comminution drums, both comprising projecting macerating features entering into close proximity during rotation of drums about longitudinal. In U.S. Pat. No. 5,322,792. Converting household waste into fermented and non-fermented products, comprising a grinder having three rotating axles in triangular array with fly-chains having hardened tips. In US2008/0099592, a wood processing apparatus is shown, wherein smaller nieces of debris may be separated out.

A typical shredding device, when used for shredding disposable hygiene products (including but not limited to absorbent articles such as diapers for babies or adults, training pants, pull-up diapers, diaper pants, sanitary napkins, panty liners, etc.), outputs a variety of plastic film and/or nonwoven particles all of varying shapes and sizes. Some particles may measure only a few millimeters across in their shortest dimension, while other particles may measure 15 cm across or more in their longest dimension. When larger particles are produced, there is a risk that, later in the process, these particles fold and/or roll up, and where such folds and/or rolls occur, extracting all of the pulp and/or SAP between the folded layers becomes problematic, which may mean that pulp and/or SAP contained within the fold exits, which would then be included in the plastic stream of a disposable hygiene product recycling process and therefore reduces the purity of the respective plastic stream. Furthermore, considering the scenario where smaller plastic film and/or nonwoven particles are produced, no matter how good the next filtration separation processes are, there is always an enhanced risk that smaller particles may contaminate the pulp output material streams of a disposable hygiene product recycling process, as smaller particles can pass through smaller holes in subsequent sieve/separation processes. FIG. 1 illustrates an example of such small particle contaminants.

Thus, it is desirable to utilize a selective shredding device that is capable of shredding particles into a defined particle size, without the risk of creating particles below a defined size. In such a device, it is desirable for particles that have been reduced to a defined size to pass through the selective shredding process without being shredded further to an undesirable size. Such selective shredding based on particle size may be accomplished by applying a pulling and/or tearing force to the product. By slowly pulling apart the disposable hygiene product, and/or by applying single or multiple tears to a disposable hygiene product using a selective shredding device, the smaller pulp and SAP particles may be released from within the disposable hygiene product. If the selective shredding processing is connected to a sieving process, then the difference in component size of the SAP and pulp being released from the disposable hygiene product as compared to the components of the plastic liner of the disposable hygiene product is significant (the liner typically measures between 200 mm to 600 mm versus pulp fibers, which are just a few mm long), thereby allowing a very efficient sieving process to take place and achieving a higher purity in the subsequent pulp/SAP streams having a reduced level of plastic contamination and, in many cases, no plastic contamination.

SUMMARY

The terms "invention," "the invention," "this invention" and "the present invention" used in this description are intended to refer broadly to all of the subject matter of this description and the claims below. Statements containing these terms should be understood not to limit the subject matter described herein or to limit the meaning or scope of the claims below. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

According to certain embodiments of the present invention, a system comprises an apparatus for shredding hygiene products, which operates within a revolving device. The revolving device may exert between 0.05-0.998 G on an inner surface of the revolving device or between 0.05-0.998 G on any surfaces within the revolving device. In some embodiments, the revolving device is used to transport one or more hygiene products or pieces of hygiene products back into a shredding device, which operates within the revolving device.

In certain embodiments, the shredding device further comprises a fixed or revolving device, wherein the revolving device has a structure comprising a plurality of apertures, wherein a diameter of each aperture ranges from 1 to 1,000,000,000 micron. The apertures may be configured in size and shape to allow pieces or components or subassemblies of the hygiene products to pass through the apertures. The apertures may be configured to allow smaller pieces of the hygiene products, which are initially contained within the revolving device, to exit through the apertures while prohibiting larger pieces of hygiene products from exiting through the apertures, thereby ensuring that the larger pieces of hygiene products remain within the revolving device. In some embodiments, the diameter of the apertures is progressively reduced in relation to a size of particles within a stage of the system. Shredding may become coarser in relation to progressive reduction in the diameter of the apertures.

According to certain embodiments, a rotational axis of the revolving device is positioned in a non-horizontal axis at an angle to a horizontal axis to allow one or more hygiene products or pieces of hygiene products to be transported along the rotational axis of the revolving device. The angle of the revolving device and/or an angle of a shredding device within the revolving device may be adjustable relative to a plane of a floor and may be adjustable to control throughput speeds of the hygiene products or pieces of hygiene products within the revolving device. The angle of the revolving device and/or the angle of the shredding device within the revolving device may be automatically adjustable to control throughput speeds of the hygiene products or pieces of hygiene products within the revolving device. The angle of the revolving device and/or the angle of the shredding device within the revolving device may be automatically adjustable in response to throughput supply requirement information from a hygiene product production process.

In certain embodiments, a system for shredding hygiene products comprises rotating shafts, wherein 1 to 100,000 fingers are attached to two or more opposing rotating shafts that rotate at equal or differential speeds, wherein the fingers are configured to damage the hygiene products without using a shear cut or crimp cut process. In some embodiments, the system is enclosed within a revolving device. The system may be connected directly, or directly via a hygiene product buffer device, to a disposable hygiene production process. A difference in speed between the fingers on the opposing rotating shafts may be directly proportional to a difference in finger numbers between the opposing rotating shafts. In some embodiments, the fingers comprise multiple radii on an outer surface and wherein any one of the multiple radii on any of the fingers ranges from 0.001 micron to 100 mm.

For time periods of less than 50% of a total run time, rotational direction of the rotating shafts may be reversed to remove debris on leading edge of the fingers. In some embodiments, for time periods of less than 50% of a total run time, the rotating shaft with a slower rotation becomes the rotating shaft with a faster rotation and/or the rotating shaft with the faster rotation becomes the rotating shaft with the slower rotation to remove debris on leading edges of the fingers. The rotating shafts may further comprise a cleaning device that moves in along the axis of each rotating shaft to remove the hygiene products or pieces of hygiene products wrapped around the rotating shaft and/or the fingers. The rpm speed of the rotating shafts may increase by more than 1.1 times a typical operational speed for time periods of less than 50% of a total run time.

According to some embodiments, a system for shredding disposable garments comprises between 1 to 10,000 fingers moving backwards and forwards in a linear shredding device, or a linear shredding device with single or multiple radiuses, wherein the fingers do not do not utilize a shear cut or crimp cut process. The system may be enclosed within a revolving device. The system may be connected directly, or directly via a hygiene product buffer device, to a disposable hygiene production process.

Some embodiments comprise a system for shredding hygiene products comprising one or more rotating shafts on which an impeller, or fingers, or objects such as a T hammer, flat hammer, or flying knife, are attached, wherein a number of fingers/hammers/knives ranges between 1 to 10,000. The system may be enclosed within a revolving device. The system may be connected directly, or directly via a hygiene product buffer device, to a disposable hygiene production process.

In some embodiments, materials are thrown from a cylinder into a shredding device comprising the rotating shafts, wherein the rotating shafts are in phase, and the fingers attached to the respective shafts have a mis-matched speed and are phased so that the fingers pass through each other when they are pointing at each other or at an angle of minus 45 degrees and phased at plus 45 degrees to this point.

According to certain embodiments, a system comprises an in-line selective shredding device connected directly to a hygiene product production process. In certain embodiments, a hygiene product buffer device is located between the in-line selective shredding device and the hygiene product production process. In some embodiments, a hygiene product diverting device is located between the hygiene product buffer device and the hygiene product production process. An output material stream comprising agglomerated particles of pulp from the system may be connected to a pelletizer, baler, former, or pyrolysis process. The system may send a signal to a hammer mill pulp in-feed roll drive to change an in-feed speed in relation to an amount of re-claim pulp being re-processed back into a core forming process. In some embodiments, a pulp fiber stream is connected to a volumetric metering device, wherein an output of the volumetric metering device is re-processed back into a core forming process where disposable hygiene products are made. In other embodiments, a pulp fiber stream is connected to a reserve tower. During a normal running mode a percentage of pulp re-feed is similar to a percentage of scrap produced, and wherein during periods of production issues the percentage of pulp re-feed is increased up to 100% and re-applied at lower thread-up speeds.

According to some embodiments, a hygiene product diverting device is configured to receive hygiene products from a hygiene products reject device, which is configured to divert the hygiene products into one or more of a hygiene product buffer device, a transport device connected to the hygiene product buffer device, an inventory device used to store hygiene products for periods longer than 1 second, and a selective storage device capable of storing hygiene products of one or more pre-selected reject faults.

In some embodiments, a hygiene product transport device is connected between a hygiene product reject device and a hygiene product diverting device or between the hygiene product diverting device and a hygiene product buffer device or between the hygiene product buffer device and an in-line recycling system. The hygiene product transport device may transport between 1 and 1,000,000 hygiene products per hour. The hygiene product transport device may comprise 1 or more conveyor systems. The hygiene product transport device may comprise 1 or more conveyor links. In some embodiments, the hygiene product transport device further comprises a vacuum nozzle is configured to transport between 1-10 hygiene products at any given time.

According to certain embodiments of the present invention, an auger comprises a cleaning device positioned in an outer rim of an auger screw and configured to transport plastic parts of a hygiene product with SAP traces, wherein an outer casing of the auger comprises perforations between 1 to 30,000 micron in diameter. In some embodiments, one or more components vibrate with a frequency of between 1 and 10,000 hertz. A vibration device may also be used to separate pulp from SAM/SAP/AGM.

According to some embodiments, a hygiene product buffer device is positioned upstream of an in-line hygiene product recycling process, wherein the hygiene product buffer device is configured to store between 1 to 100,000 hygiene products in single or multiple chambers within the hygiene product buffer device.

The hygiene product buffer device may further comprise a means for moving products through the multiple chambers at different speeds. The hygiene product buffer device may further comprise a time display configured to display a time or a time indication when the hygiene products were produced.

The hygiene product buffer device may further comprise a hatch wherein a single or multiple hygiene products are fed into the hygiene product buffer device or transport streams to and from the hygiene product buffer device, wherein the hatch comprises a barcode reader to track a time of production of the hygiene products and wherein the hatch has a device that restricts access to the hatch. In some embodiments, the hygiene products feed into the hygiene product buffer device feed from more than one location. An electronic device may be configured to determine from which location the hygiene products enter the hygiene product buffer device based on an inventory level of the hygiene product buffer device.

In certain embodiments, a conveyor may be used to transport the hygiene products within the hygiene product buffer device. In other embodiments, a cleat conveyor may be used to transport the hygiene products out of the hygiene product buffer device.

In some embodiments, cyclones having cyclone walls with 1 to 1,000,000 apertures may be used to separate materials, wherein a diameter of each aperture ranges from 1 to 1,000,000,000 microns, wherein the cyclones are in a process that is directly linked to a hygiene product buffer device that is directly linked to the hygiene product production process.

According to certain embodiments, a system compromising a revolving cylinder or drum, wherein a pulp and SAP mixture is fed into the revolving cylinder or drum, wherein between 0 to 1,000,000 apertures exist in the drum ranging from 1 to 1,000,000,000 microns in diameter, wherein the drum stops/starts and/or changes speed to create a higher g-force on the pulp and SAP mixture, causes the SAP to be released and travel out of the drum through the apertures.

According to some embodiments, a system comprises a revolving cylinder into which disposable hygiene products particles are introduced against an electrostatically charged conveyor or roll configured to separate paper components from plastic components.

In certain embodiments of the present invention, a system comprises a revolving cylinder having a diameter between 1 mm-10,000 mm, wherein the revolving cylinder rotates in an axis oriented between +4 degrees to −4 degrees relative to a horizontal axis and between +90 degrees to −90 degrees at a rotational speed, wherein rotation of the revolving cylinder creates a force between 0.0001 and 1 G on an inner surface of the revolving cylinder, wherein an air stream passes through the revolving cylinder between 0.0001 meters per second up to 10,000 meters per second, wherein a stream of SAP and dust particles are passed into the revolving cylinder and the dust particles are removed from the revolving cylinder via the air stream passing through the revolving cylinder.

BRIEF DESCRIPTION OF THE DRAWINGS

In the following detailed description, embodiments of the invention are described referring to the following figures.

Same numerals refer to same or equivalent executions.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
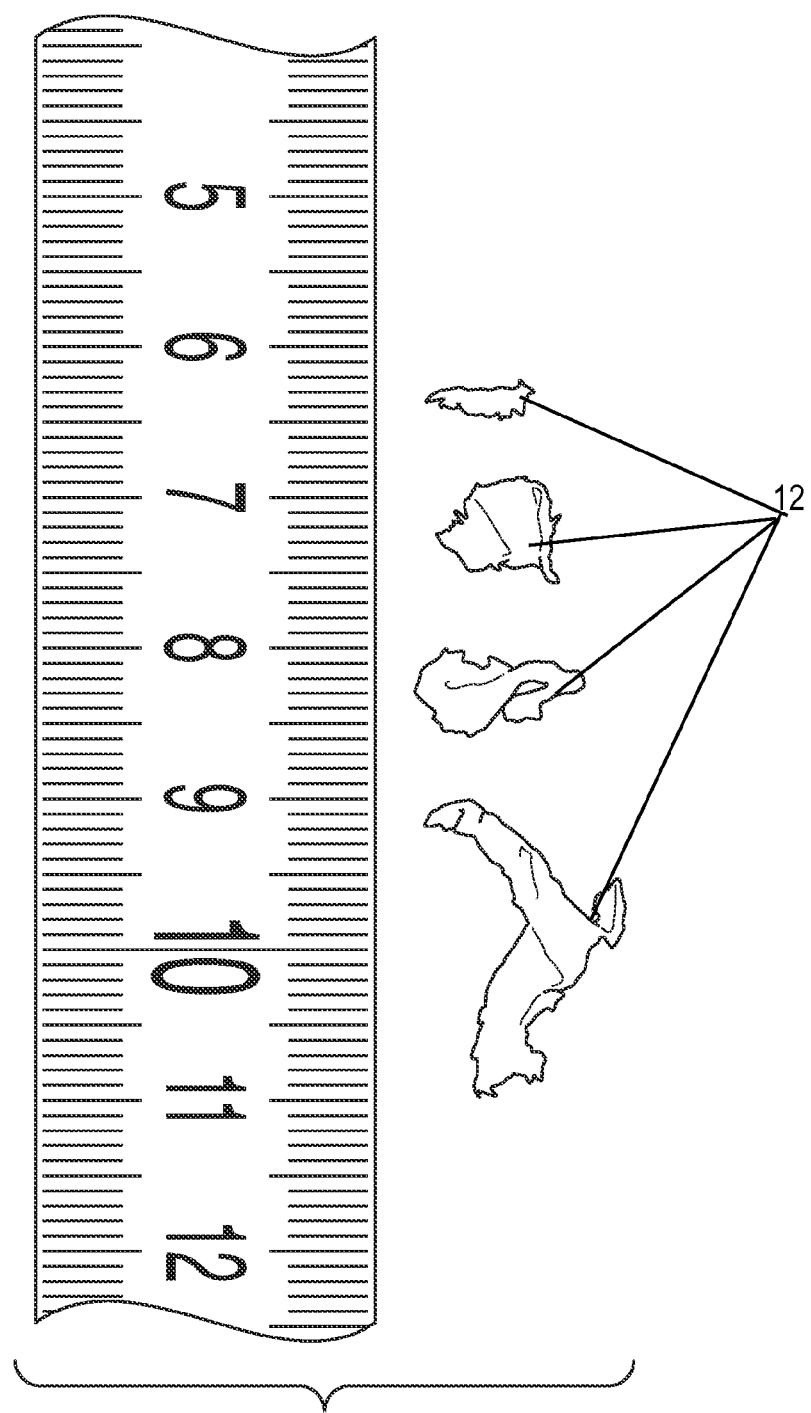
FIG. 1 is an illustrative depiction of small particle contaminants that may be handled by a selective shredding device, according to certain embodiments of the present invention.
Figure 2:
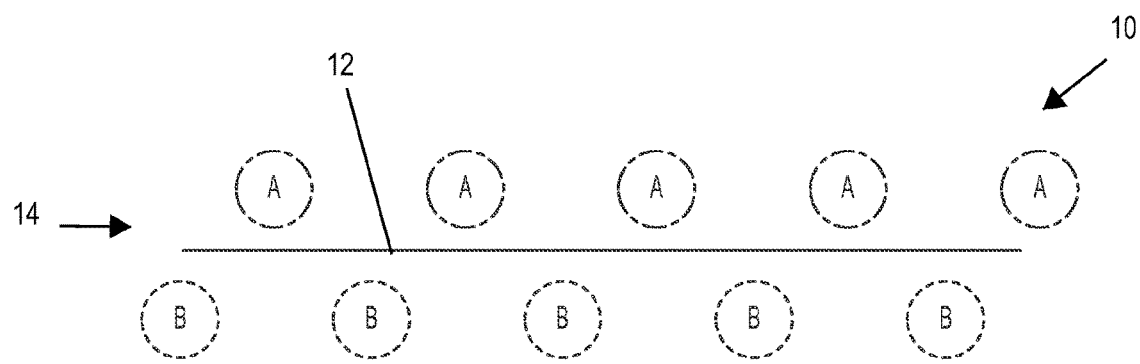
FIG. 2 is a schematic representation of a linear shredding device, according to certain embodiments of the present invention.
Figure 3:
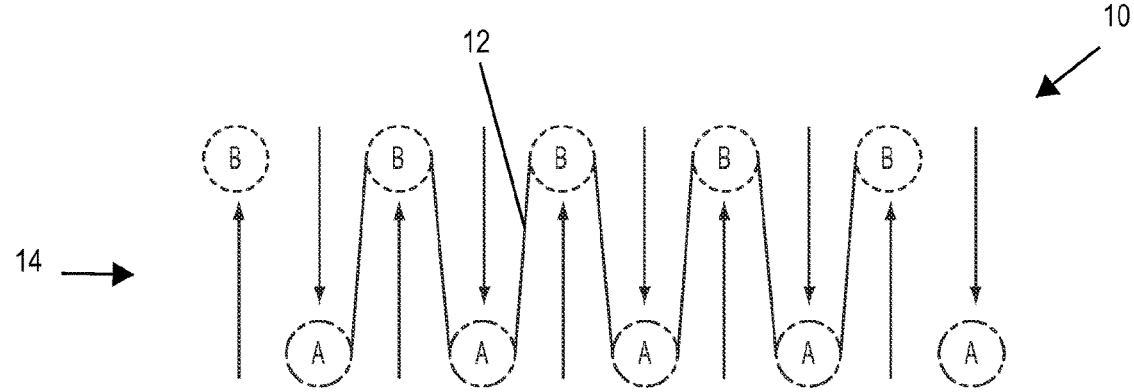
FIG. 3 is a schematic representation of the linear shredding device of FIG. 2, showing the movement of upper and lower rows of fingers against a hygiene product.
Figure 4:
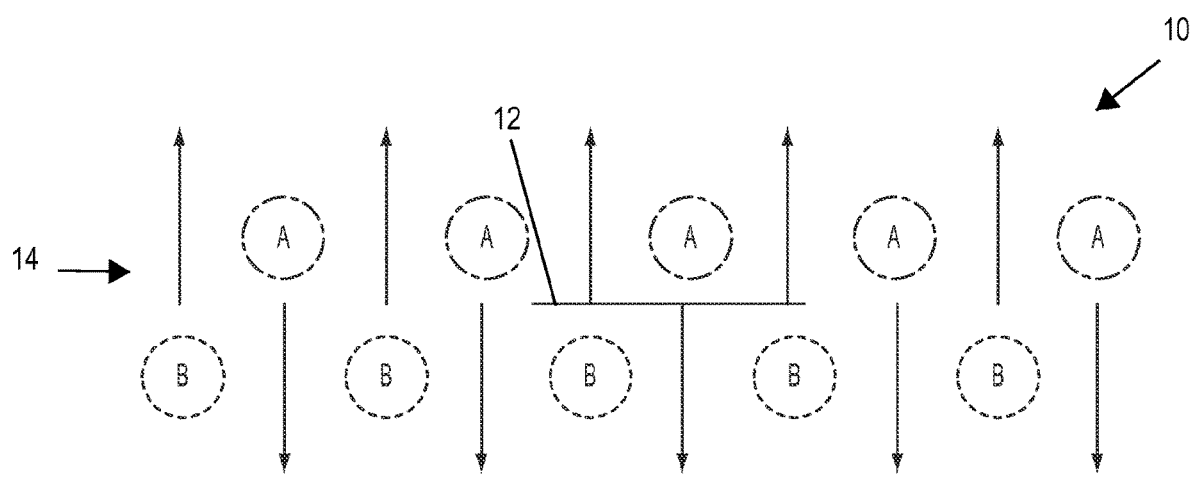
FIG. 4 is a schematic representation of the linear shredding device of FIG. 2, showing the dimensions of a hygiene product or pieces of a hygiene product that are too small to become wrapped around the upper and lower rows of fingers.

FIGS. 2-4 illustrate certain embodiments of a selective shredding device 10 in the form of a linear shredding device 14. As shown in FIG. 2, an upper row of fingers 16 A is positioned above a lower row of fingers 16 B. Each of the upper fingers 16 A are offset from the lower fingers 16 B so that each of the upper fingers 16 A is aligned (or semi-aligned but nevertheless positioned so that fingers 16 A or B do not collide) with the space between each of the lower fingers 16 B and vice versa, thereby allowing the fingers 16 to pass through each other. When a hygiene product 12 is fed into the horizontal space between the upper fingers 16 A and the lower fingers 16 B (as shown in FIG. 2), the lower fingers 16 B move up and the upper fingers 16 A move down so that the hygiene product 12 becomes trapped between the upper and lower fingers 16 A, B (as shown in FIG. 3). Friction is generated between the hygiene products 12 and fingers 16 A, B when the hygiene product 12 becomes wrapped around the fingers 16 A, B. As the fingers 16 A, B continue to move in opposite directions (in the respective directions illustrated in FIG. 3), the friction creates tension in the hygiene product 12, which will eventually at some point cause the hygiene product 12 to break and/or tear when the tension increases above a level that the hygiene product 12 can withstand, typically defined by the e-modulus and tensile strength properties of the liner of the hygiene product 12. The tearing effect is caused by the tension exhibited by the fingers 16 A, B, and, dependent on respective finger radius, finger geometry and finger material, and in some instances, the fingers 16 A, B may also directly tear the hygiene product 12.

In certain embodiments, as illustrated in FIG. 4, the dimensions of the hygiene product 12 or pieces of the hygiene product 12 are too small to become wrapped around the fingers 16 A, B in a way that will allow the progressive movement of fingers 16 A, B to apply tension to the hygiene product 12. In these embodiments, because of the gap between the fingers 16 A, B in relation to the size of the hygiene product 12 or parts of the hygiene product 12, the hygiene product 12 or parts of the hygiene product 12 passes through the lingers 16 A, B without being torn or damaged, assuming the differential velocities between the fingers 16 are not excessive.

In embodiments where the hygiene product 12 comprises a plastic liner to which pulp, super absorbent polymer ("SAP"), or other fluff has been applied, an additional benefit of the fingers 16 A, B is that the fingers 16 A, B brush/comb/agitate the plastic components 20 of the plastic liner, which facilitates the separation of the pulp and/or fluff from the plastic liner components. The term pulp in the present context refers to standard pulp fibers used within a disposable hygienic product but also refers to modified pulps, either through chemical or heat or mechanical modifications such as curly fibers.

Figure 13A:
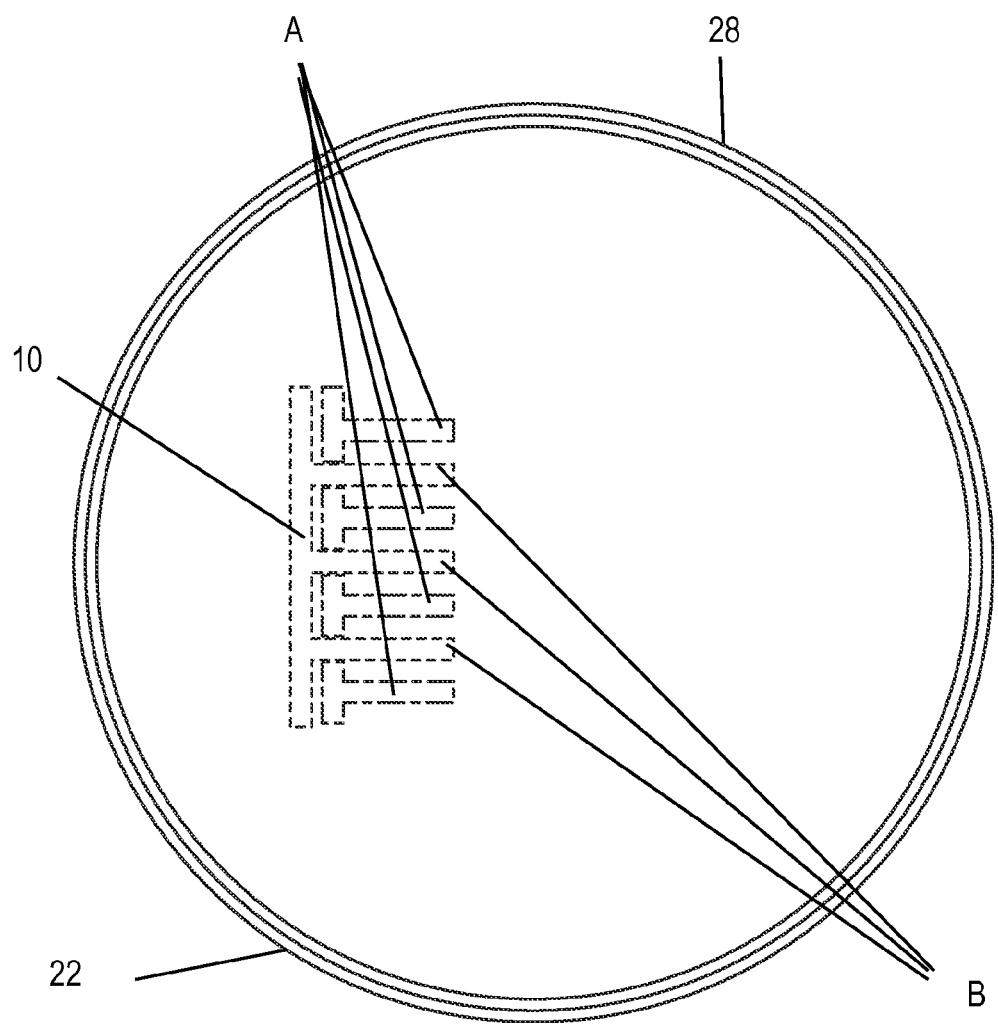
FIG. 13A is a schematic illustration of sets of paired fingers positioned to move in and out of each other in a linear axis relative to a rotational axis of a revolving device, according to certain embodiments of the present invention.
Figure 13B:
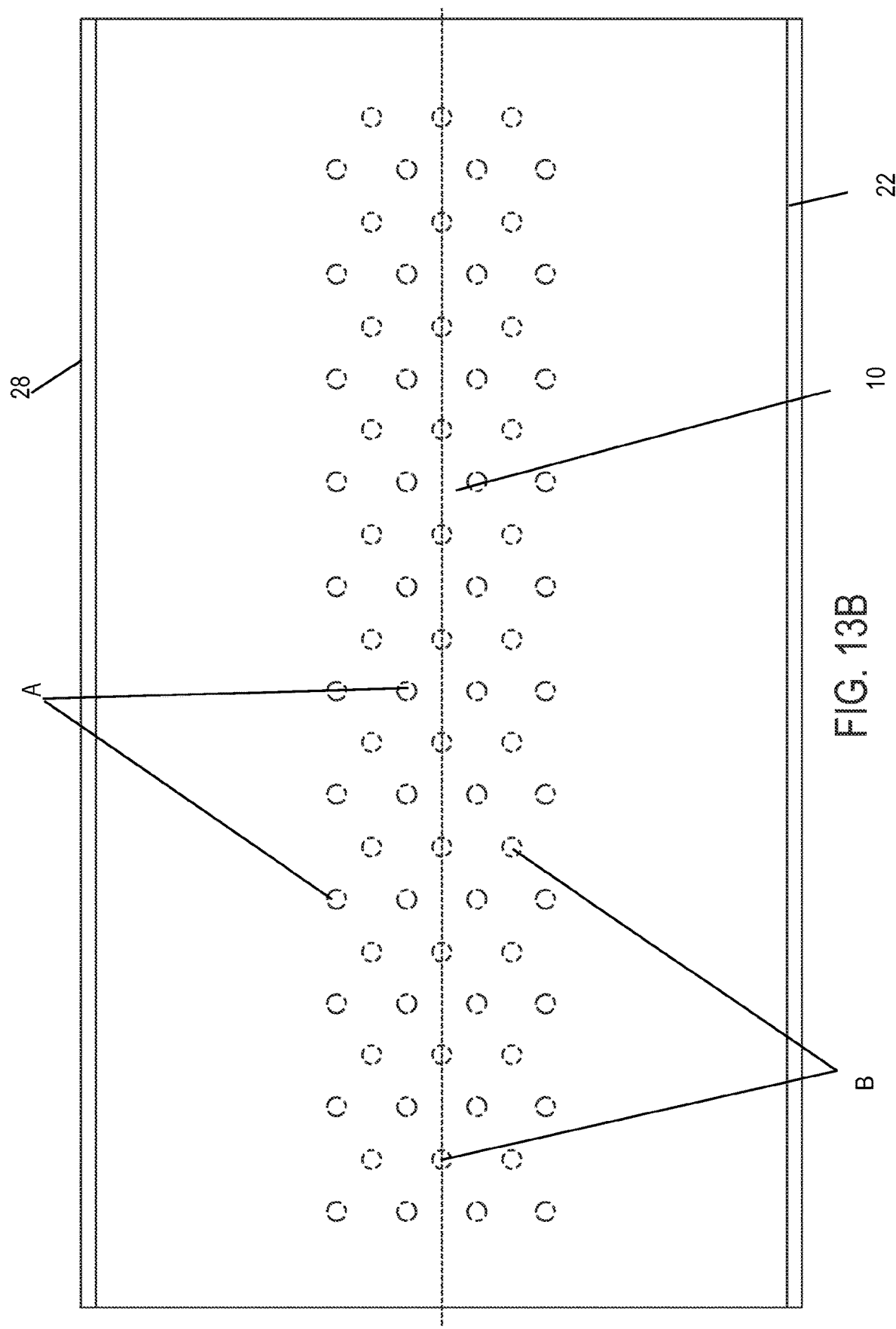
FIG. 13B is a schematic illustration of a front view of the sets of paired fingers positioned to move in and out of each other in a linear axis relative to the rotational axis of the revolving device of FIG. 13 A.
Figure 13:
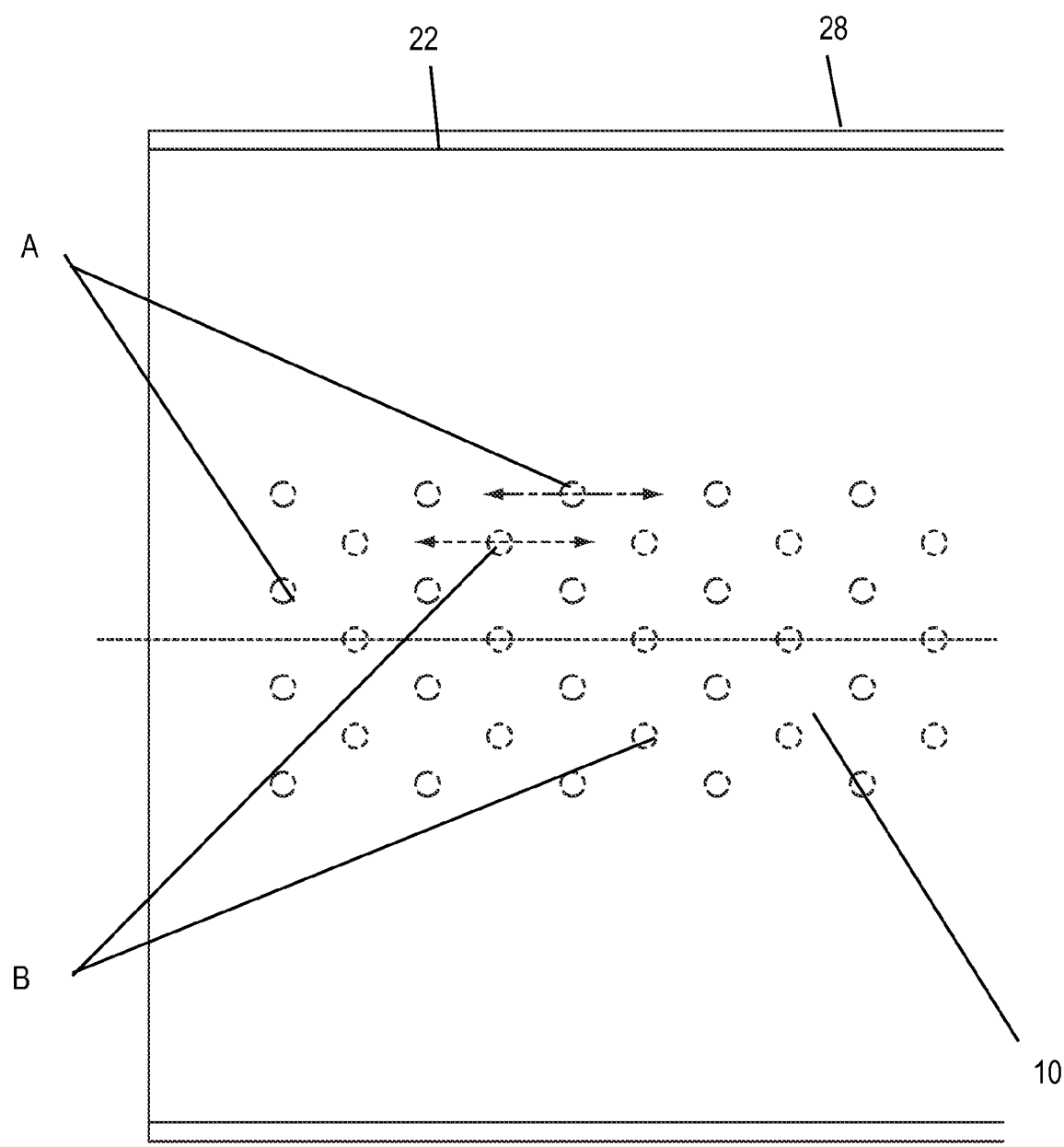
FIG. 13 is a schematic illustration of another front view of the sets of paired fingers positioned to move in and out of each other in a linear axis relative to the rotational axis of the revolving device of FIG. 13 A.

According to other embodiments of the selective shredding device 10, the fingers 16 A, B may move in and out of each other in a linear axis, wherein the plastic pieces may be wrapped/entangled around the fingers 16 A, B in one direction of motion of the fingers 16 A, B, but also in one or both directions of motion of the fingers 16 A, B. Such a system in shown in FIGS. 13, 13A, and 13B. In certain embodiments, a number of finger sets could be positioned on top of each other and side by side of each other. In the scenario where fingers 16 A, B are positioned on top of each other, plastic pieces falling from upper fingers 16 A may fall and also be entangled on and pulled apart by lower fingers 16 B. Such a finger configuration does not utilize a rotating shaft 18 to drive the fingers 16, and as a consequence, any process issues that occur as a result of the failure mode of the product liners being wrapped around the shaft 18 would be automatically eliminated. In certain embodiments, 1 to 10,000 or more fingers' 16 A, B may move backwards and forwards in a linear shredding device 14, or a linear shredding device 14 with single or multiple radiuses, wherein the fingers 16 do not utilize a shear cut or crimp cut process.

According to other embodiments of the selective shredding device 10, the process may also be capable of tearing the outer plastic liner product, wherein the outer body of the hygiene product 12 is passed multiple times through the fingers 16 A, B, and wherein each pass subsequently tears the plastic liner into smaller pieces such that an enhanced level of SAP and pulp may be released from the plastic liner. The aggressiveness of this tearing effect may be adjusted according to the distance between the fingers 16 A, B, the profile of the fingers 16 A, B, the radius of the fingers 16 A, B, and material properties of the respective finger surfaces.

Figure 5:
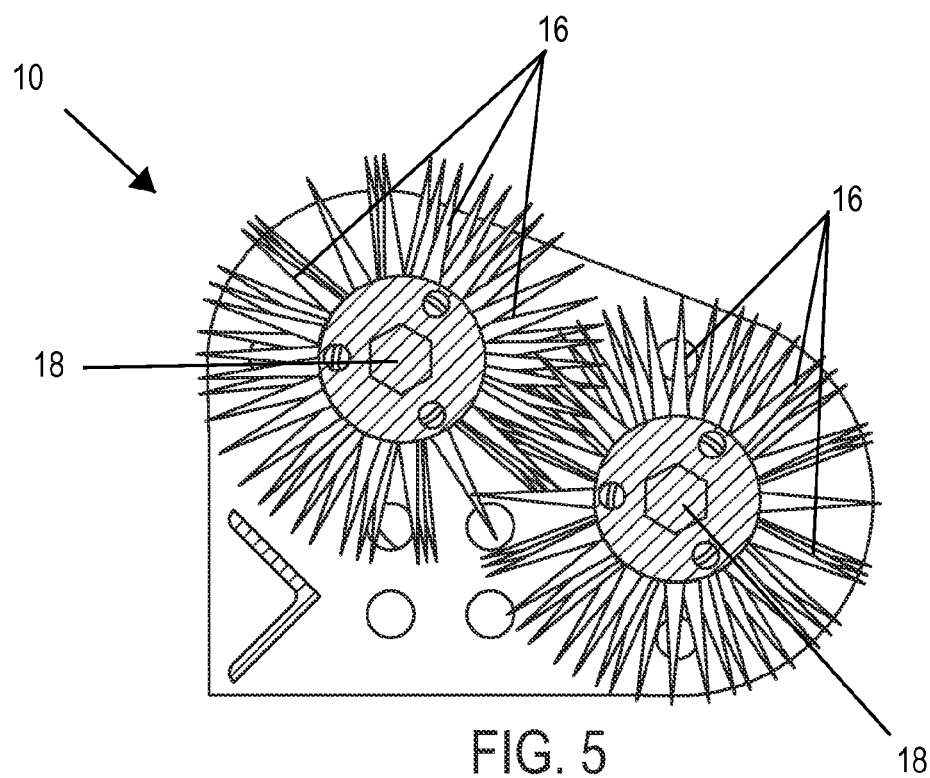
FIG. 5 is a side view of a selective shredding device, according to certain embodiments of the present invention.

Other embodiments of the selective shredding device 10 are illustrated in FIG. 5. In these embodiments, rather than the linear shredding device 14 discussed above, fingers 16 are positioned on two shafts 18 that rotate toward one another. The number of fingers 16 may range from 1 to 100,000 fingers 16 per shaft 18. FIG. 5 shows a concept relating to 2 shafts 18, however, the actual number of shafts 18 may range between 2 and 1000. Each shaft 18 may rotate at equal speeds or at differential speeds to create a mis-match of speed between the fingers 16 to create tension build up on the plastic component 20 of the hygiene product 12. In certain embodiments, the difference in speed between the fingers 16 on the opposing rotating shafts 18 is directly proportional to a difference in finger numbers between the opposing rotating shafts 18. In the embodiments illustrated in FIG. 5, at least some fingers 16 on opposite shafts 18 may rotate past one another (i.e., at least one finger on one shaft 18 is momentarily aligned with at least one finger on the other shaft 18) so that the space between certain fingers 16 on opposite shafts 18 is substantially closed during that momentary alignment. In certain embodiments, momentary alignment of fingers 16 (on the compression process between opposite fingers 16 prior to the alignment of fingers 16) on opposite shafts 18 may tear (through compressing and/or piercing the hygiene product 12) or otherwise damage the plastic component 20 of the hygiene product 12, rather than applying a tensioning force to the plastic component 20, which may result in undesirable plastic components 20 that are smaller than the targeted dimensions and may cause performance losses in subsequent sieving/separation processes.

Figure 6:
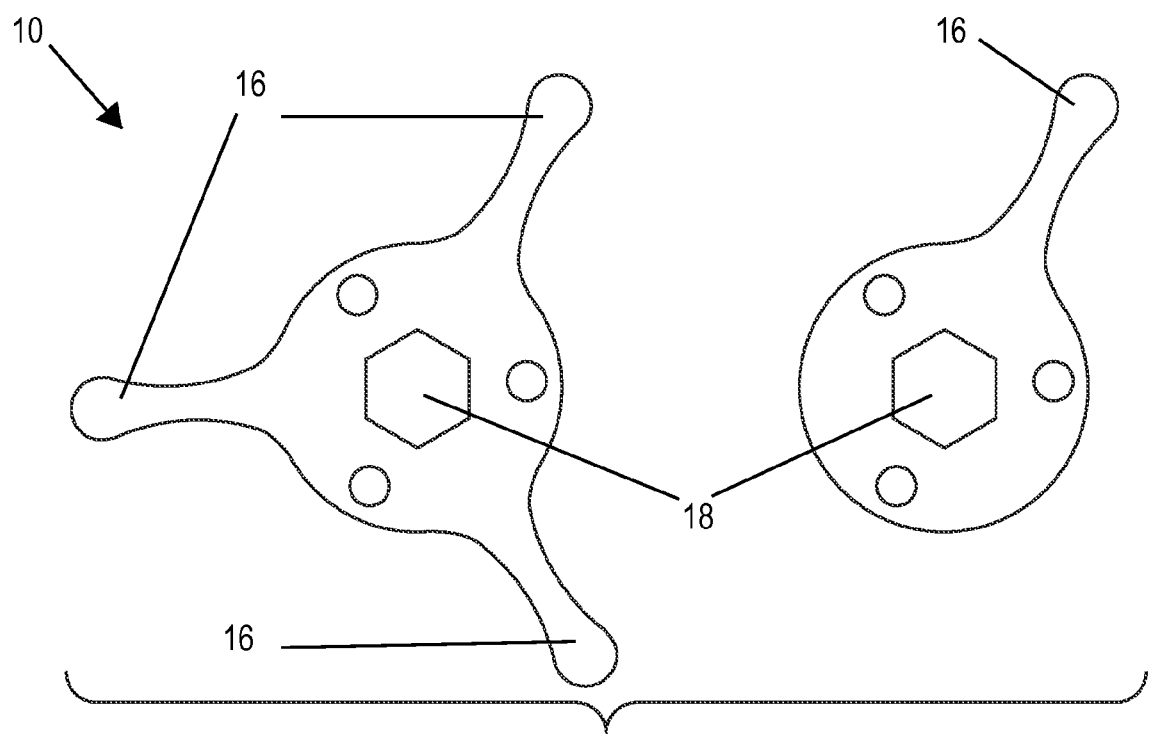
FIG. 6 is a side view of a configuration of a paired set of fingers on two shafts of a selective shredding device, according to certain embodiments of the present invention.

In certain embodiments, the number of fingers 16 and placement thereof around each shaft 18 may be configured, along with adjustment of the relative speeds of the two shafts 18, so that the fingers 16 of opposite shafts 18 do not progressively align with one another prior to alignment and create any undesired piercing of the plastic components 20, and a wide area is generated allowing plastic components 20 to land as they fall into the selective shredding device 10. An example of such a configuration is shown in FIG. 6. In these embodiments, the shaft 18 on the left includes 3 fingers 16 located in the same vertical plane around the perimeter of the shaft 18, i.e. each finger is spaced apart by an angle of 120 degrees. The shaft 18 on the right includes 1 finger located in another vertical plane that is slightly horizontally offset from the vertical plane, but could be adjusted in any suitable direction or manner, in which the 3 fingers 16 of the opposite shaft 18 are aligned. The shaft 18 on the right may also be configured to rotate at a speed so that after each rotation of the shaft 18 on the right, the single finger 16 on the right is parallel to 1 of the 3 fingers 16 on the left. With this configuration, the single finger 16 rotates past the shaft 18 of the left by passing through one of the angular spaces between the 3 fingers 16 so that the fingers 16 on opposite shafts 18 do not rotate past each other and become momentarily aligned. The shaft 18 on the right also rotates at three times the speed of the shaft 18 on the left so that the single finger 16 passes through one of the angular spaces between the 3 fingers 16 on the left on each rotation. As a result, a plastic component 20 passing between the two shafts 18 becomes tensioned across the fingers 16 as a result of the mis-matched finger location and speed, but is not prematurely damaged (i.e. cutting, or compressing, or piercing, or mulching) by the fingers 16 passing by each other.

Figure 7:
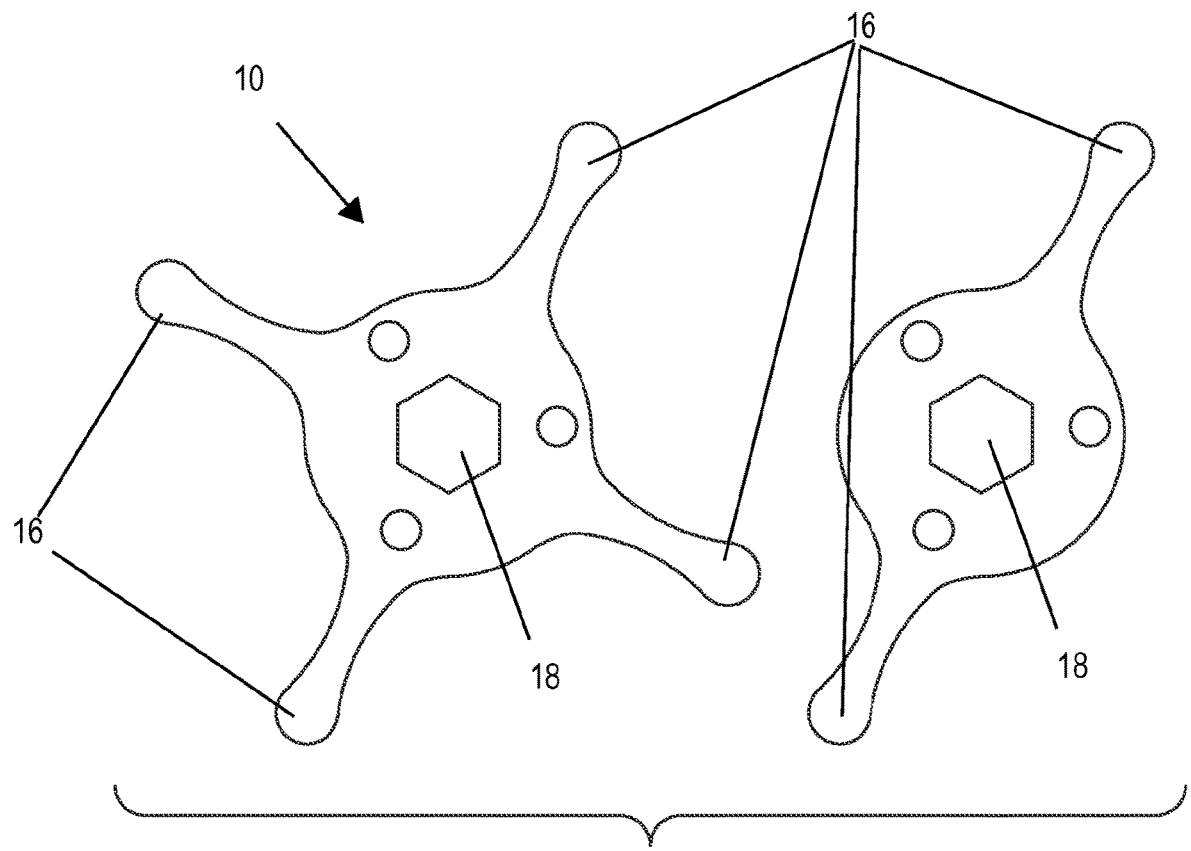
FIG. 7 is a side view of another configuration of a paired set of fingers on two shafts of a selective shredding device, according to certain embodiments of the present invention.

In other embodiments, as shown in FIG. 7, the shaft 18 on the left includes 4 fingers 16 located in the same vertical plane around the perimeter of the shaft 18, i.e. each finger is spaced apart by an angle of 90 degrees. The shaft 18 on the right includes 2 fingers 16 located in another vertical plane that is slightly horizontally offset from the vertical plane in which the 4 fingers 16 of the opposite shaft 18 are aligned. The shaft 18 on the right may also be configured to rotate at a speed so that after each rotation of the shaft 18 on the right, the 2 fingers 16 on the right are parallel to 2 of the 4 fingers 16 on the left. With this configuration, the 2 fingers 16 rotate past the shaft 18 on the left by passing through one of the angular spaces between the 4 fingers 16 so that the fingers 16 on opposite shafts 18 do not rotate past each other and become momentarily aligned. The shaft 18 on the right also rotates at substantially two times the speed of the shaft 18 on the left so that one of the 2 fingers 16 passes through one of the angular spaces between the 4 fingers 16 on the left on each rotation. As a result, a plastic component 20 passing between the two shafts 18 becomes tensioned across the fingers 16 as a result of the mis-matched finger location and speed, but is not prematurely damaged (i.e. cutting, or compressing, or piercing, or mulching) by the fingers 16 passing by each other. In certain embodiments, the fingers 16 attached to the respective shafts 18 have a mis-matched speed and are phased so that the fingers 16 pass through each other when they are pointing at each other or at an angle of minus 45 degrees and phased at plus 45 degrees to this point.

While the examples above discuss sets of paired fingers 16 with a 3:1 or a 2:1 ratio, one of ordinary skill in the relevant art will understand that any suitable ratio may be used to achieve the desired tensioning of the plastic component 20. In these embodiments, the difference in speeds between the two rotating shafts 18 is directly proportional to the ratio difference in finger numbers.

As such, the selective shredding process uses a small amount of energy and typically exerts continued slow moving gentle forces on the hygiene product 12 or components of the hygiene product 12. The attribute of the slow moving components/fingers 16 within the selective shredding device 10 create an environment where the hygiene product 12 or components of the hygiene product 12 have a higher chance to remain on the moving components/fingers 16 during processing thereby ensuring that the process efficiency of the shredding process is high. In comparison, a shredder fan or standard shredding device would be rotated at a far higher revolutions per minute ("rpm") and in this process, the components would typically pass through once only and remain in the shredding device for a very short period of time. This slow moving gentle process does however also create a processing environment where there is a risk that the hygiene product 12 or components of the hygiene product 12 become wrapped around the components/fingers 16 within the selective shredding device 10.

In certain embodiments, the direction of rotation of the two shafts 18 in the selective shredding device 10 may be reversed (or the rpm speed of the shafts 18 adjusted so that the slower rpm shaft 18 becomes the faster rpm shaft 18 and/or vice versa for one shaft 18 and/or multiple shafts 18) in cases to avoid a build-up of product occurring on the components/fingers 16. By reversing the direction or causing the slow shaft 18 to become the faster rotating shaft 18, the leading edge becomes the trailing edge, which allows any build-up of product on the fingers 16 to be released from the fingers 16. The rotation of the shafts 18 may be reversed based on a timer or by a sensor that determines when hygiene product 12 has built up on the leading edge to a threshold level. The amount of time the shafts 18 are rotated in reverse may be any suitable amount of time up to 50% of a total run time while the shafts 18 are rotating. Another method to stop unwanted buildup of hygiene product 12 within the shredder is it to increase the speed of the shafts 18, either in operational direction or in reverse, where the speed increase would be between 1 rpm-25,000 rpm. In certain embodiments, the rpm speed of the rotating shafts 18 increase by more than 1.1 times a typical operational speed for time periods of less than 50% of a total run time. This higher speed creates a much higher G-force on the hygiene product 12, which pulls the hygiene product 12 away from the components/fingers 16. During the above mentioned process parameter speed changes, incoming hygiene product 12 being fed into the selective shredder may continue; however, in some embodiments, the incoming product being fed into the selective shredder device 10 would temporarily stop to avoid unwanted material damage during any respective cleaning cycle.

Figure 8:
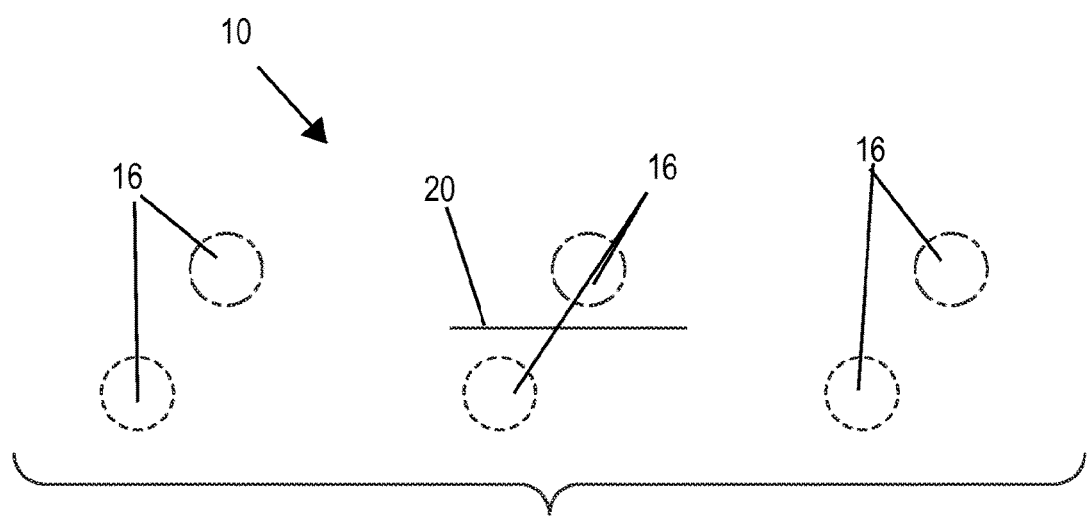
FIG. 8 is a schematic illustration of the spacing between sets of paired fingers on two shafts of a selective shredding device, according to certain embodiments of the present invention.
Figure 9C:
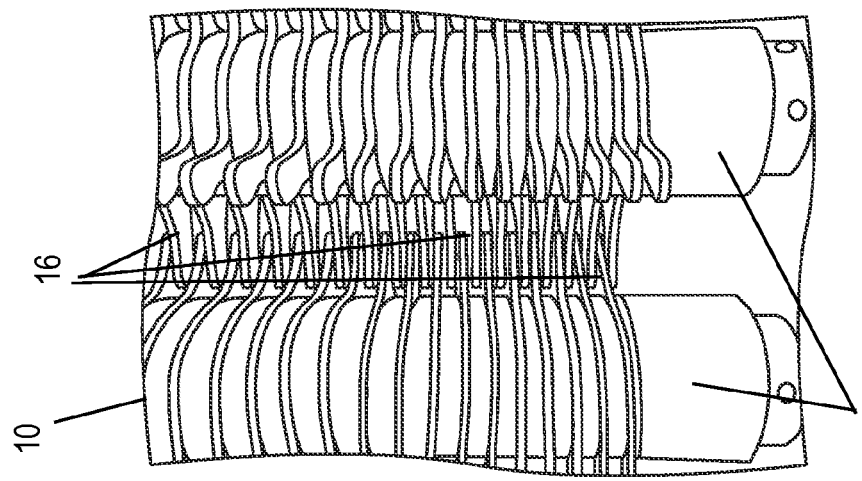
FIGS. 9A, 9B, and 9C illustrates multiple sets of paired fingers placed along the lengths of two shafts of a selective shredding device, according to certain embodiments of the present invention, each with progressively decreasing spacing between the sets.
Figure 9B:
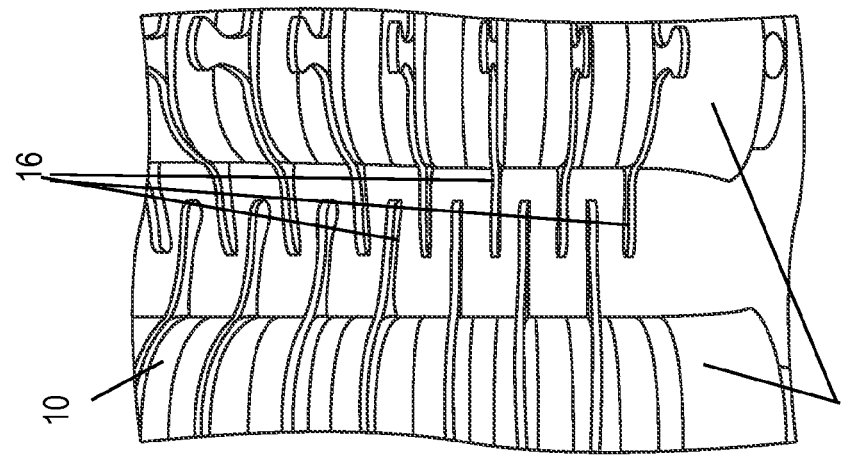
Figure 9A:
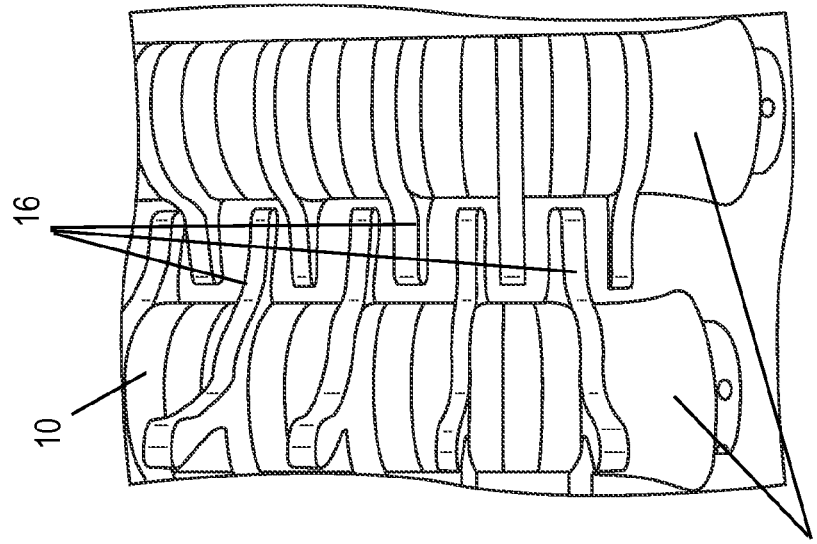

In these embodiments, multiple sets of paired fingers 16 may be placed along the length of each shaft 18, as illustrated in FIGS. 9A, 9B, and 9C. The spacing between each set of paired fingers 16 may be varied as needed to achieve the desired number of sets and distance between each set. FIGS. 9A, 9B, and 9C illustrate that the spacing between sets of paired fingers 16 may be decreased along the two shafts 18 to change the size of plastic components 20 exiting the shredding process, with 9A depicting the start of the shredding process where fingers 16 are further apart, with 9B depicting the fingers 16 midway in the shredding process, and 9C depicting the final step selective shredding process where the fingers 16 are close together. For example, as shown in FIG. 8, increasing the spacing between sets of paired fingers 16 increases the size of the plastic components 20 exiting the selective shredding device 10, smaller plastic components 20 which do not bridge multiple fingers 16 pass through the fingers 16 without any damage. In contrast, as shown in the differences between FIGS. 9A, 9B, and 9C, decreasing the spacing between sets of paired fingers 16 (fingers 16 in FIG. 9C being positioned closer along the rotational axis versus the fingers 16 in FIG. 9A) decreases the size of the resulting plastic components 20 exiting the selective shredding device 10. In some embodiments, the number of sets of paired fingers 16 may range from 2 to up to 10,000 or more in a selective shredding device 10. In certain embodiments, instead of fingers 16, an impeller or objects such as a T hammer, flat hammer, or flying knife are attached, which may also number between 1 to 10,000 or more.

To avoid creating excessive stress on the drive components of the selective shredder device 10, and allowing the combining of a selective shredder process with sieving process to achieve a high performance separation process described later in this application, the sets of paired fingers 16 may be adjusted to be spaced further apart at the beginning of the shredder process which results in the production of larger plastic components 20 within the process and as the shredding process continues, assuming that components are transported to later subsequent shredding processes, the sets of paired fingers 16 in the selective shredder device 10 can be progressively positioned closer together as the plastic components become progressively smaller to produce smaller sized plastic components.

Figure 11:
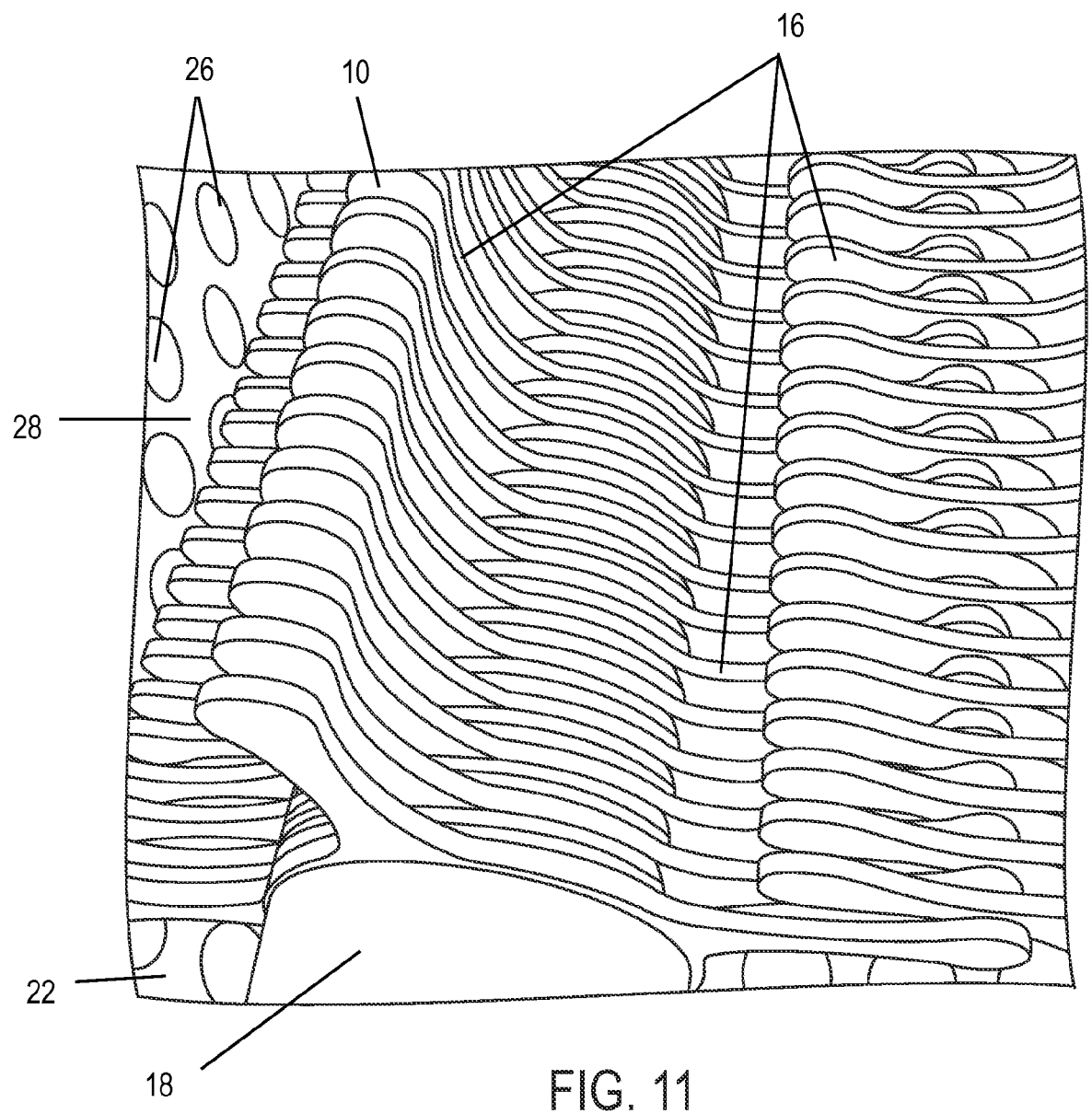
FIG. 11 is a partial perspective view of a final stage of a selective shredding device positioned within a revolving device, according to certain embodiments of the present invention.

As illustrated in FIG. 8, if the line positioned between the two rows of fingers 16 represents a plastic component 20, this component would pass through the fingers 16 without being pulled apart and/or reduced in size by the this configuration of the selective shredding device 10 because the plastic component 20 is smaller than the distance between the next adjacent set of paired fingers 16 on either side of the set of paired fingers 16 where the plastic component 20 is positioned. Being able to control the plastic component 20 size also has benefits in any subsequent sieving processes, which is described in more detail later in this application. The closest gap between the fingers 16 would normally be set to be slightly bigger than the largest component 20 within the hygiene product 12 where shredding is not desired. Within a diaper for example, the shredding of diaper tapes and Velcro components would not be not desired as these components are made from pure plastic and do not contain any SAP/Pulp components. The shredding of such components, especially the Velcro, would also create multiple smaller components, which would be difficult to sieve/separate from pulp stream. As such, the typical gap between the fingers 16 would be typically not less than 1 mm, but, may vary in some instances, depending on the hygiene products 12 being processed (such as feminine care products where no Velcro components exist) to between 1 micron and 1,000,000,000 microns. The final stage of such a selective shredding device 10 is shown in FIG. 11 where the gap between the fingers on the final stages is not less than 1 mm.

Figure 10:
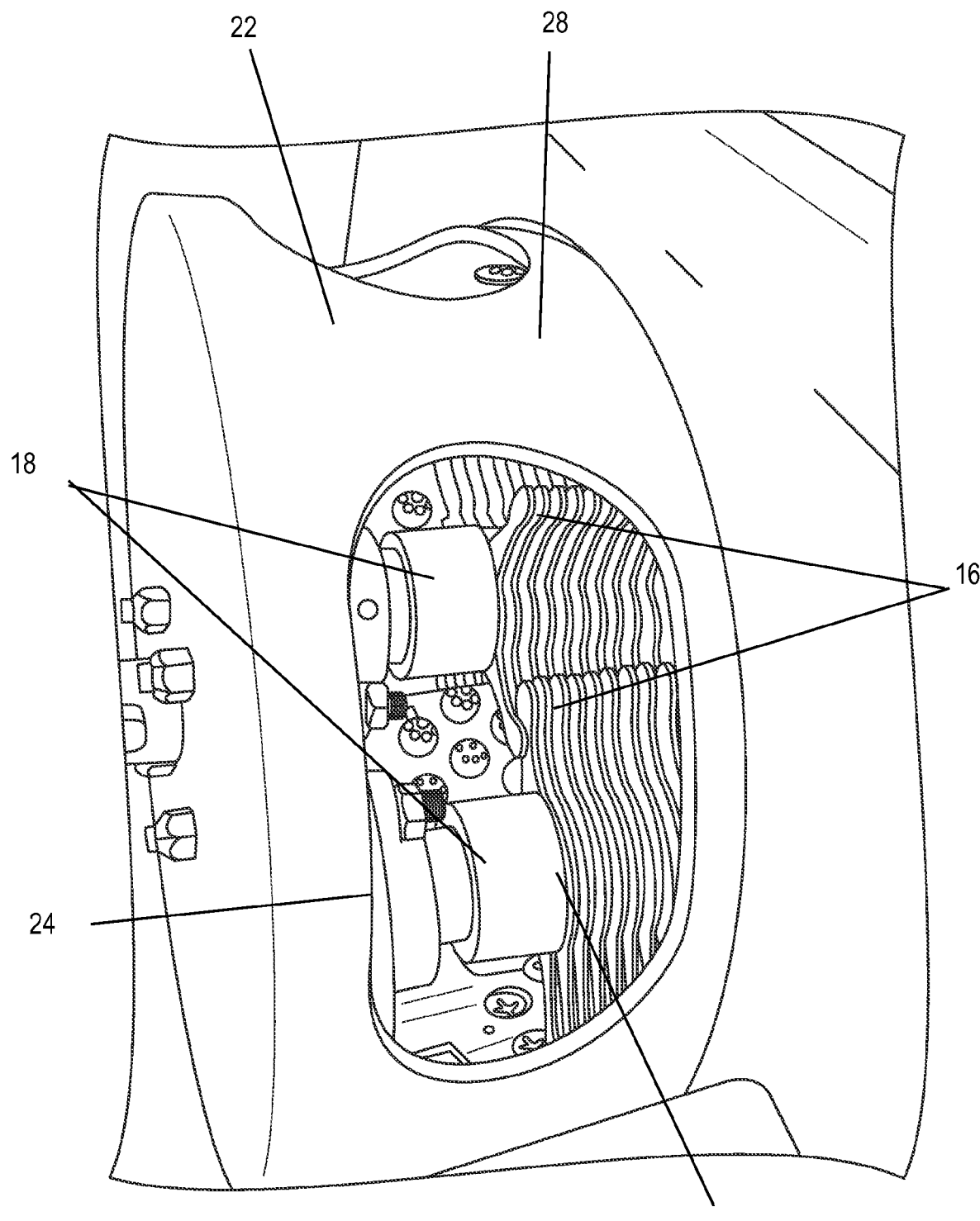
FIG. 10 is a perspective view of one end of a selective shredding device positioned within a revolving device, according to certain embodiments of the present invention.

Exemplary embodiments of a selective shredding device 10 may comprising multiple stages and progressively diminished spacing between steps within each stage to reduce overall stress on the process. A system may include a shaft 18 length of 750 mm for each stage, and multiple shredding stages can be used. However, one of ordinary skill in the relevant art will understand that this is but one of many potential embodiments, and that shaft 18 length, number of stages, features and steps within each stage, modifications between steps, and speeds of any and all components may be altered or adjusted as needed to achieve the desired output. Having a single shredding stage may mean that the shredder length is excessive, high torque requirements to drive such a device would limit shredder length, and machine operator access for cleaning could be restrictive. Having multiple shredding steps may allow a lower torque requirement for each shredding step, may allow dedicated process settings for that particular stage (such as shredder rpm settings which can correspond to plastic component 20 size and different combination of finger sets such as 4:2 and 3:1), and may allow shredding stages to be stacked on top of each other, which has the added benefit of reducing floor space requirements of this described equipment. As described in more detail below, in configurations where multiple shredding processes are used and where the selective shredding device 10 is positioned within a revolving device 22, depending on equipment design, enlarged holes 24 at the exit end 74 of revolving device 22 may be included to allow the plastic components 20 to exit the revolving device 22, where these holes 24 would typically be 5 times the size of apertures 26 in a circumferential surface 28 of the revolving device 22, but could range between 1-10,000 times the size of such apertures 26. Examples of these holes 24 are shown in FIG. 10. With multiple shredding processes mounted on top of each other and with particles being able to free flow through all of the shredding processes, the typical floor space allocation for such a device would therefore be similar to or smaller than collection and temporary storage systems used for rejected diaper collection today which commonly comprises boxes, bins, bags, containers, trolleys, or any suitable combination thereof. As a result, the line crew would have more space to operate in, not have inconvenience of continued traffic of vehicles, and/or systems to remove diaper waste, and would not have to manually handle any waste product.

As the plastic components 20 exiting the first and second stages become progressively smaller, the 120 degree angular spacing between the fingers 16 discussed above is no longer necessary to accommodate the plastic components 20 as no large plastic components 20 exist at this stage in the process. As a result, the third stage may utilize the 4:2 ratio, also discussed above, which results in a lower initial impact velocity between the fingers 16 on the plastic and therefore reduces the likelihood of unpredicted material damage. A detailed outline of a potential selective shredder combination is enclosed in FIGS. 22, 33, 35, and 36.

Figure 12:
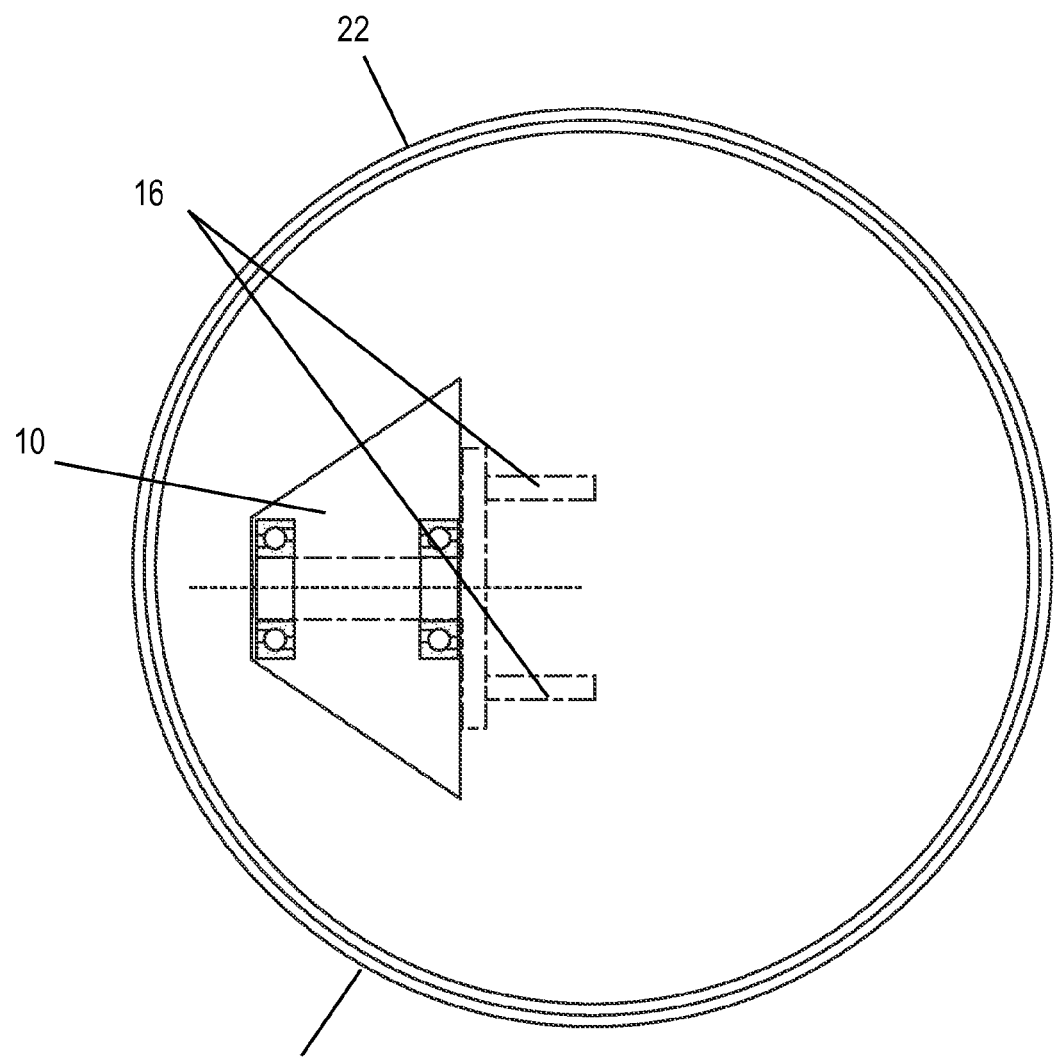
FIG. 12 is a schematic illustration of sets of paired fingers positioned so that a finger rotational axis is positioned at 90 degrees to a rotational axis of a revolving device, according to certain embodiments of the present invention.

In certain embodiments where fingers 16 rotate on a rotary shaft 18, the shredding process may experience an increased risk of product wrap-arounds when the first stage speed is too low. On the other hand, the shredding process may experience undefined plastic component 20 damage resulting in an increased risk of undersized plastic component 20 generation when the speed of the process is too high. To counter-balance these two risks, the first shredding stage typically rotates at a higher speed because the risk of product wraparounds is greater at the initial stage, and the second stage rotates at a reduced speed because the risk of generating undersized plastic components 20 is greater when the hygiene product 12 is smaller and the risk of product wrap-arounds has diminished. Specifically, the hygiene product 12 wrap-arounds in the first stage may be prevented by having the sets of paired fingers 16 in the first stage moving in the same rotational axis and/or in the axis of 0 to 180 degrees to the axis of the revolving device 22, thereby eliminating a central rotating shaft 18 (as shown in FIG. 12, where the finger rotational axis is positioned at 90 degrees (but could range between 0 and 180 degrees) to the rotational axis of the revolving device 22), and likewise, having fingers A, B moving in and out of each other in a linear axis would also prevent product wrap-arounds around any of the systems shafts 18 and/or drive components (shown in FIGS. 13, 13A, 13B).

Figure 14:
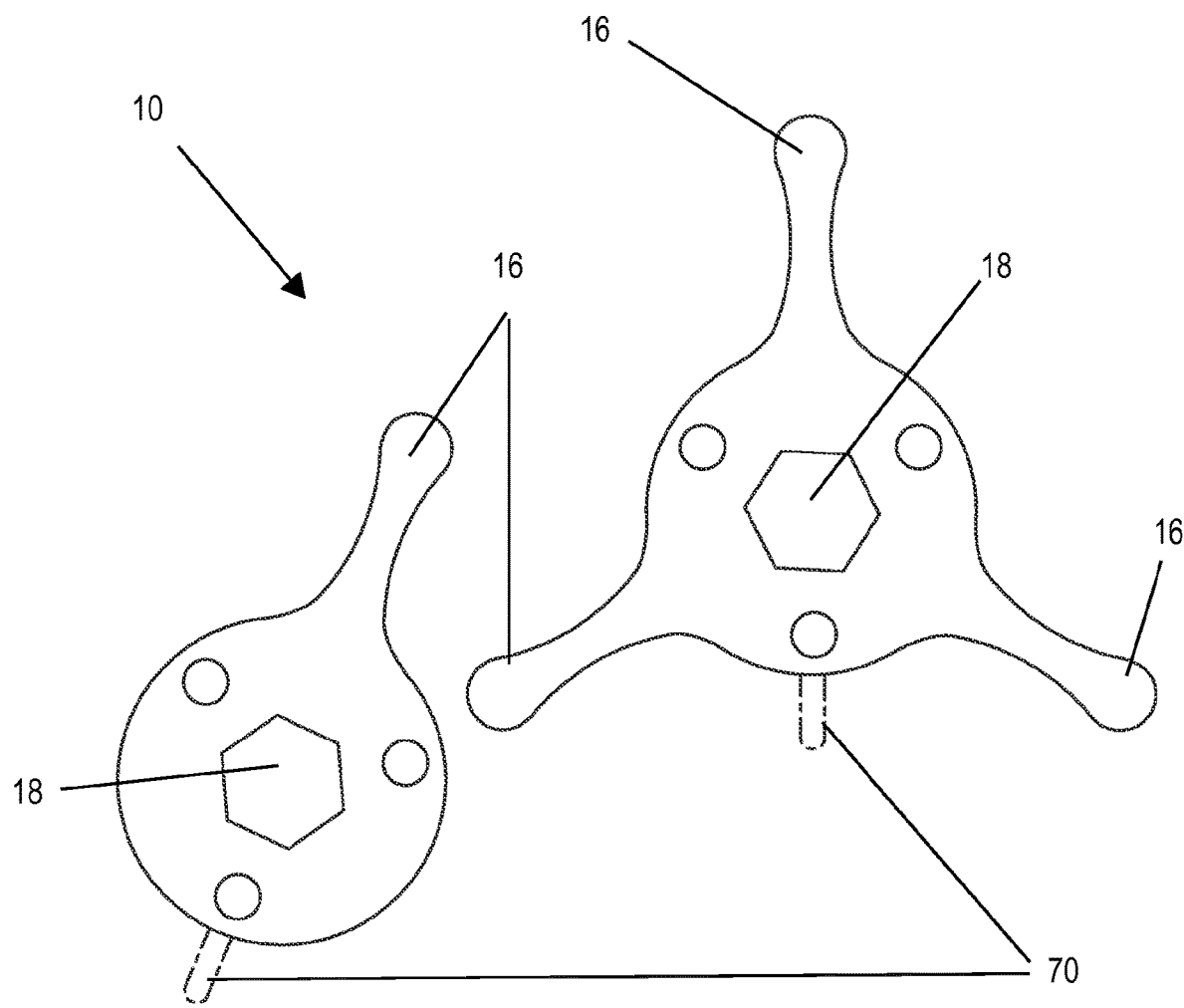
FIG. 14 is a side view of a configuration of a paired set of fingers on two shafts of a selective shredding device with a cleaning device attached to each shaft, according to certain embodiments of the present invention.

In certain embodiments where fingers 16 rotate on a rotary shaft 18, the shredding process may experience an increased risk of product wrap-arounds when the first stage speed is too low. On the other hand, the shredding process may experience undefined plastic component 20 damage resulting in an increased risk of undersized plastic component 20 generation when the first stage speed is too high. To counter-balance these two risks, the shaft 18 rotational speed could be kept low, and a secondary cleaning device 70 may be used to keep the shaft 18 clean. This cleaning device 70 may be a finger or a blade, which moves up and down the shaft 18 in linear direction, or a combination of liner and rotational movement with a cycle time between 1 millisecond up to 1,000,000,000,000 milli-seconds (as illustrated in FIG. 14 illustrating the cleaning devices 70).

Figure 15:
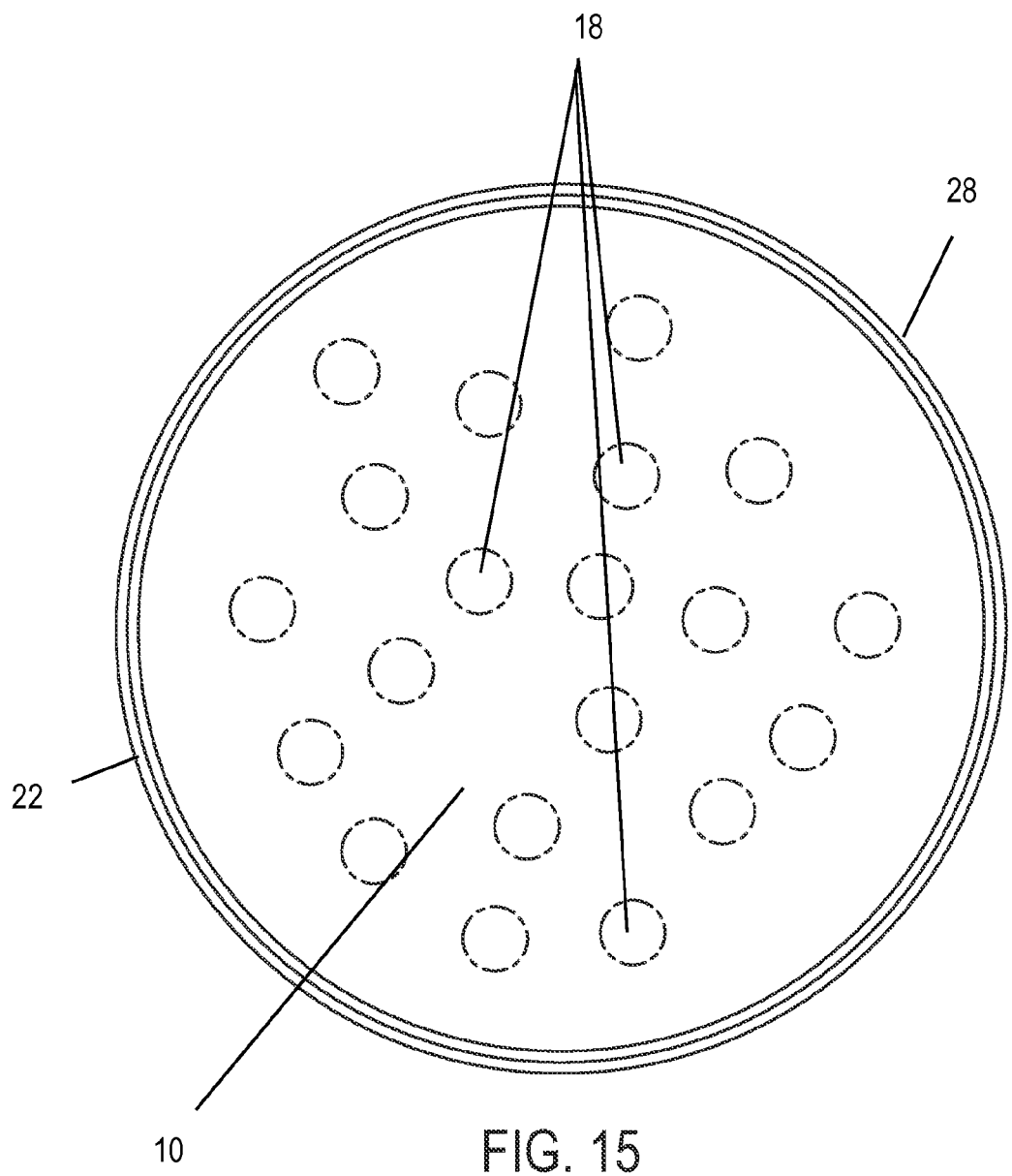
FIG. 15 is a schematic illustration of an end view of a plurality of shafts positioned within a revolving device, according to certain embodiments of the present invention.

In certain embodiments of the selective shredding device 10, a rotary shaft may be used, rather than using a multitude of fingers 16 (either in a rotary or linear system), to pull apart the hygiene product 12, wherein a number of rotating shafts 18 with a coefficient of friction greater than 1 rotating at different surface velocities and/or directions may also be used to pull apart the hygiene product 12. In such an apparatus, moving the rotating shafts 18 closer together will cause plastic component 20 size to be reduced (as shown in FIG. 15). The shafts 18 may be positioned to have a distance between the shafts 18 where particles wrapping around the shafts 18 generate friction on the particles, therefore causing the particles to break, or the shafts 18 may be positioned to touch each other in order to create a nip between the shafts 18, which would consequently grip the particles and, due to difference velocities of the shafts 18, cause the particles to break. In such a device, the coefficient of friction of the outer surface of the rotating shafts 18 is typically high such as in the 0.8-0.95 range but could range between 0.01 to 0.9999.

In certain embodiments, where disposable hygiene products 12 (or pieces thereof) are passed through a selective shredding device 10 (such as the selective shredding devices shown in FIGS. 5-15), having the capability to pass the hygiene product 12 or pieces of the hygiene product 12 multiple times through the selective shredding device 10 would have significant benefits as a more defined plastic size can be achieved, as it is likely that larger than desired plastic components 20 may be generated from a single pass through the selective shredder. Furthermore, frequent passing of the hygiene product 12 or pieces of the hygiene product 12 would have the added benefit of brushing any undesired pulp & SAP away from the plastic liner.

Figure 16:
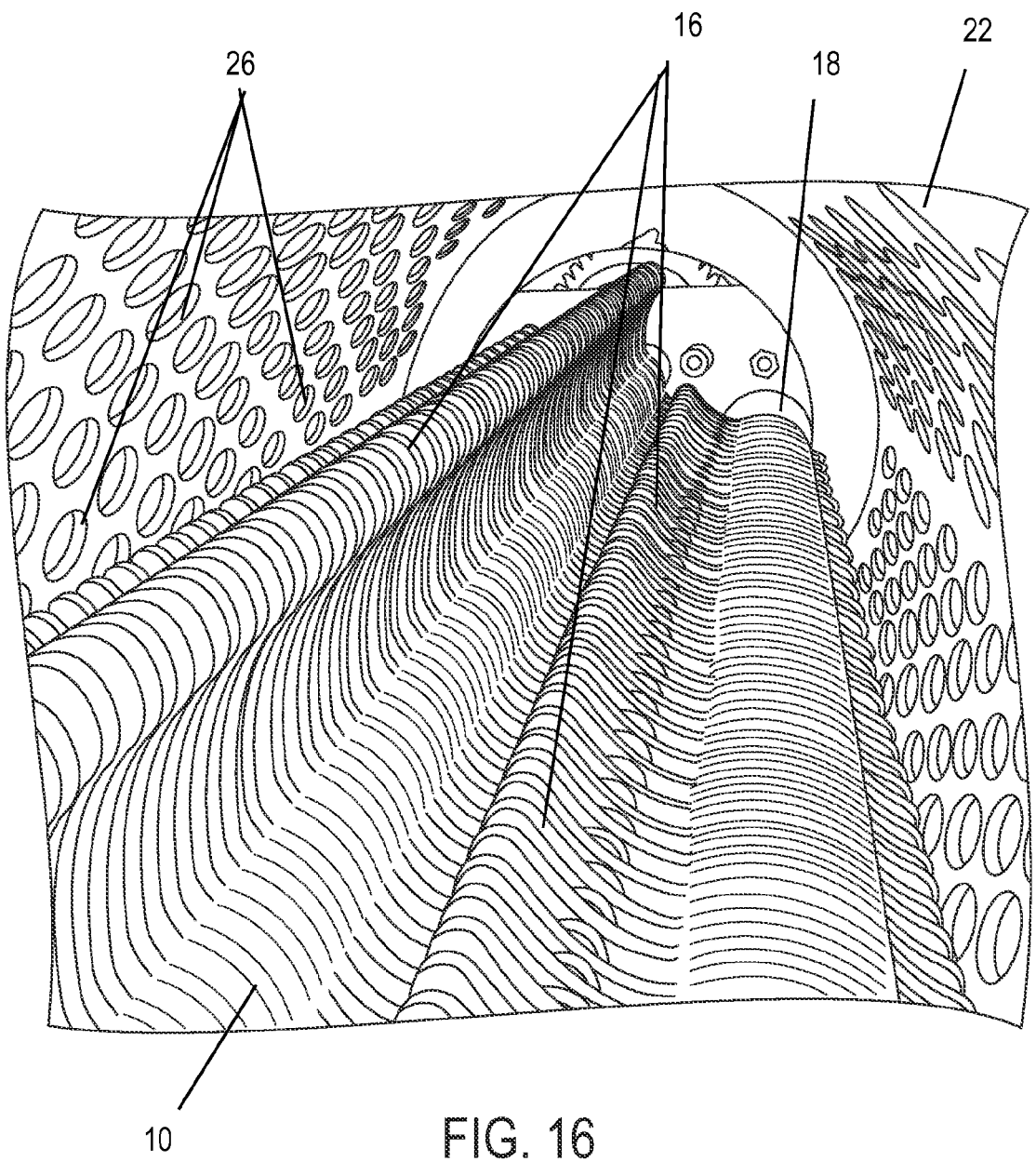
FIG. 16 is a partial perspective end view of a selective shredding device positioned within a revolving device, according to certain embodiments of the present invention.

As illustrated in FIG. 16, the selective shredding device 10 may be positioned within a revolving device 22, such as a revolving cylinder and/or drum or cyclone, which may be configured to repeatedly throw product into the selective shredding device 10. In certain embodiments, the revolving device 22 may have a diameter ranging between 1 mm to 10,000 mm. For example, the rotational speed of the revolving device 22 may be adjusted to achieve the appropriate centrifugal force, so that the hygiene product 12 will be transported within the revolving device 22 to a point then be thrown directly into the selective shredding device 10. If the revolving device 22 speed is set too high, the hygiene product 12 will be centrifugally trapped against the wall of the revolving device 22. If the revolving device 22 speed is set too low, the hygiene product 12 will tumble along the bottom of the revolving device 22 as the revolving device 22 rotates. In addition, heavier (or bigger) products with lower air resistance will be thrown further than lighter (or smaller) objects with higher air resistance. An example of this arrangement is outlined in FIG. 17, where arrow 1 indicates a potential SAP path, arrow 2 indicates a potential plastic path, and arrow 3 indicates a potential pulp path (open fibers). As a result, SAP particles will most likely contact the revolving device 22 first, and, if there are apertures 26 in the revolving device 22, exit the revolving device 22, whereas plastic products will contact the surface of the revolving device 22 afterwards, and the lighter particles (such as pulp) will settle on top of the plastic products. The speed of the revolving device 22 would typically be adjusted to create a centrifugal force of 0.88 G on the hygiene product 12 therein, but may range between 0.06 and 1 G on the hygiene product 12 therein, and more specifically may range between 0.05 and 0.998 G on an inner surface (or any surface) within the revolving device 22. The exact speed of the revolving device 22 and the subsequent flight path of the components being transported within the revolving device 22 would be adjusted to facilitate the highest possible plastic flow through the selective shredder.

Figure 18:
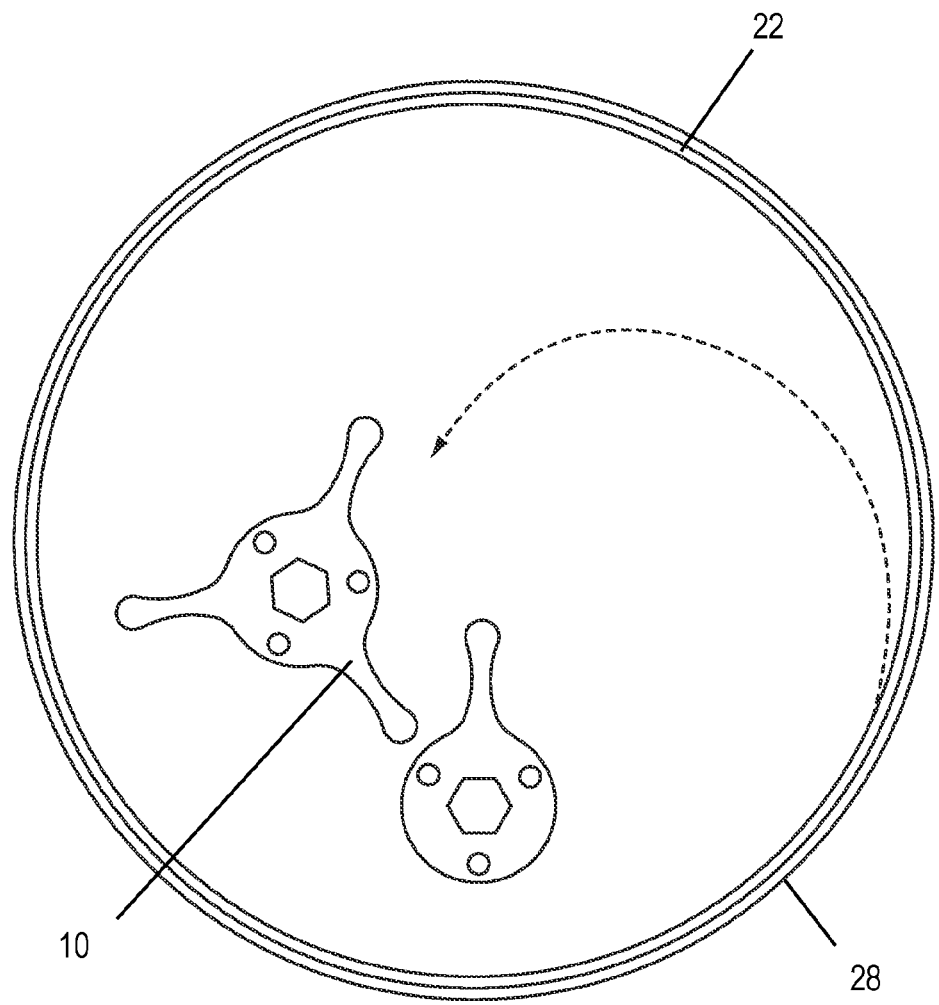
FIG. 18 is a schematic illustration of a trajectory path of materials being through into a selective shredding device by a rotation of a revolving device, according to certain embodiments of the present invention.

In these embodiments, the materials being thrown from the revolving device 22 into the selective shredding device 10 are then substantially captured by the shredding device. The shredding device therefore has to be positioned in an appropriate position with the drum to allow particles to land on the front face of the two shafts 18, as shown in FIG. 18.

Figure 19:
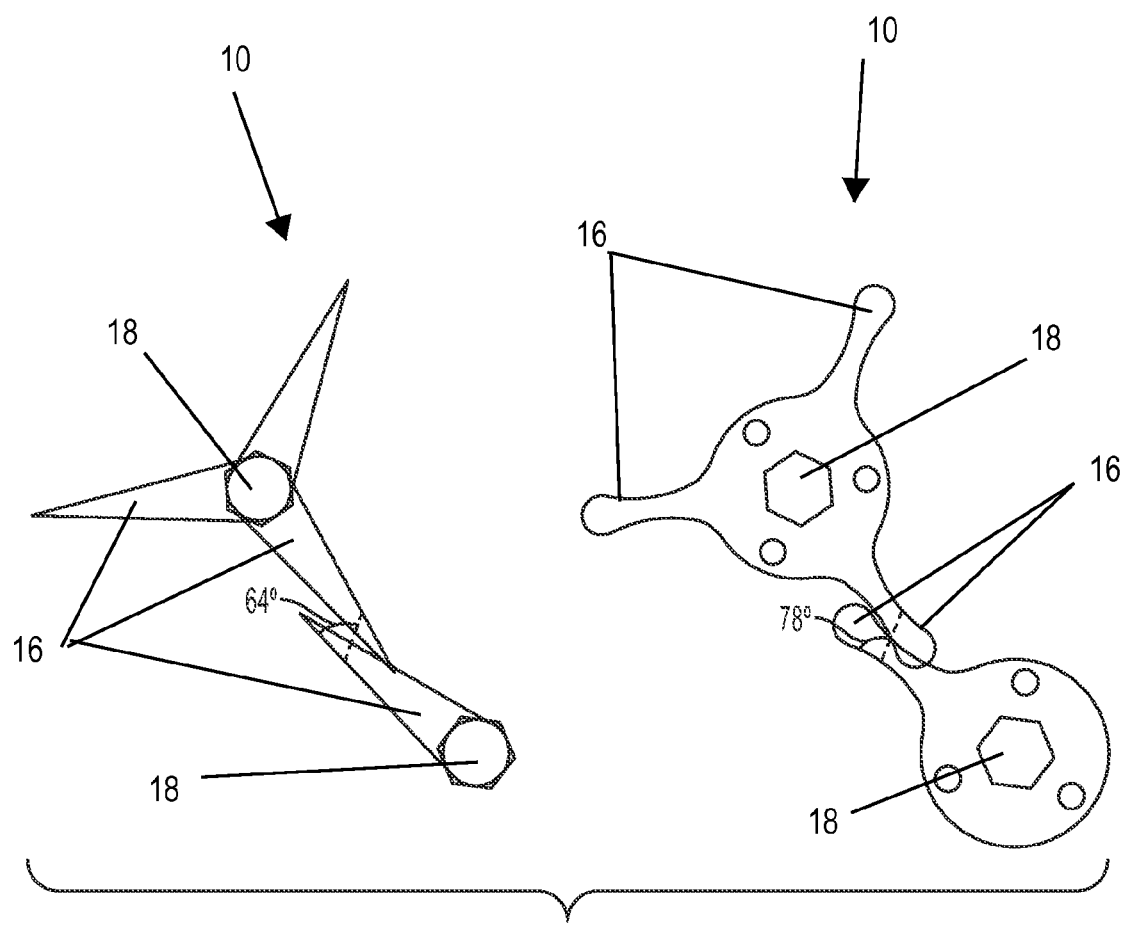
FIG. 19 is a side view of a configuration of a paired set of non-profile fingers on two shafts of a selective shredding device, according to certain embodiments of the present invention.
Figure 20A:
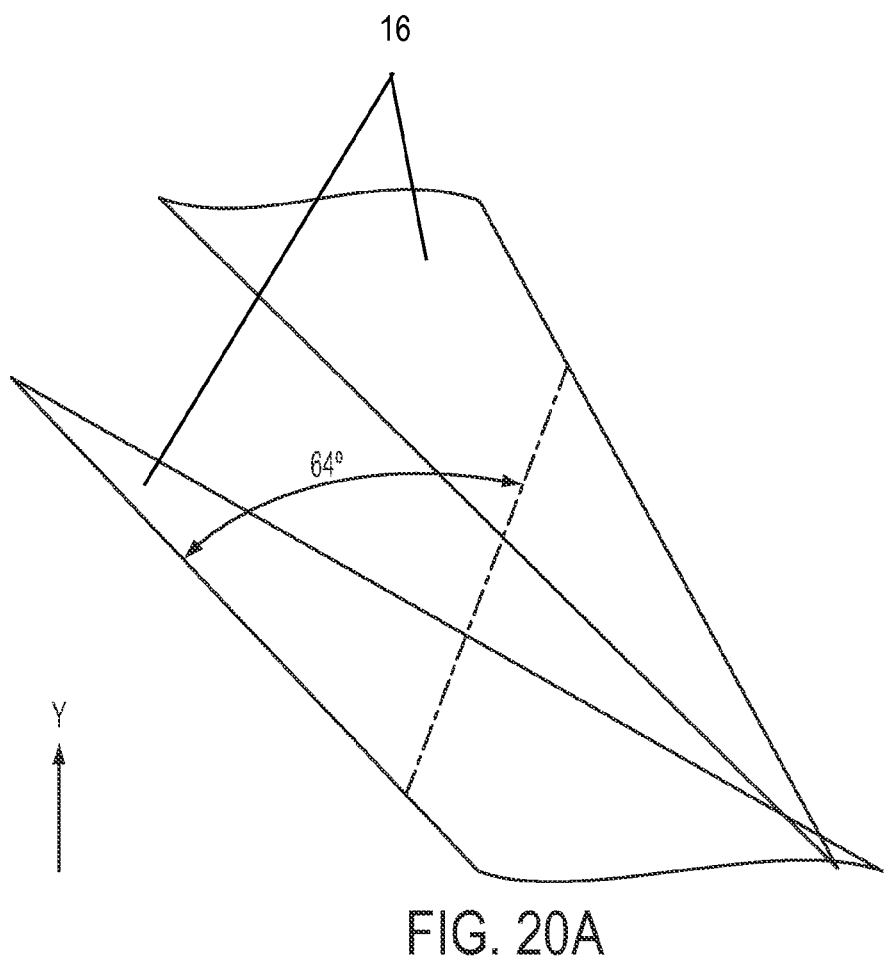
FIG. 20A is a close-up side view of the interaction between the profile fingers on the two shafts of FIG. 19.
Figure 20B:
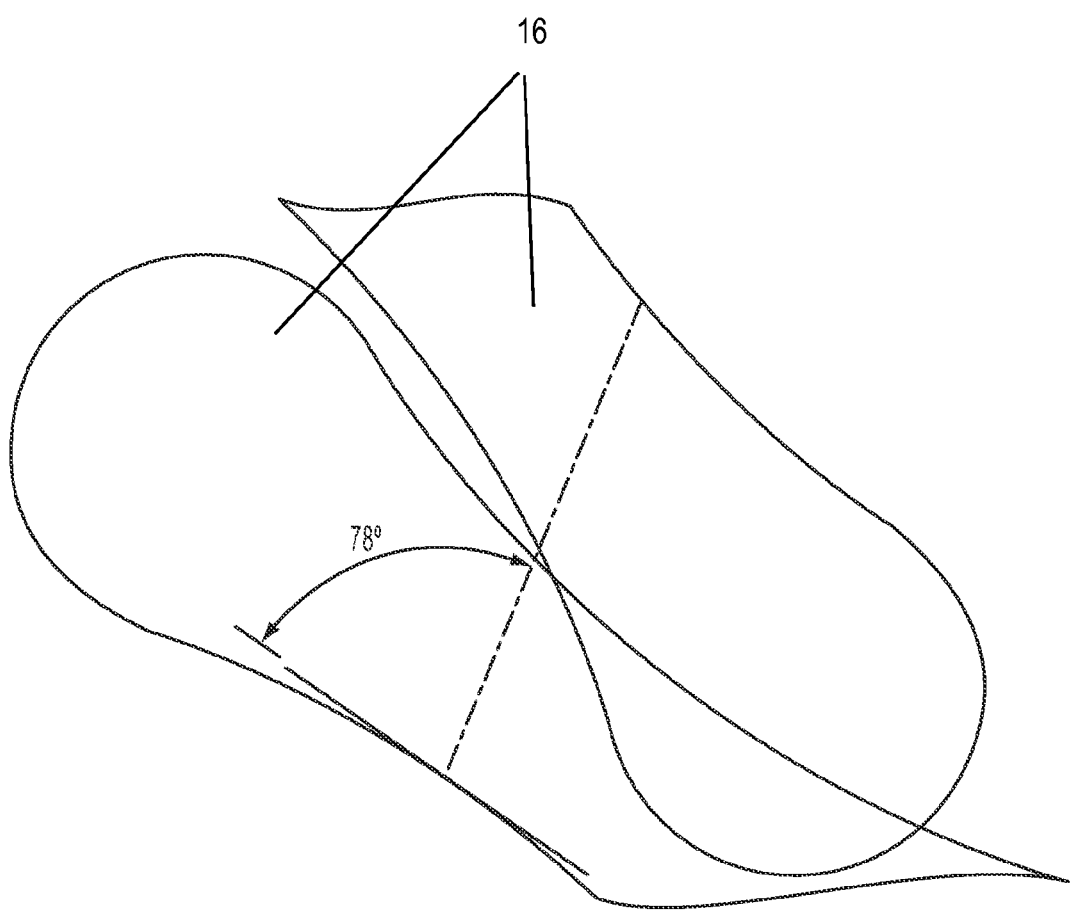
FIG. 20B is a close-up side view of an interaction between a paired set of curved fingers on two shafts of a selective shredding device, according to certain embodiments of the present invention.

Using non-profile fingers 16 (with a straight leading edge) within the selective shredding device 10 (overview shown in FIG. 19 with details in FIG. 20A) produces a tensional force on the components being shredded, where, at a defined point in the selective shredding process, the angle of plastic particle versus the finger is approximately 64 degrees. After reaching such an angle, which will depend on coefficients of friction, the components being shredded will slip from the finger and no further tension/tears/damage would occur. A further embodiment to this invention is to use curved fingers 16 with a radius, as shown in FIG. 20B. According to certain embodiments, the fingers 16 may comprise multiple radii on an outer surface, wherein any of the multiple radii on any of the fingers 16 may range from 0.001 micron to 100 mm. At the same defined point outlined in FIG. 20A, a larger angle of 78 degrees is achieved between the particle and the finger, thereby causing the particles to slide off the finger later in the finger rotational process and causing the selective shredding device 10 to have a higher throughput and/or efficiency.

Figure 21A:
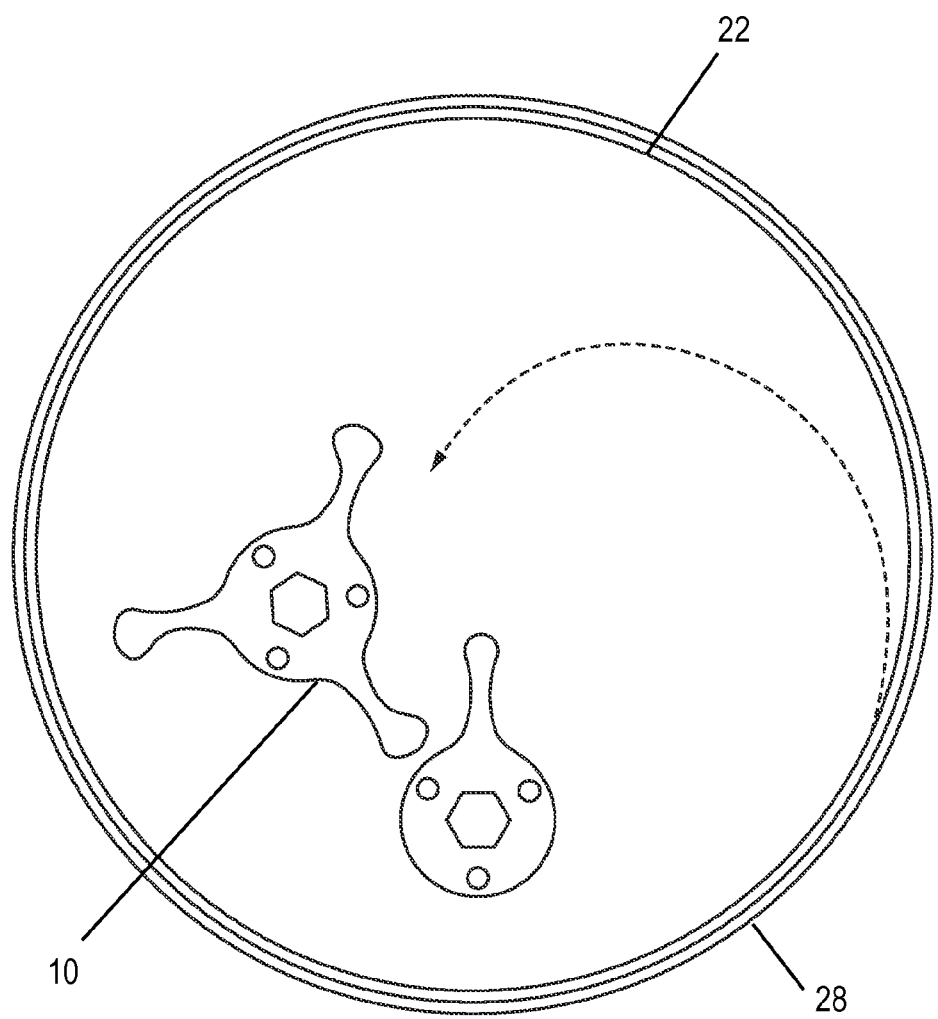
FIG. 21 A is a schematic illustration of a trajectory path of plastic components being thrown into a selective shredding device by a rotation of a revolving device, according to certain embodiments of the present invention.
FIG. 21B is a close-up side view of FIG. 21A, showing a location where the plastic components of FIG. 21 A typically stop after sliding down the fingers.
Figure 21B:
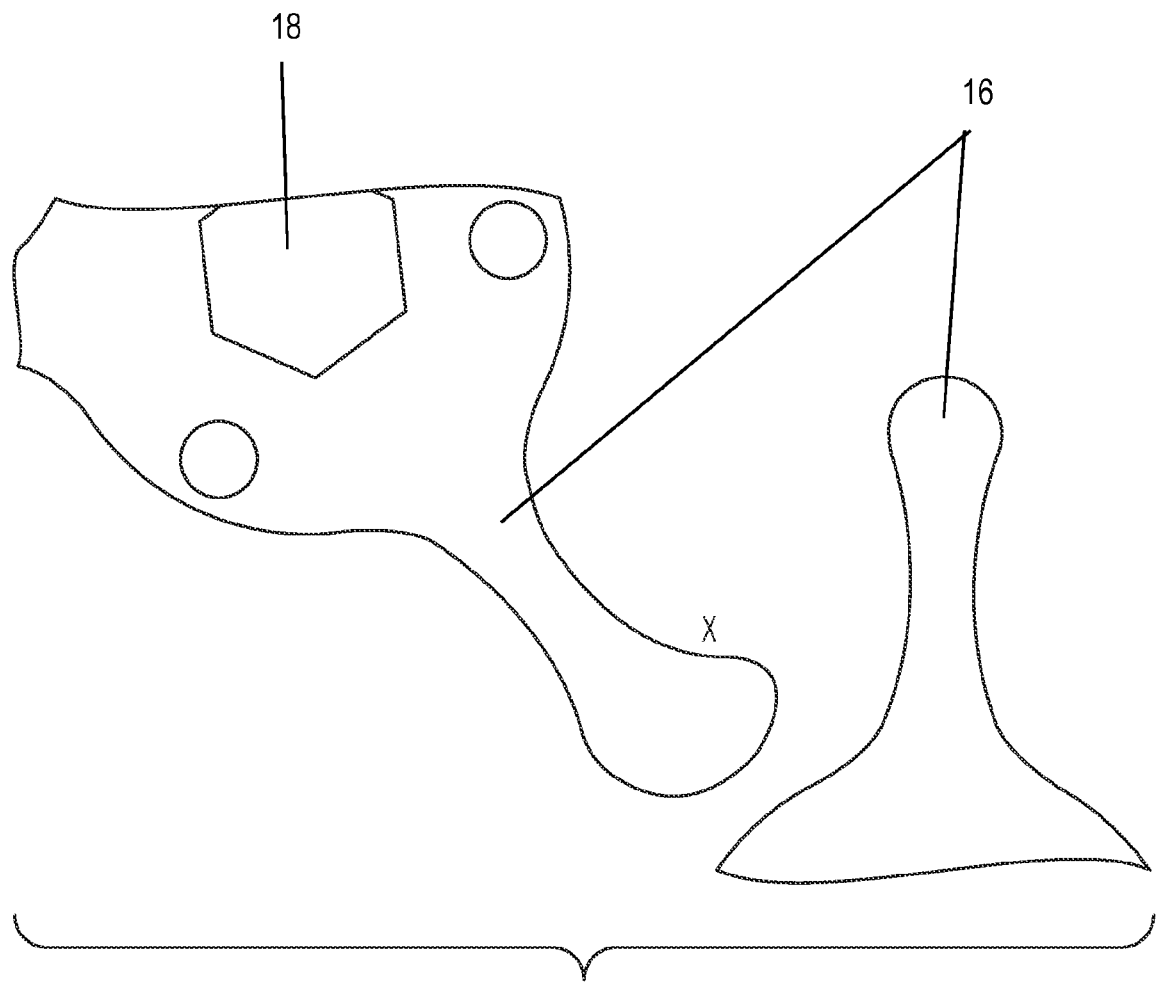

Another embodiment to the curved fingers 16 is to use the curved fingers 16 to hold plastic components 20 in position prior to the initial impact of the fingers 16. FIG. 21A shows a scenario where plastic components 20 are thrown from the revolving device 22 onto the fingers 16. As the fingers 16 continue to rotate, the plastic components 20 slide down the fingers 16, but would typically stop at point X shown in FIG. 21B, at which point, fingers 16 from the opposite shaft 18 would pass. This finger design ensures that more plastic pieces remain on the finger and in the collision path of the oncoming finger, thereby causing the selective shredding device 10 to have a higher throughput and/or efficiency.

Figure 22:
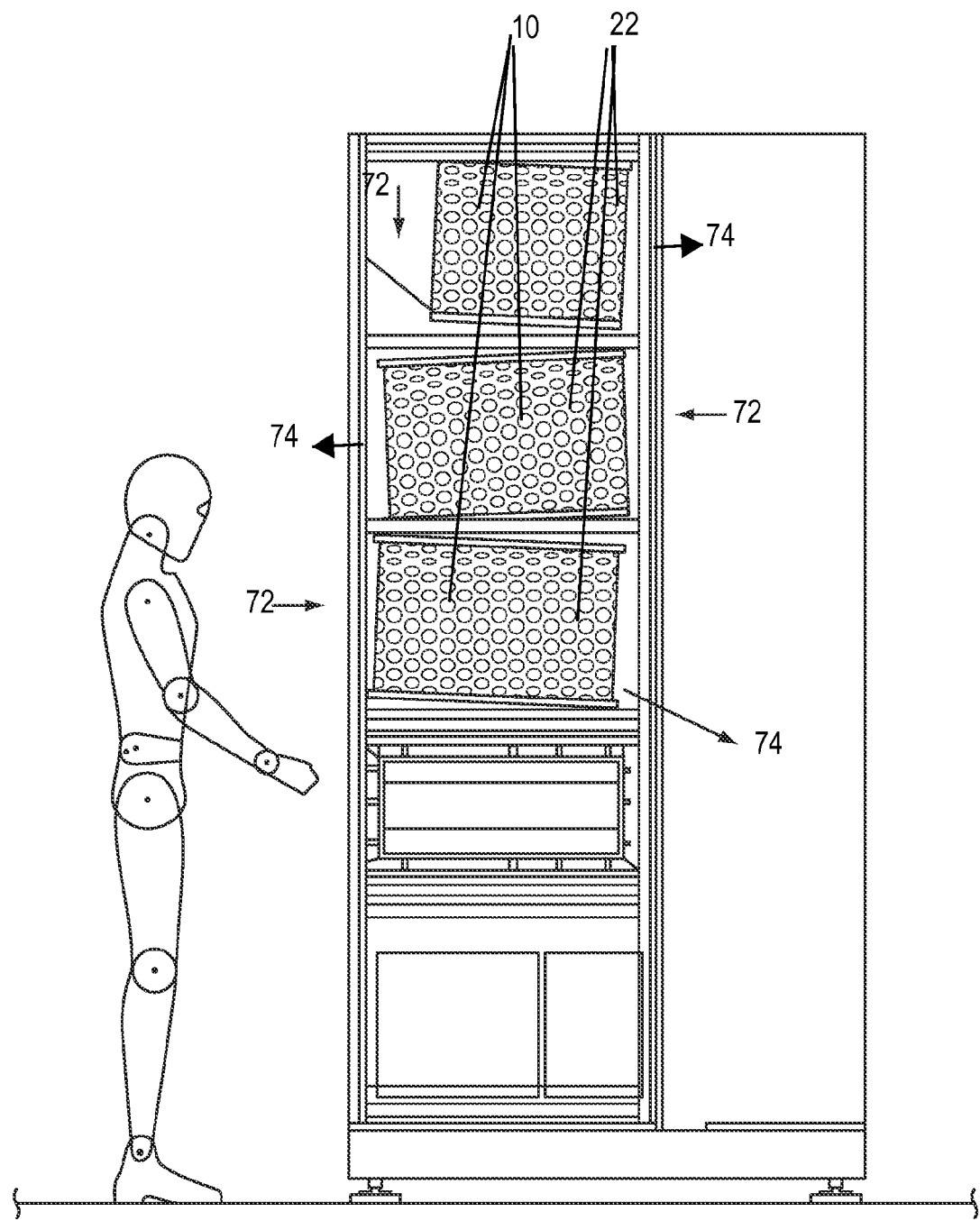
FIG. 22 is a side view showing a vertical stacking arrangement of selective shredding devices positioned within revolving devices, according to certain embodiments of the present invention.
Figure 23A:
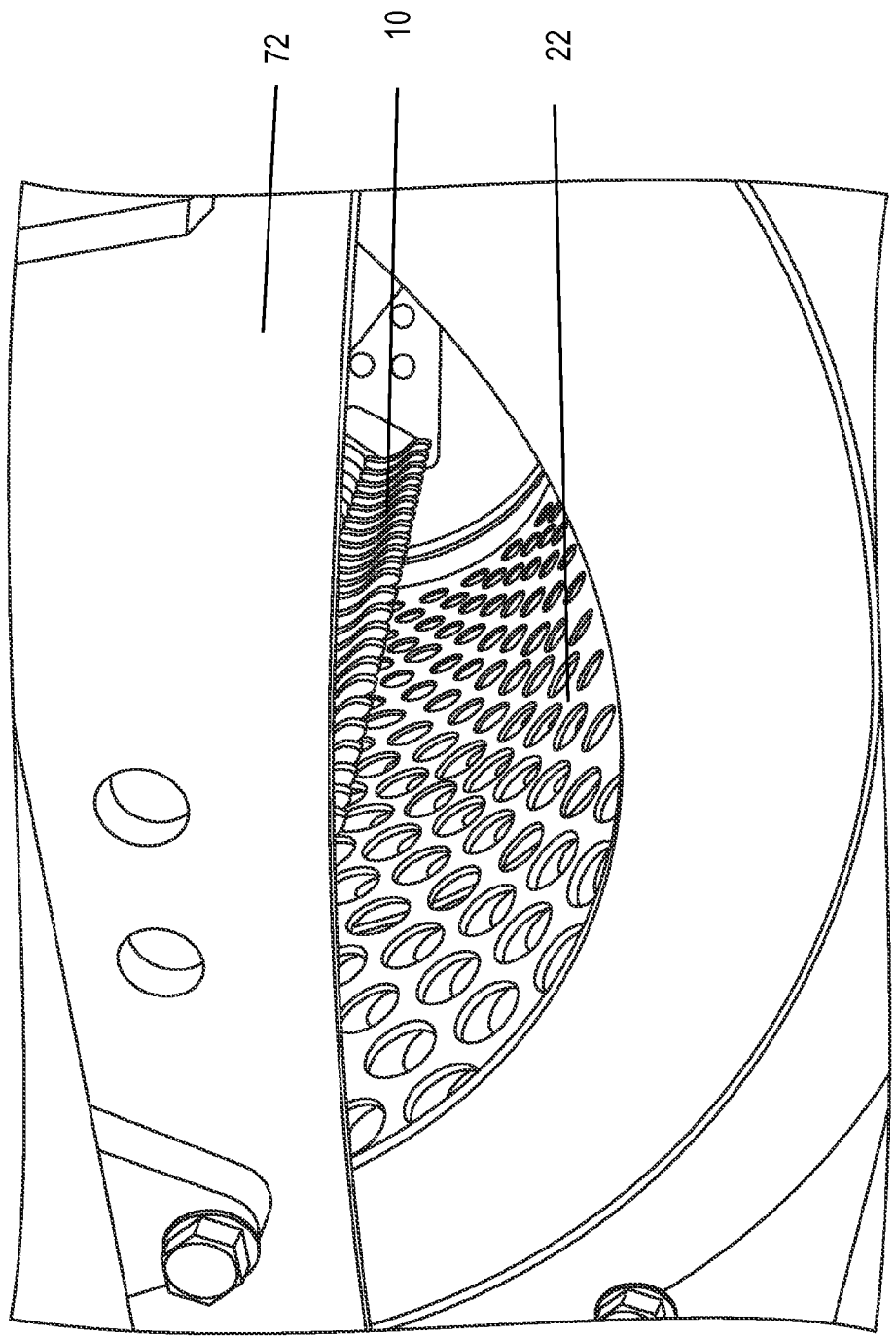
FIG. 23A is a perspective view of an entrance end of a revolving device with a selective shredding device positioned therein, according to certain embodiments of the present invention.
Figure 23B:
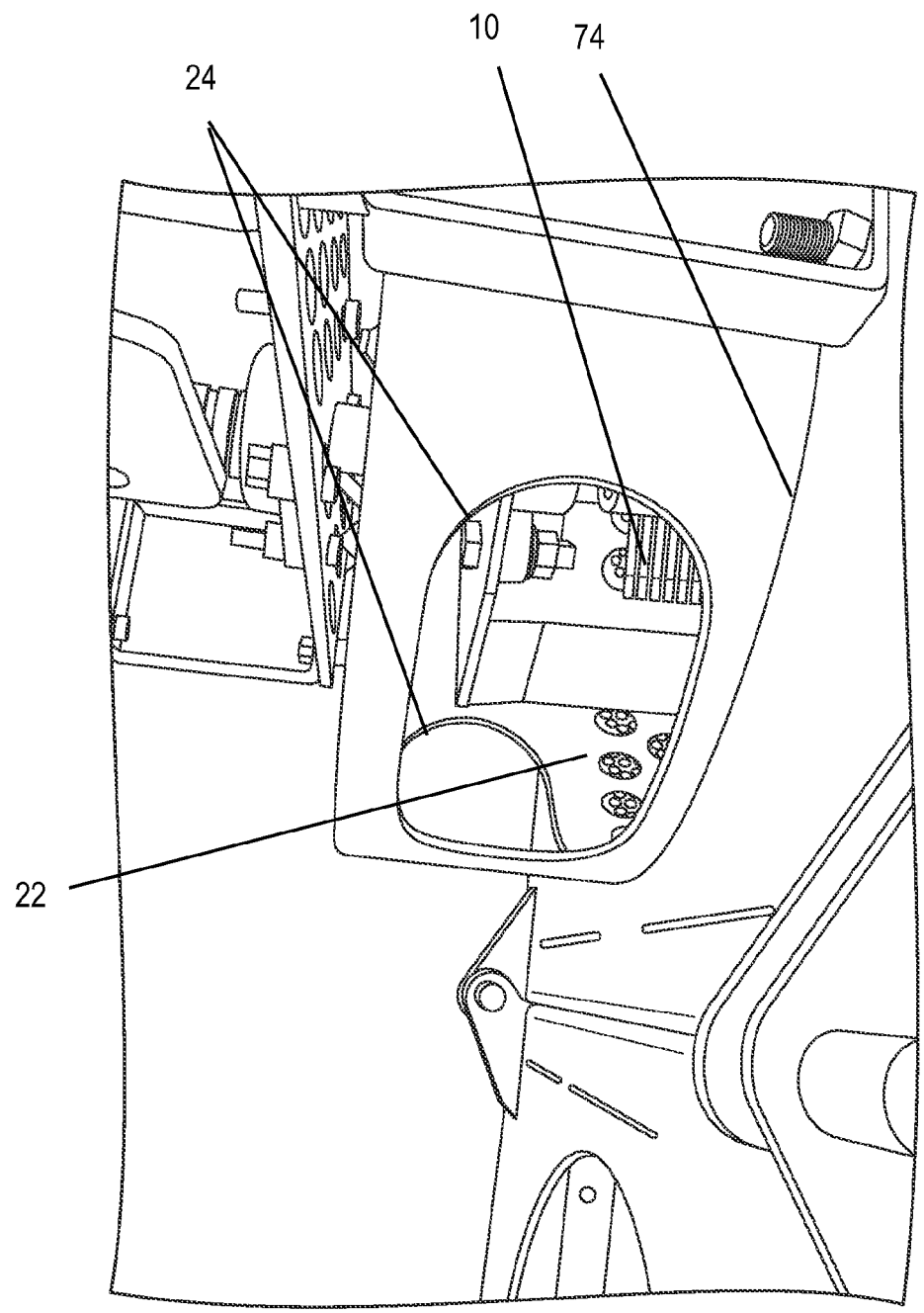
FIG. 23B is a perspective view of an exit end of a revolving device with a selective shredding device positioned therein, according to certain embodiments of the present invention.
Figure 23C:
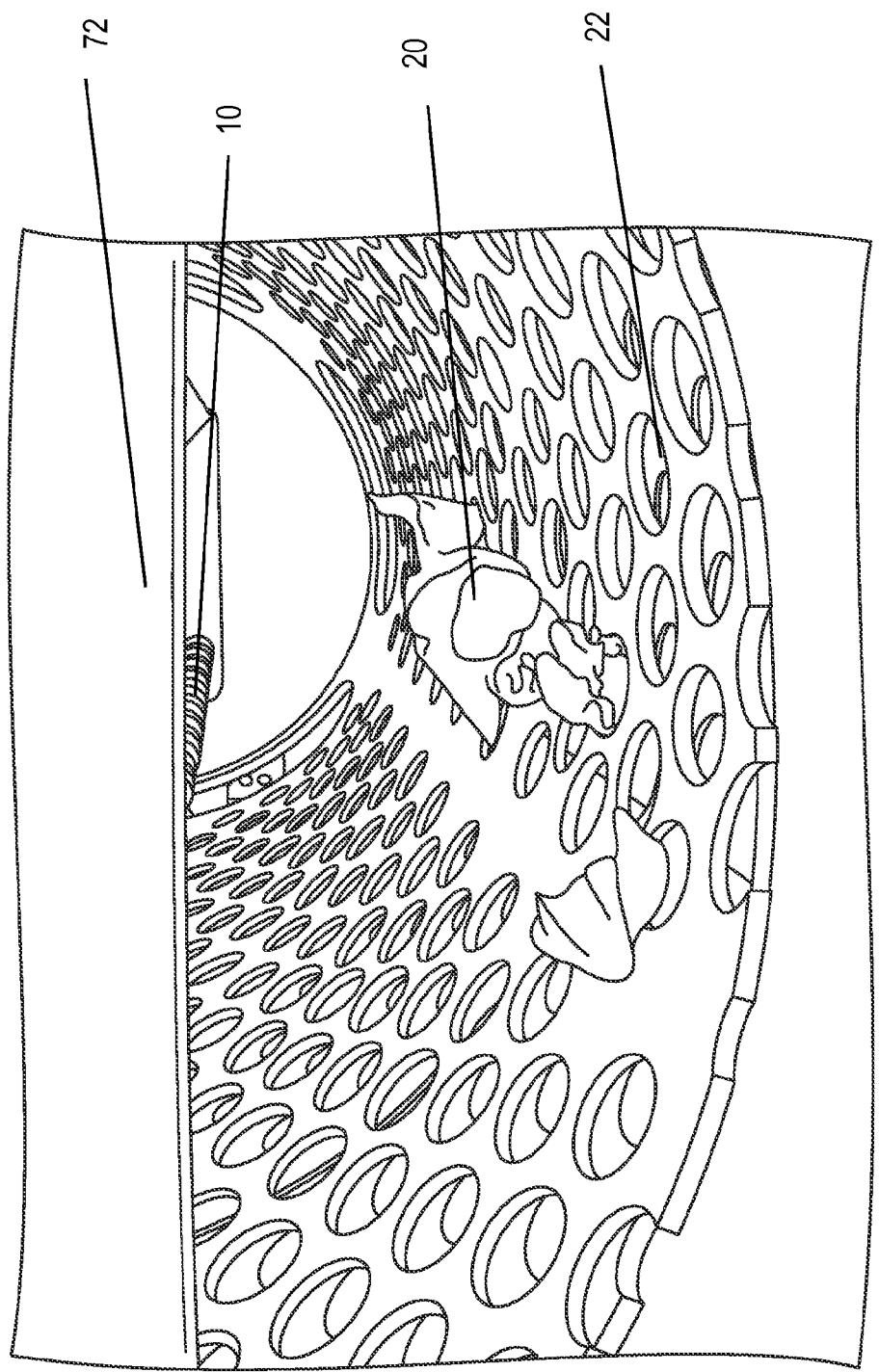
FIG. 23 C is a perspective view of an interior of a revolving device from an entrance end with a selective shredding device positioned therein, according to certain embodiments of the present invention.
FIG. 23D is a side view showing a vertical stacking arrangement of selective shredding devices positioned within revolving devices, according to certain embodiments of the present invention.
FIG. 23E is a perspective view of a first stage of a selective shredding device within a revolving device, according to certain embodiments of the present invention.
Figure 23D:
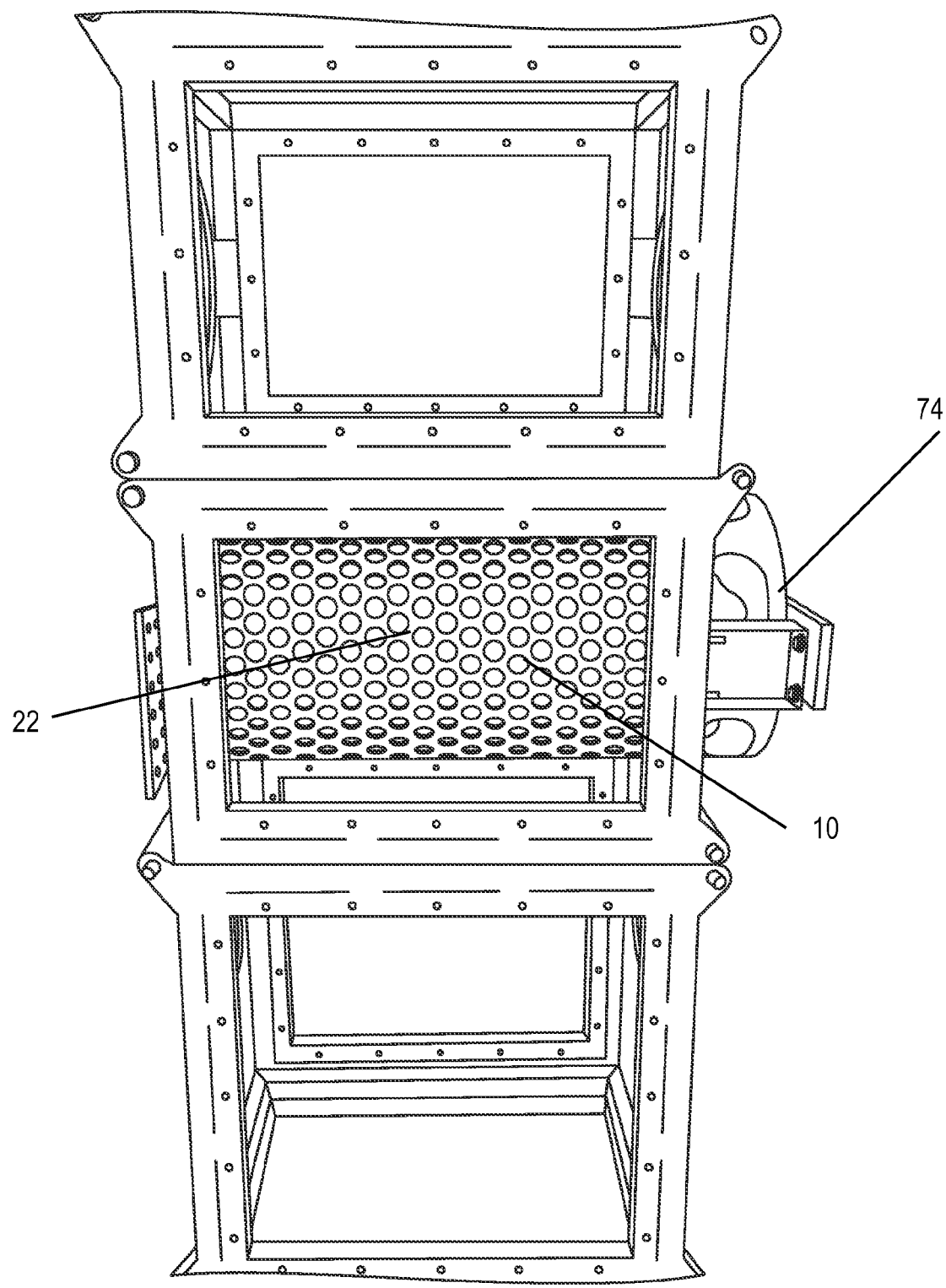

In certain embodiments, as illustrated in FIG. 22, the revolving device 22 (and/or the shredding device within the revolving device 22) may be configured so that the hygiene product 12 enters the revolving device 22 at one end 72 and exits at an opposite end 74. The revolving device 22 (and/or the shredding device within the revolving device 22) may be angled so that the entrance end 72 is higher than the exit end 74. The amount of angle between the entrance end 72 and the exit end 74 of the revolving device 22 may be adjustable relative to a plane of a floor a pre-set fixed position, or may be automatically adjusted using an electrical, hydraulic, pneumatic, or other suitable mechanical device in response to throughput supply requirements from a hygiene product production process 42 (such as an incoming flow signal from a diaper converter) to control throughput speeds of the hygiene products 12 or pieces of hygiene products 12 within the revolving device 22. FIG. 23A represents a view of the entrance end 72 of the revolving device 22. FIG. 23B represents a view of the exit end 74 of the revolving device 22, which has a large hole diameter size to allow larger flows to exit the cylinder. FIG. 23 C represents a view of the interior of the revolving device 22 from the entrance end 72 of the revolving device 22. FIG. 23D shows the concept of revolving devices 22 placed in a vertical orientation, with FIG. 23E showing the first stage of the selective shredding device 10 and sieving combination process in operation.

Figure 23E:
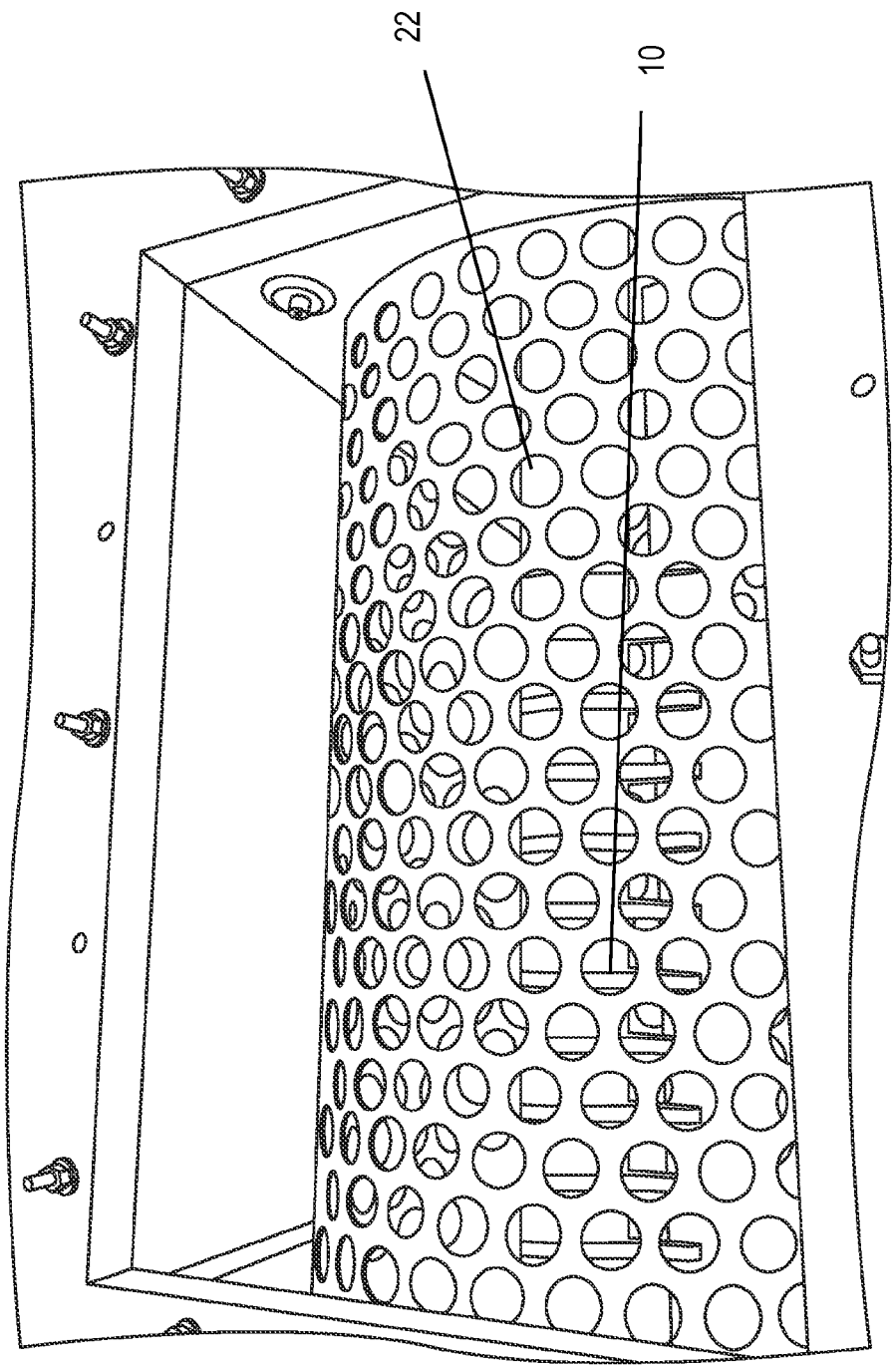

As illustrated in FIGS. 16, 23D, and 23E, the revolving device 22's circumferential surface 28 may include a plurality of apertures 26 that are configured in size and shape to allow pieces or components or sub-assemblies of the hygiene products 12, such as pulp that has been separated from the plastic component 20, to pass through. In certain embodiments, the number of apertures 26 may range from 1 to 1,000,000,000,000,000,000. Because the selective shredding device 10 is configured to produce plastic components 20 of a desired size, the apertures 26 in the circumferential surface 28 may be designed to be smaller than the resulting plastic components 20, thus preventing the plastic components 20 from passing through the circumferential surface 28 and mixing with the separated pulp. In the embodiments shown in FIGS. 16, 23D, and 23E, the apertures 26 are approximately 30 mm diameter. However, smaller or larger apertures 26 may be used as desired, depending at least upon the size of the plastic components 20 and the pulp to be separated. For example, the apertures 26 may be any suitable size ranging from 1 micron to 1,000 meter (1,000,000,000 microns) in diameter. Also, screens may be included within the revolving device 22 or outside of the revolving device 22 to reduce the size of the apertures as needed.

In certain embodiments where multiple shredding processes are used, depending on equipment design, enlarged holes 24 at the exit end 74 of each revolving device 22 may be included to allow the plastic components 20 to exit the revolving device 22, wherein these holes 24 may be approximately 5 times the size of the apertures 26 in the circumferential surface 28 of the revolving device 22, but could range between 1-10,000 times the size of such apertures 26. Examples of these holes 24 are shown in FIG. 10.

The gap between horizontally adjacent fingers 16 positioned along the length of the rotating shafts 18 may reduce in relation to the size of the apertures 26 on the circumferential surface 28. As discussed in more detail above, the aperture 26 size may decrease in relation to the distance between the fingers 16 and the particle size. The size of the apertures 26 on the circumferential surface 28 can be set to any desired configuration, however, the size of the apertures 26 may progressively decrease in relation to the process steps, wherein the shredding process becomes coarser, i.e., the fingers 16 become closer together.

The angle of the revolving device 22 from end to end may be adjusted as needed to control the speed at which the hygiene product 12 and plastic components 20 pass through the revolving device 22 and, ultimately, the number of times the plastic components 20 are passed through the selective shredding device 10. The angle may be set to allow the plastic components 20 to pass 400-600 times through the selective shredding device 10 but could range between 1 and 45,000 times.

Housing the selective shredding device 10 within the revolving device 22 also saves transportation equipment and energy costs related to transportation of the materials, as not only does the revolving device 22 act as a transportation device, the distance between the shredding process (i.e., the selective shredding device 10) and sieving process (i.e., the revolving device 22) is only a few millimeters as compared to typical central recycling systems today where they can be located 10-20 meters apart.

In certain embodiments, to allow the differential speeds to be created between the 2 shafts 18 to allow cleaning as described earlier in this application, typically, a single motor would be used per shaft 18, as opposed to connecting the shafts 18 with a gear/cog combination. As the shafts 18 rotate at different speeds, whenever plastic is being damaged (i.e., friction is being applied between the plastic and fingers 16), the shaft 18 that is rotating faster than the slower shaft 18 (i.e., the faster shaft 18), is typically trying to accelerate the slower shaft 18. As such, the slower shaft 18 would be braking, instead of rotating the shaft 18, and as such, if a motor was used to generate electricity, then this electricity could be stored in a storage device, such as capacitor, or battery, or any other storage device, or, passed directly back onto the electrical system of the selective shredder device 10 to reduce energy consumption.

Figure 28:
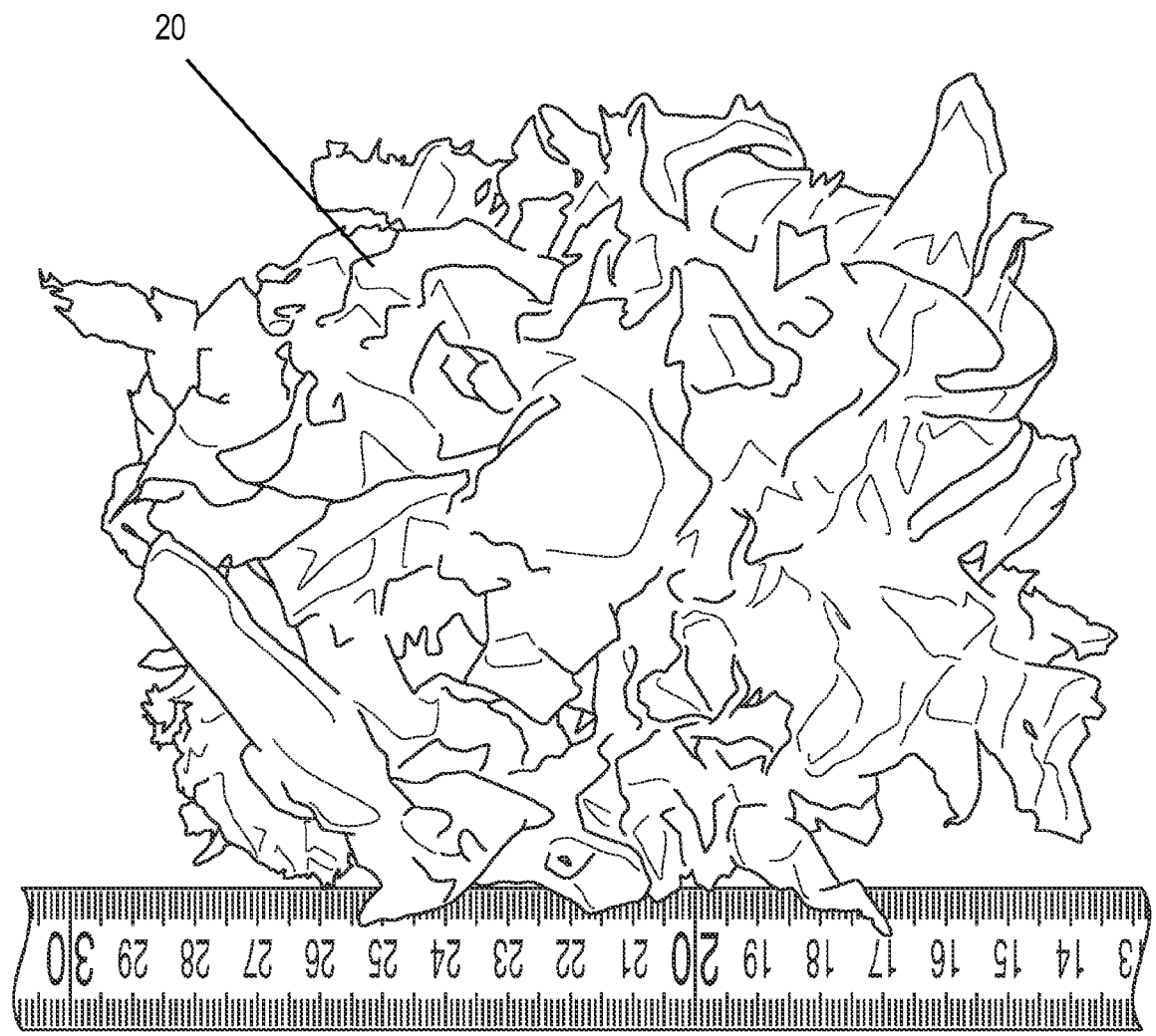
FIGS. 28-30 are schematic illustrations of plastic components exiting a selective shredding device, according to certain embodiments of the present invention.
Figure 29:
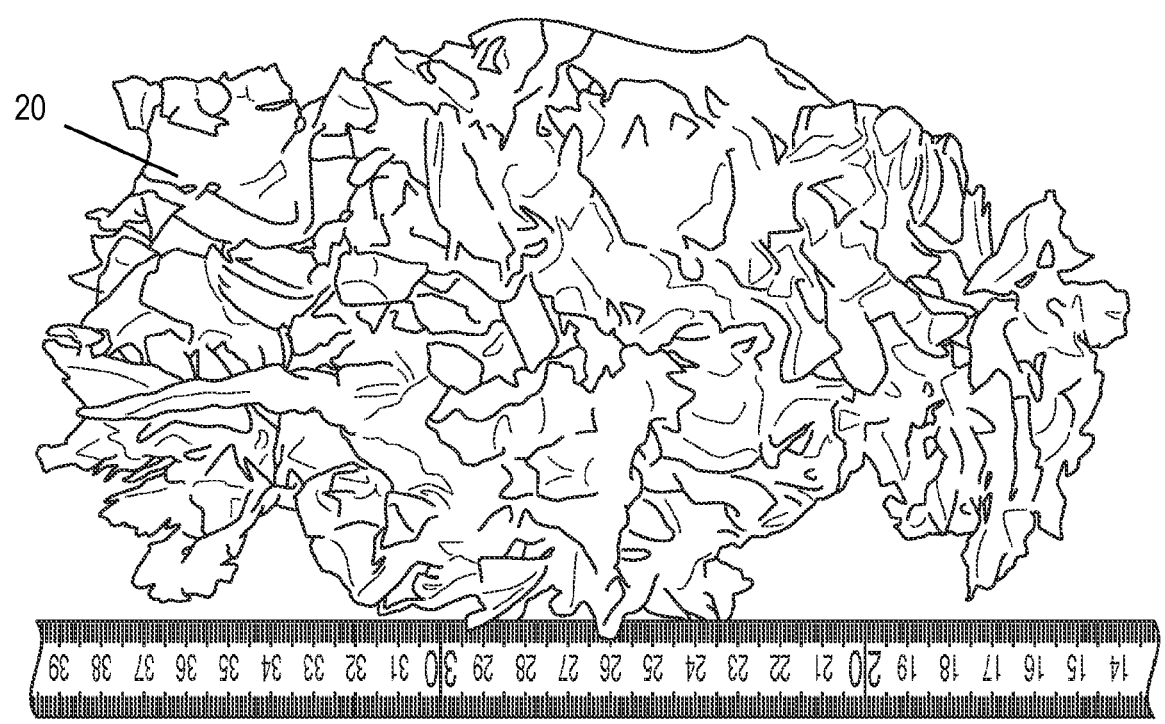
Figure 30:
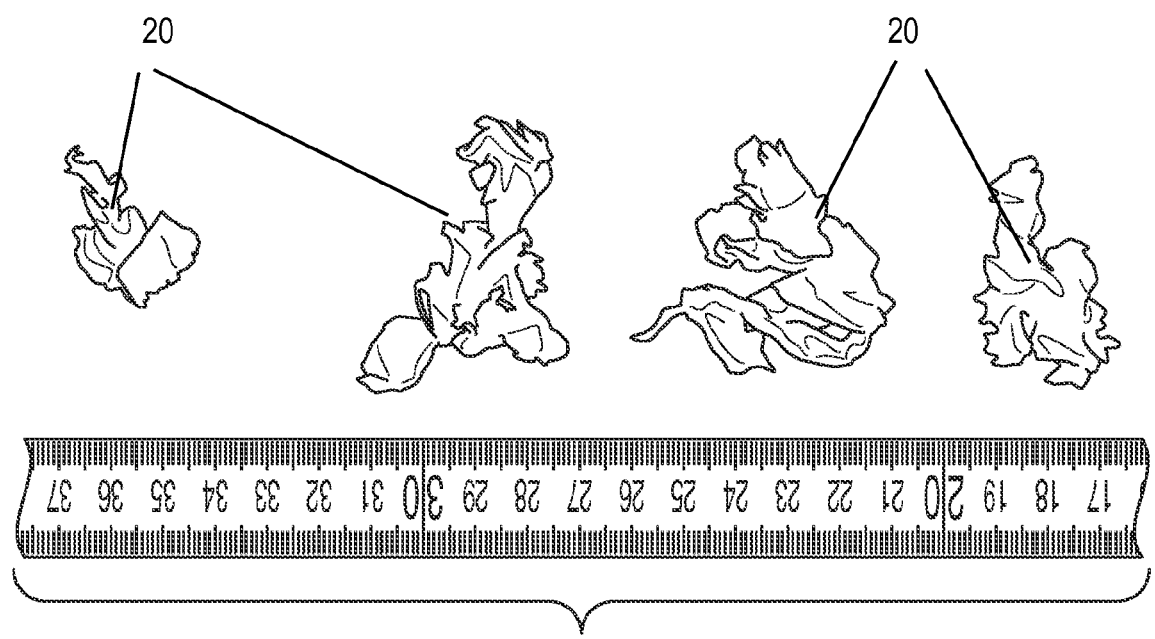

As examples, FIGS. 28-30 illustrate plastic components 20 exiting a selective shredding device 10, wherein the shredded size of the plastic components 20 is smaller and has a more consistent size.

Figure 31:
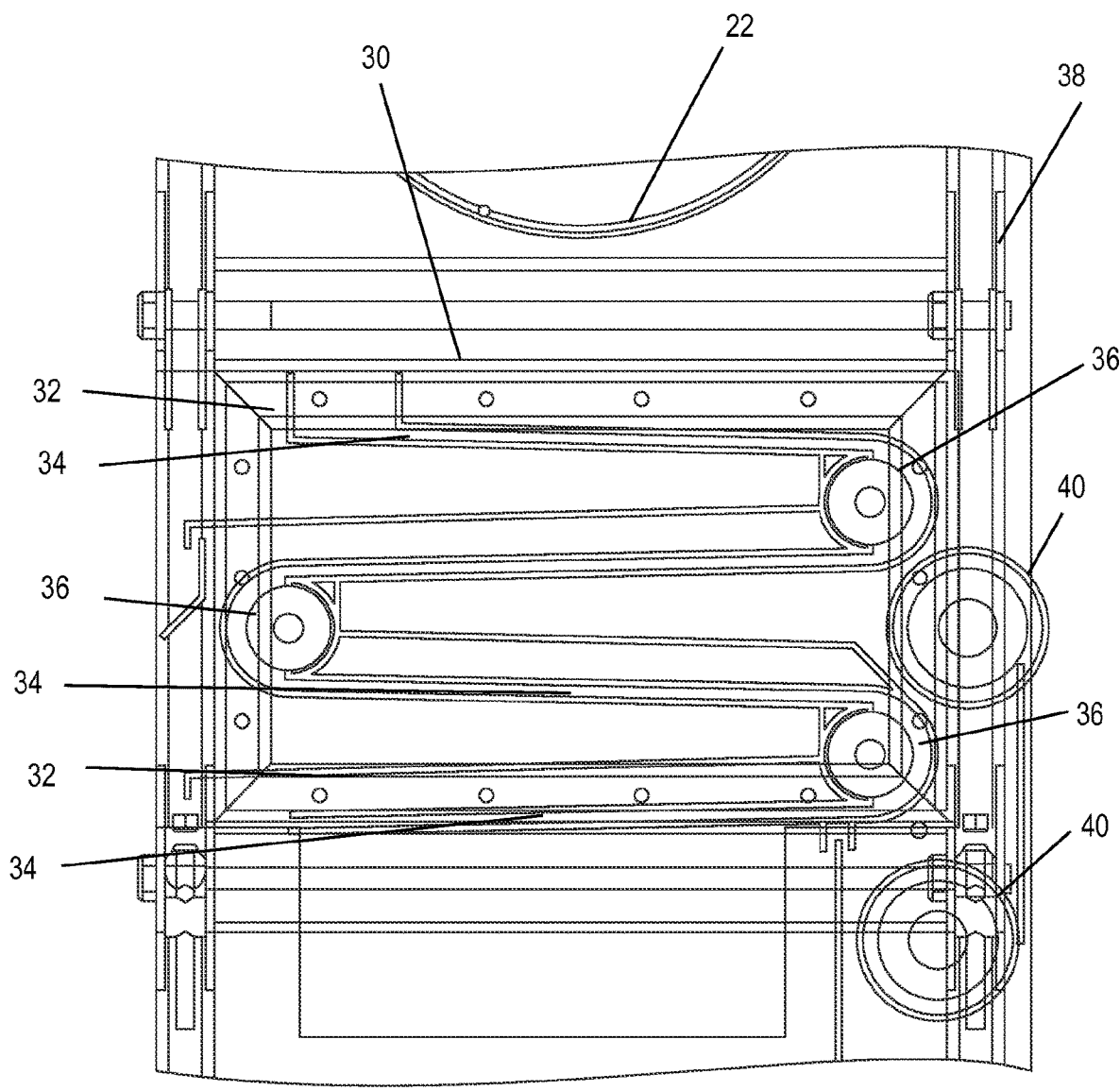
FIG. 31 is a front view of a vibration device that may be used in conjunction with a selective shredding device, according to certain embodiments of the present invention.

In certain embodiments, the pulp that passes through the circumferential surface 28 of the revolving device 22 may be collected and sent through a separator to separate SAP from pulp fibers. FIG. 31 illustrates certain embodiments where a vibration device 30 is used to separate the SAP from the pulp. The pulp/SAP mixture enters at the top of the vibration device 30 and is placed on a vibratory screen 32 having small apertures in the surface to allow the SAP granules to pass through. The SAP granules are separated from the pulp through vibration of the vibratory screen 32. When the pulp reaches the end of a first platform 34, the pulp may pass over a scarfing roll 36 or multiple rotating shafts 18 with multiple fingers 16 on each shaft 18, which may not be connected to the vibration device 30. The scarfing rolls 36 and/or finger rolls 18 may rotate at a high speed (between and 50,000 rpm) with the purpose of opening up any closed or compressed pulp fibers to release any trapped SAP within the fibers. Following the scarfing roll 36, the pulp may then be deposited on one or more additional vibratory screens 32 to separate additional SAP from the pulp via vibration of the vibratory screens 32, where additional scarfing rolls 36 may be positioned between vibratory screens 32. The vibration device 30 typically exerts a force on materials passing across the vibratory screens 32 of less than 4 G, but could be configured to apply between 0.1 and 10 G and may vibrate with a frequency of between 1 and 10,000 hertz.

The plastic components 20 coming from the central feed of revolving devices 22 may be collected and passed into outer casings 38 which may have one or more auger screws 40 rotating therein, wherein the outer casings 38 surrounding the auger screws 40 have perforations across circumferential surfaces, wherein the diameter of the perforations may range from 1 to 30,000 microns, and may be of approximately 800 micron. The auger screws 40 may rotate at a slower speed (approximately 60 rpm or more and typically set between 1 and 25,000 rpm) and may have brushes attached to a circumferential surface or outer rim thereof. The auger screws 40 operate as a final pass to separate the SAP from the plastic. The auger screws 40 may also not be connected to the vibration device 30. In other embodiments, the outer casing 38 surrounding the auger screws 40 vibrate with the vibration device 30, typically exerting a force on materials passing across the vibratory screens 32 of less than 4 G, but could be configured to apply between 0.1 and 10 G and may vibrate with a frequency of between 1 and 10,000 hertz.

In other embodiments, the device to vibrate the vibratory screen 32 and the outer casing 38 surrounding the auger screws 40 may be carried out using the same vibration device 30.

In other embodiments, in addition to or as an alternative to the vibration device 30 described above, the revolving device 22 may apply an additional centrifugal force to the pulp to separate the pulp from the SAP. For example, a revolving device 22 of diameter 400 mm and rotating at 3000 rpm exerts a force of 2012 G onto particles within the revolving device 22. If the outer surface of the revolving device 22 includes approximately 800 micron apertures 26, then pulp fibers remain in the revolving device 22, while heavier SAP particles are expelled from the revolving device 22 through the apertures 26.

In certain embodiments, the revolving device 22 may be driven by servo drive motors and may have a capacitor or battery device which can be used to save and re-used energy which is recovered in the braking of the revolving device 22. In these embodiments, if the revolving device 22 is accelerated to 3000 rpm for 2 seconds, but could also be between 1-1,000,000 milliseconds, then decelerated to 65 rpm for 3 seconds, but could also be between 1-1,000,000 milliseconds, then accelerated back to 3000 rpm for 2 seconds, but could also be between 1-1,000,000 milliseconds, and so forth, then energy may be recovered during the braking process, stored in the capacitors, and used to re-accelerate the revolving device 22. This energy storage method allows the overall process to consume a very small amount of electricity. The revolving device 22 (and thus its rotational axis) may be positioned in a non-horizontal axis at an angle to a horizontal axis, say 5 degrees, but could set between 0 and 90 degrees, which would-allow hygiene products 12 or pieces of hygiene products 12 to be transported along the rotational axis of the revolving device 22.

In certain embodiments, the revolving device 22 (and thus its rotational axis) may be positioned in a non-horizontal axis at an angle to a horizontal axis oriented between +4 degrees to −4 degrees relative to a horizontal axis and between +90 degrees to −90 degrees at a rotational speed, wherein rotation of the revolving device 22 creates a force between 0.0001 G and 1 G on an inner surface of the revolving device 22, wherein an air stream passes through the revolving device 22 between 0.0001 meters per second up to 10,000 meters per second, wherein a stream of SAP and dust particles are passed into the revolving device 22 and the dust particles are removed from the revolving device 22 via the air stream passing through the revolving device 22.

Figure 17:
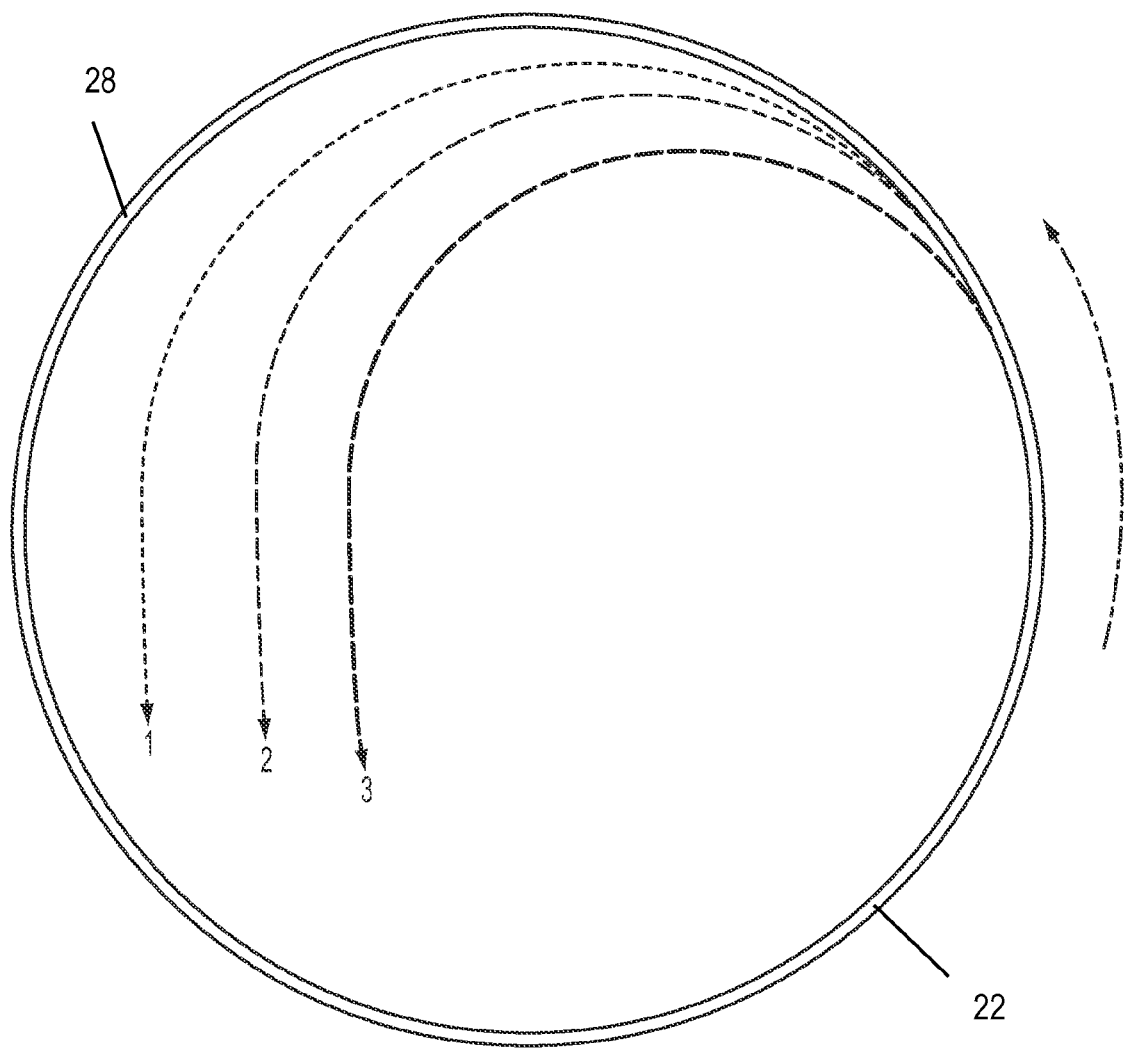
FIG. 17 is a schematic illustration of the paths of SAP, plastic, and pulp within a revolving device, according to certain embodiments of the present invention.

As part of the above mentioned process, when the revolving device 22 is running at 65 rpm, then only 0.94 G is exhibited on the particles in the revolving device 22 and as such, the particles do not stay in contact with the inside surface of the revolving device 22 for 360 degrees of rotation. Instead, the particles become airborne at a certain position. Once airborne, particles of same unit mass travel a certain distance related to their air resistance. For example, SAP has a lower air resistance than pulp, and therefore is thrown a further distance than the pulp fibers. This automatically brings pulp to the inside of the rotating particles in the revolving device 22 and the SAP fibers to the outside. FIG. 17 illustrates examples of flight paths of the materials, where arrow 1 inside the revolving device 22 closest to the circumferential surface 28 represents a SAP trajectory, and arrow 3 inside the revolving device 22 closest to the center of the revolving device 22 represents a pulp trajectory. The arrow outside the revolving device 22 represents the direction of rotation at approximately 65 rpm. Arrow 2 illustrates that agglomerated particles of pulp would follow a flight path in between the SAP trajectory and the pulp trajectory shown in FIG. 17.

Figure 17A:
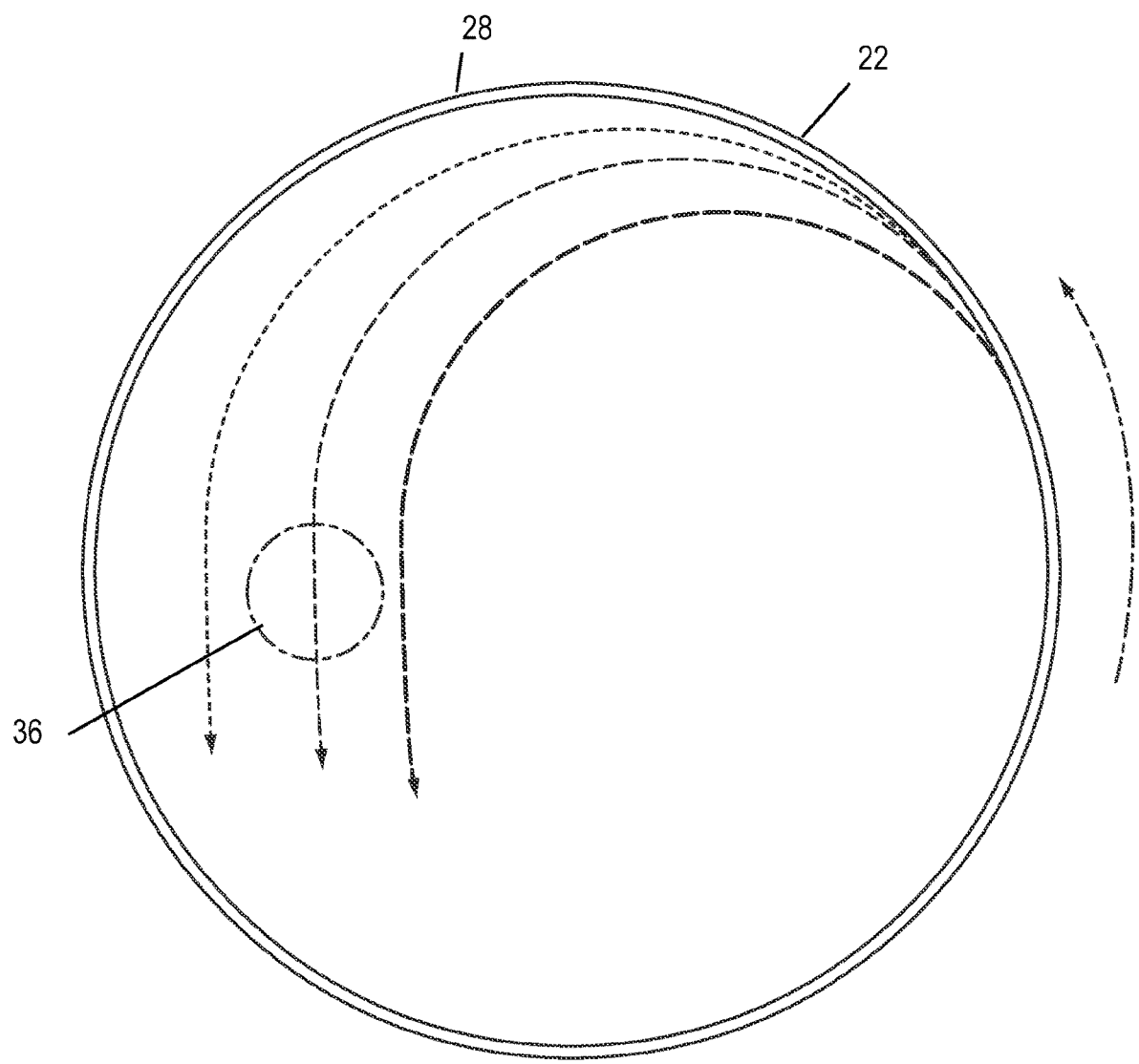
FIG. 17A is a schematic illustration of the paths depicted in FIG. 17, along with a scarfing roll positioned within the revolving device.

As shown in FIG. 17A, one or more scarfing rolls 36 (a device rotating at high speed (say ~1000 rpm, but could between 1 and 100,000 rpm) with a rough surface) may be positioned inside the revolving device 22 in a location that is aligned with the agglomerate pulp trajectory, but is substantially outside the SAP and pulp trajectories. The agglomerated pulp particles that contact the scarfing roll 36 would then open and release the trapped SAP. Once the agglomerated pulp particles have opened, the opened pulp particles will then follow the pulp trajectory and the freed SAP particles will follow the SAP trajectory, thus avoiding further damage by not contacting the scarfing roll(s) 36.

Air inlets may also be included within in the revolving device 22, or, pneumatic braking devices may be installed in the revolving device 22 to reduce the rotary impact to the air within the drum caused by the rotation of the revolving device 22.

In certain embodiments, a vibratory mechanism may be coupled to the revolving device 22 to vibrate the revolving device 22 on any one of the shedding processes or the SAP/Pulp separation process. The vibration of the revolving device 22 may serve to transfer pulp away from the particles, thus further improving SAP separation percentage.

An inlet valve/tap may also be included to prevent new product from entering the revolving device 22 while the revolving device 22 is rotating at 3000 rpm.

Additionally, vulcanized silicon coating or other similar materials may be applied to the outer and/or inner surface of the device that surrounds the revolving device 22. This coating has non-stick properties and offers a cushioning effect so that any SAP hitting the vulcanized silicon material would be far less damaged compared to SAP hitting a hard metal surface. Other materials such as PTFE, anti-stick, and low coefficient of friction materials may also be used.

As a result, the selective shredding device 10 system may have the capability of separating an extremely high percentage of SAP from pulp so as to produce a pulp recycle stream that is substantially free of plastic components 20 and trapped SAP particles.

Figure 32:
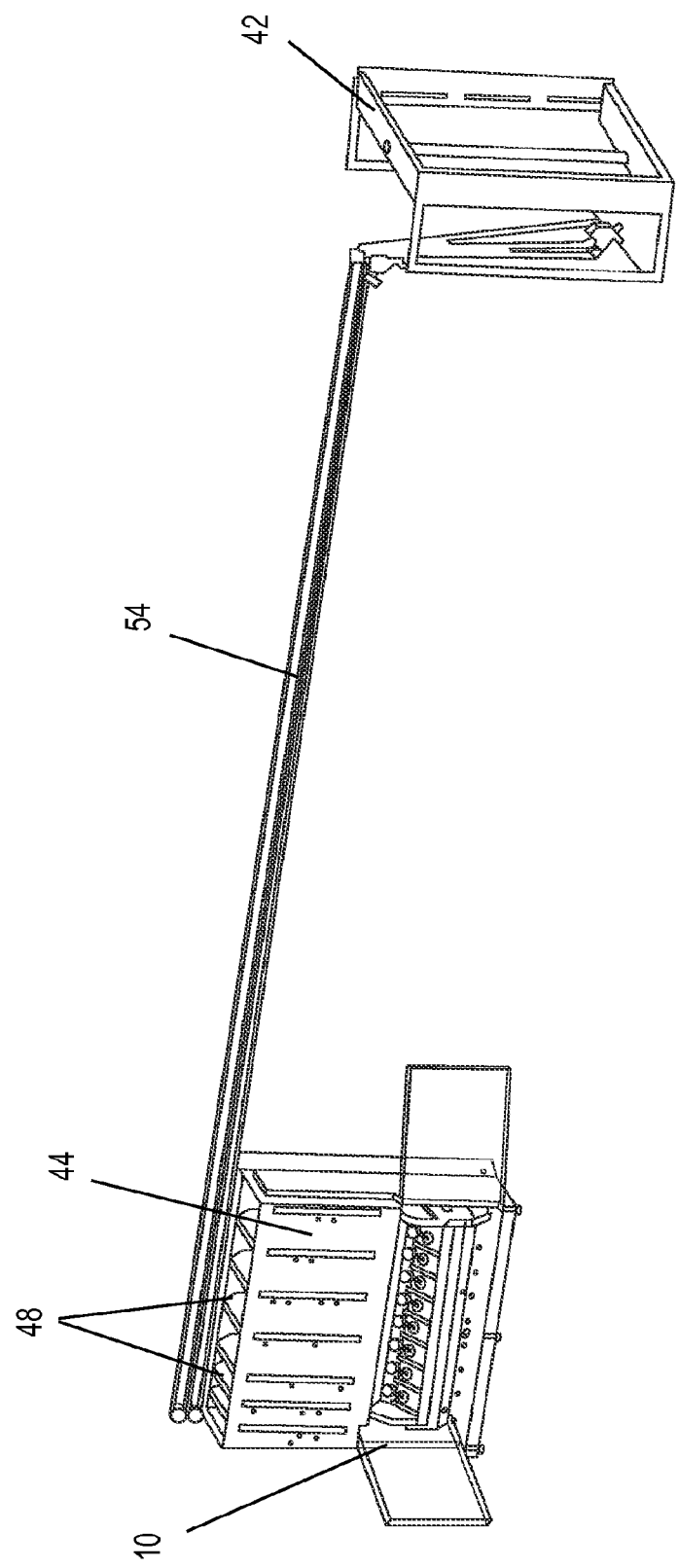
FIG. 32 is a perspective view of an in-line selective shredding device and a hygiene product buffer device connected to a disposable hygiene production process, according to certain embodiments of the present invention.

According to certain embodiments, an in-line selective shredding device 10 may be connected to a disposable hygiene production process 42 with air, or, with a conveyor 54 as shown in FIG. 32. The direct attachment of the selective shredding device 10 to the disposable hygiene production process 42 may not be desirable as reject rates are not consistent and as such, the downstream shredding and sieving processes would have to have a very large capacity, furthermore, pulp re-feed rates would also not be constant. By adding a hygiene product buffer device 44 combined with a continuous or semi continuous re-feed process between the disposable hygiene production process 42 and the selective shredding device 10 allows all processes downstream of the hygiene product buffer device 44 to be sized according to average throughput capacities and also maintains constant pulp and SAP re-feed quantities. For example, in certain embodiments, a hygiene product diverting device may be located between the hygiene product buffer device 44 and the hygiene product production process 42. In some cases, it may be desirable to track when the recycled products were made as a mechanism to troubleshoot problems with the disposable hygiene product production process 42 so the addition of the hygiene product buffer device 44 also has secondary benefits. If all hygiene products 12 were fed directly into the selective shredding device 10, then should any problem occur with the hygiene product production process 42, there would be no opportunity to go back and look at past product to understand from which point problems occurred without destroying good already-packaged products.

Figure 37A:
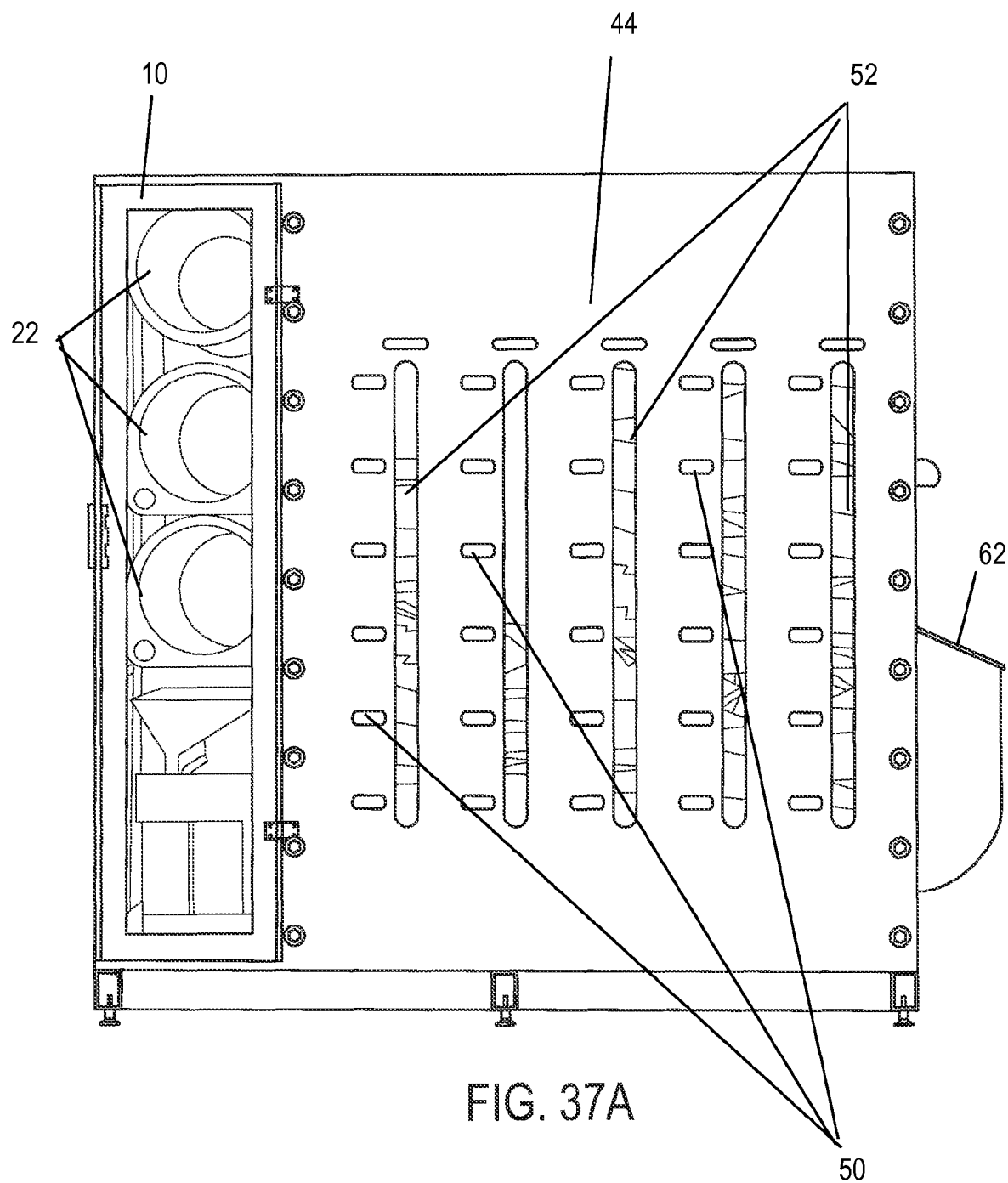
FIG. 37A is a front view of the a hygiene product buffer device coupled to a three-stage selective shredding device that includes the centrifugal separation design of FIG. 36, showing the location of time displays for the chambers.
Figure 37B:
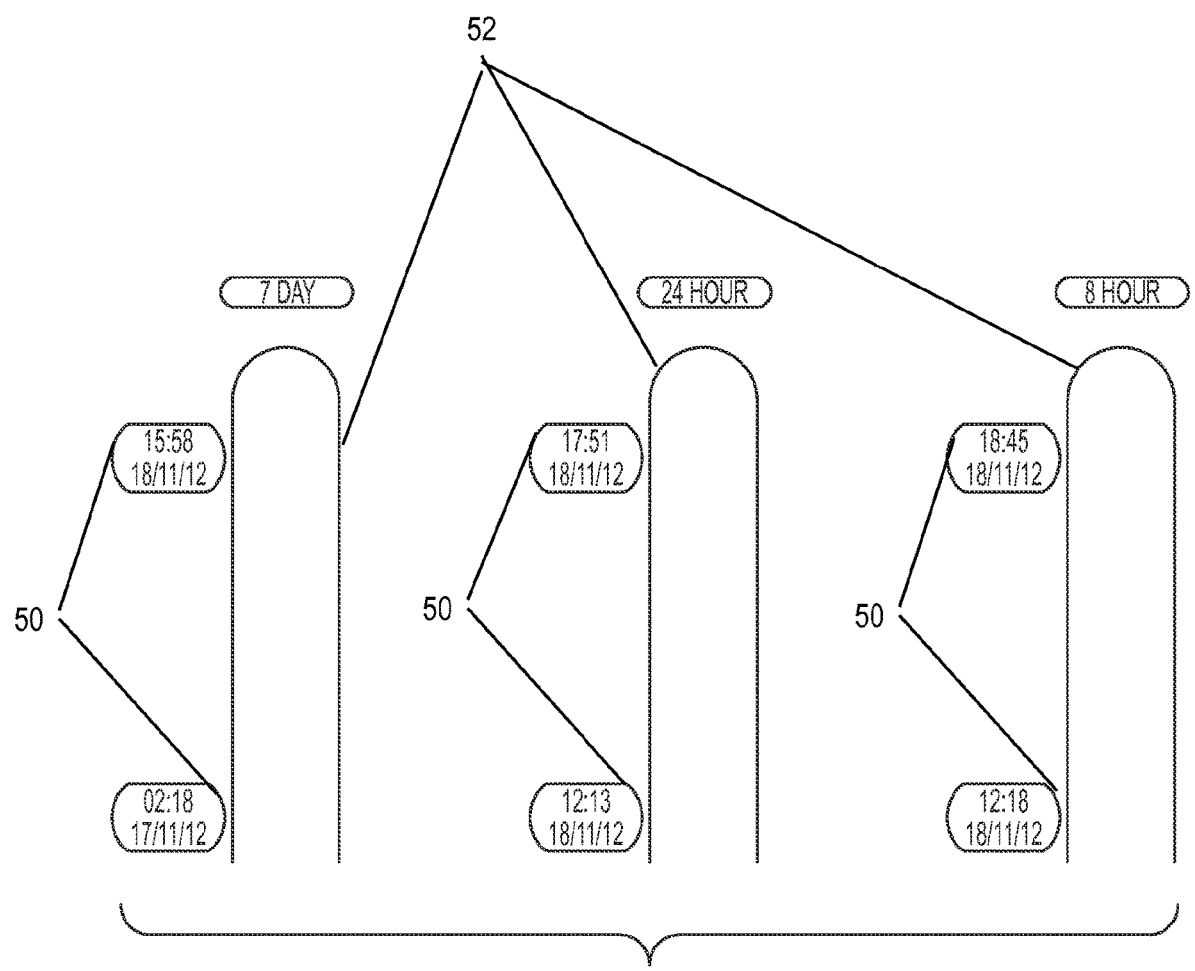
FIG. 37B is a close-up view of the time displays for the chambers of FIG. 37A.

In certain embodiments, the hygiene product buffer device 44 between the disposable hygiene production process 42 and the selective shredding device 10 may be split into a series of chambers 48 comprising anywhere between 1 to 10,000 chambers 48, and configured to allow the recycle stream to travel through the hygiene product 12 buffer device at particular speeds that may be correlated to the time of production. A time display 50 may be located next to an open slot 52, which indicates the day/time (or other time display concept) when the recycle product was made, as illustrated in FIGS. 37A and 37B. The throughput speeds in the hygiene product buffer device 44 could be adjusted, either manually or automatically, to allow a different time inventory of products to be stored. A typical scenario may be to store hygiene products 12 in one chamber 48 that had been produced during the last shift, another chamber 48 could be used to store hygiene products 12 produced over the last 24 hours, another chamber 48 could be used to store hygiene products 12 produced over the last week, but this could be ultimately adjusted to even keep an inventory of hygiene products 12 made over the past year and can essentially be set up to the configuration desired by the equipment user. In certain embodiments, hygiene products 12 may feed into the hygiene product buffer device 44 from more than one location, and an electronic device may be configured to determine from which location the hygiene products 12 entered the hygiene product buffer device 44 based on an inventory level of the hygiene product buffer device 44.

All chambers 48 could not be used for timed inventory storage as reject levels are not consistent, so a typical scenario may be where two or more chambers 48 are used for continuous throughput chambers 48, where overflow products that were not allocated to any of the timed inventory storage chambers 48 (according to their inventory specification) were placed in the continuous throughput chambers 48. Further additions to this process may be to assign a particular buffer to a particular failure mode on the production system. If the main production process has, for instance, a new process feature installed on typical production equipment available today, during the start up and commissioning phases, all scrap hygiene products 12 are fed into a common waste stream.

The concept of multiple buffers outlined in the present description allows hygiene products 12 to be rejected and assigned to a dedicated buffer according to the reject classification. Say, for example, a new non-woven printing process was installed and from which a visual inspection system installed is rejecting products in accordance with this defined failure mode, with all of these products available for support teams to analysis, a far superior level of information can be made available to assist data analysis and fault finding tasks.

Further embodiments to the multiple chamber 48 storage capability is that if modifications are carried out to the production process for process improvements, or to the hygiene product 12, say to upgrade the product specification, i.e., run product making trials, then having an increased buffer capacity during that period may be beneficial to the project team. In such scenarios, the existing inventory stored in the hygiene product 12 buffer device during daily production could be automatically emptied through the slight increase in pulp/SAP re-feed rates prior to installation or modification of the existing process, allowing a larger storage capacity, say 3000-5000 products to be stored in the hygiene product 12 buffer device, which may further range between 1 to 100,000 products in single or multiple chambers 48 within the hygiene product 12 buffer device. Once the process or product making trials were finished and no further inventory storage was required, the original production settings of the storage buffer could be restored.

Figure 39:
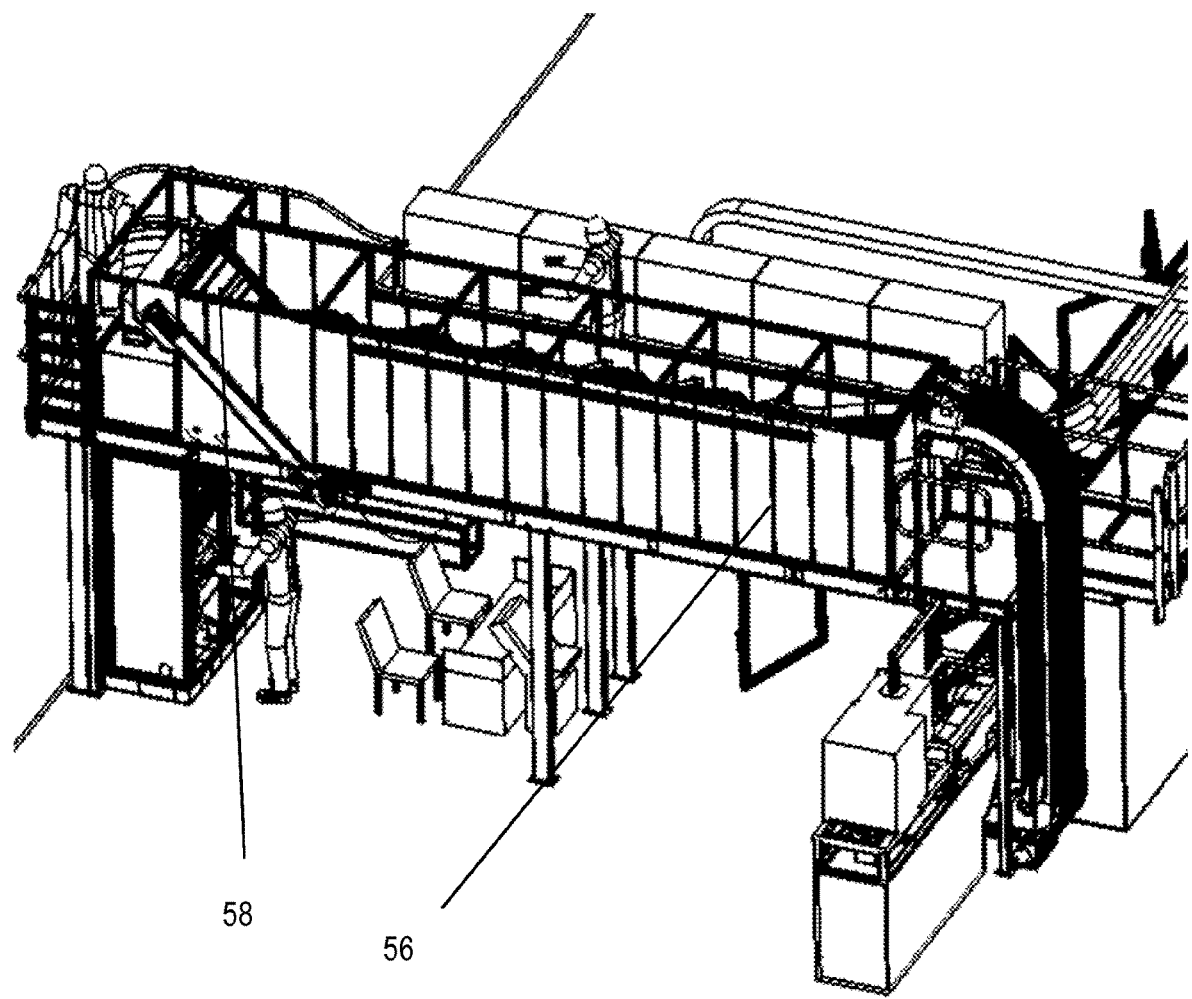
FIG. 39 is a perspective view of a hygiene product buffer device located above a selective shredding device with a floor conveyor, according to certain embodiments of the present invention.

Further embodiments of the invention include fully separating the hygiene product buffer device 44 from the subsequent processing stages. Separating the hygiene product buffer device 44 from the actual separation/recycling process allows for a reduced floor space allocation as the hygiene product buffer device 44 could be located on top of the disposable hygiene production process 42 or in another location of convenience. In such embodiments, a multi stage hygiene product buffer device 44 may be installed. In other embodiments, however, a single stage hygiene product buffer device 44 may have the potential to hold a larger storage volume. In these embodiments, as illustrated in FIG. 39, the hygiene product buffer device 44 is located above the selective shredding device 10, which has a floor conveyor 56 to move product to the out-feed area. A cleat conveyor 58 may be mounted at the outlet of the hygiene product buffer device 44 onto which the floor conveyor 56 transports the hygiene products 12. To allow the volume of the hygiene product buffer device 44 to be efficiently used and to ensure FIFO (first in first out) principles are used, the in feed conveyor may drop products into multiple locations within the hygiene product buffer device 44.

Figure 40:
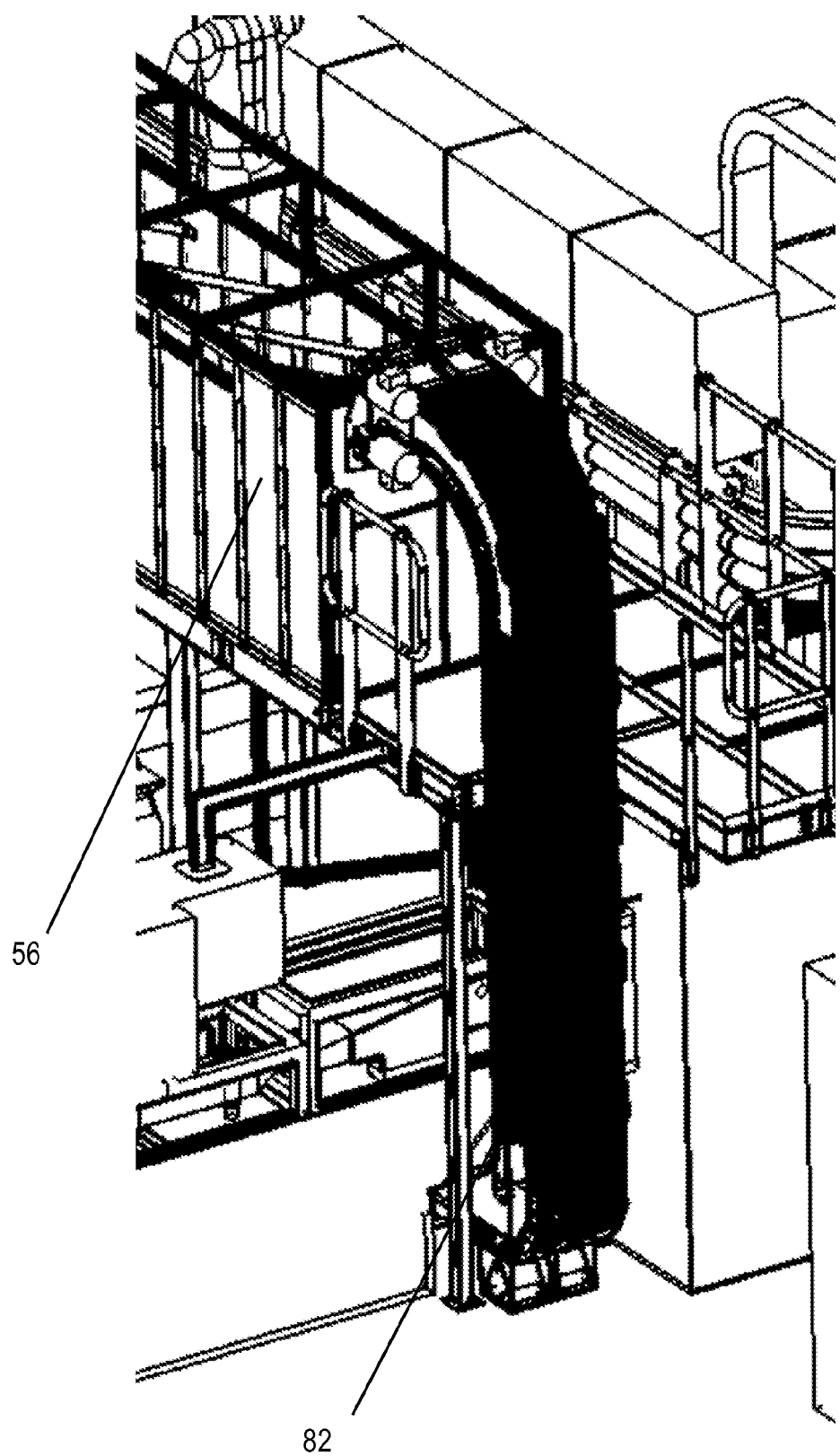
FIG. 40 is a perspective view of a single hygiene product buffer device being used with additional conveyors, according to certain embodiments of the present invention.

In embodiments where a large single hygiene product buffer device 44 is used, the capability to have a timed inventory of products is not as prevalent. As such, in embodiments where a single hygiene product buffer device 44 is used, one or more additional conveyors 82 may be installed that would house a timed inventory of products, as shown in FIG. 40.

Figure 41:
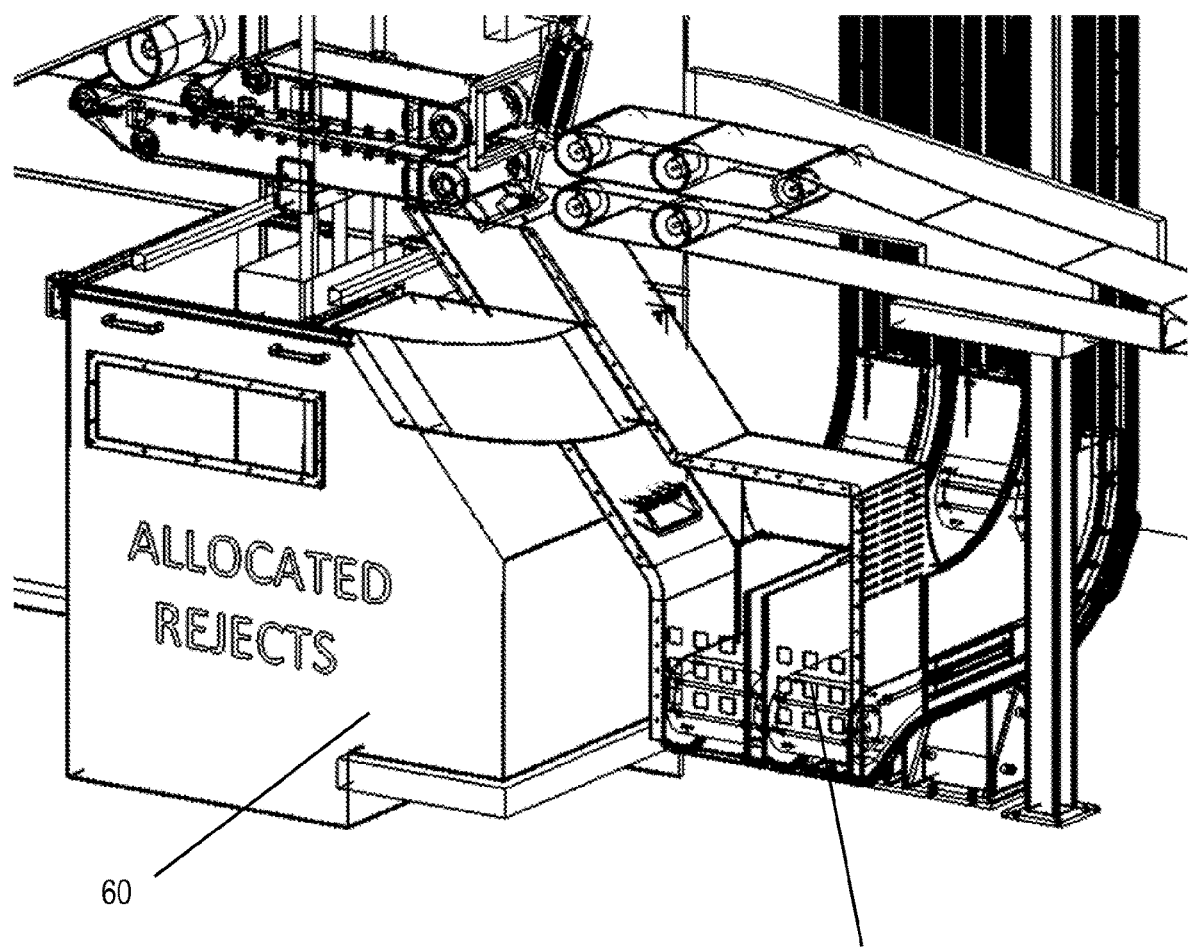
FIG. 41 is a perspective view of a single hygiene product buffer device being used with a hygiene product reject device, according to certain embodiments of the present invention.

FIG. 41 illustrates additional embodiments of the single buffer concept, wherein a smaller hygiene product buffer device 44 is located closer to a hygiene product reject device 60 where rejected hygiene products 12 in accordance with a defined failure mode may be sent to this area, making all of these hygiene products 12 available for support teams to analyze. As a result, a superior level of information may be achieved to assist with data analysis and fault finding tasks. The system may then either reject into A (this storage device), or B (into the main transport conveyor), or C (into the timed inventory buffer conveyor). A further location D may also be installed, where machine operators wishing to gather a single product are able to remove a reject from the system.

Figure 33:
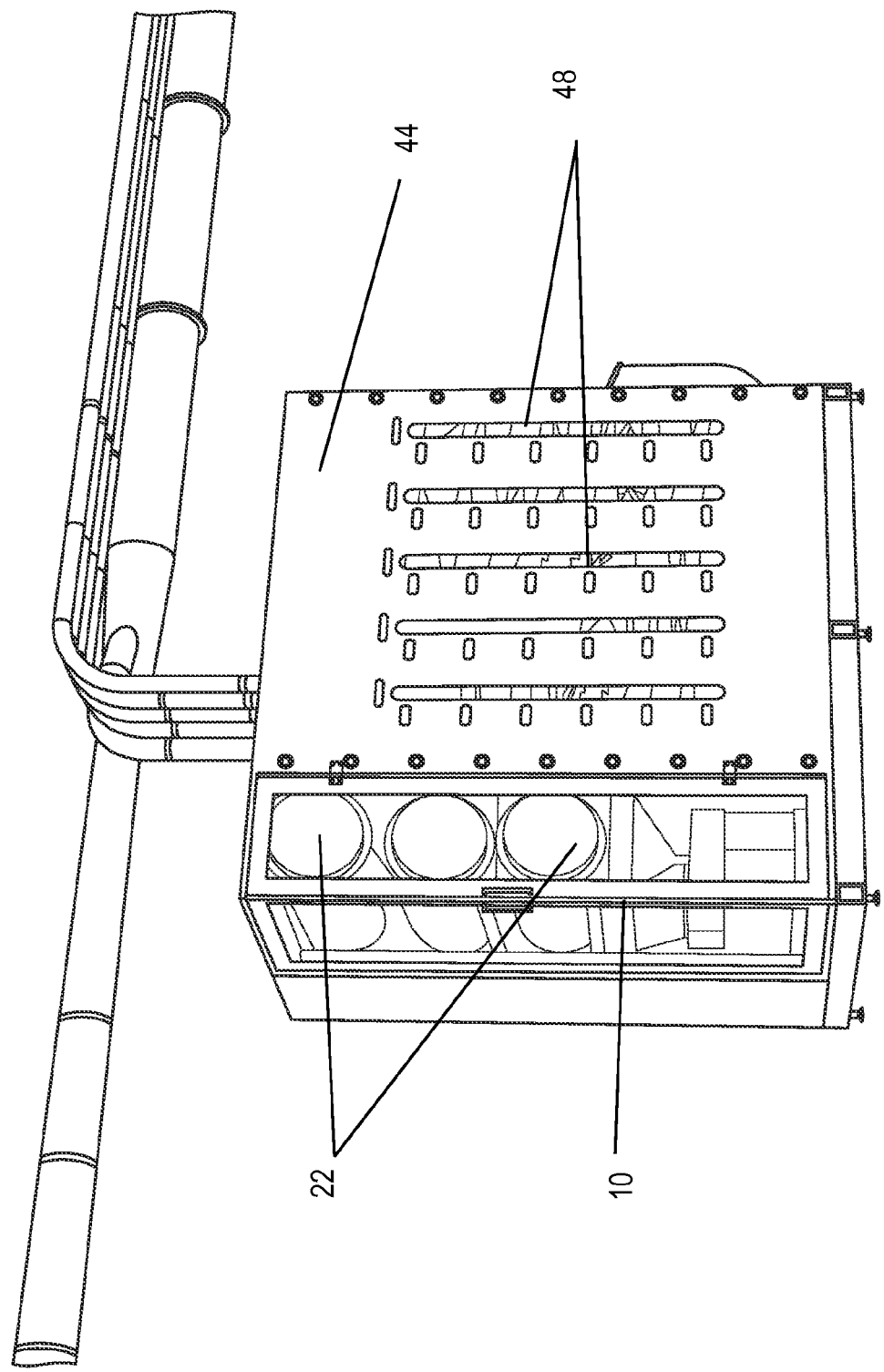
FIG. 33 is a perspective view of an in-line selective shredding device and a hygiene product buffer device, according to certain embodiments of the present invention.
Figure 34:
FIG. 34 are schematic illustrations of plastic components, according to certain embodiments of the present invention.
Figure 35:
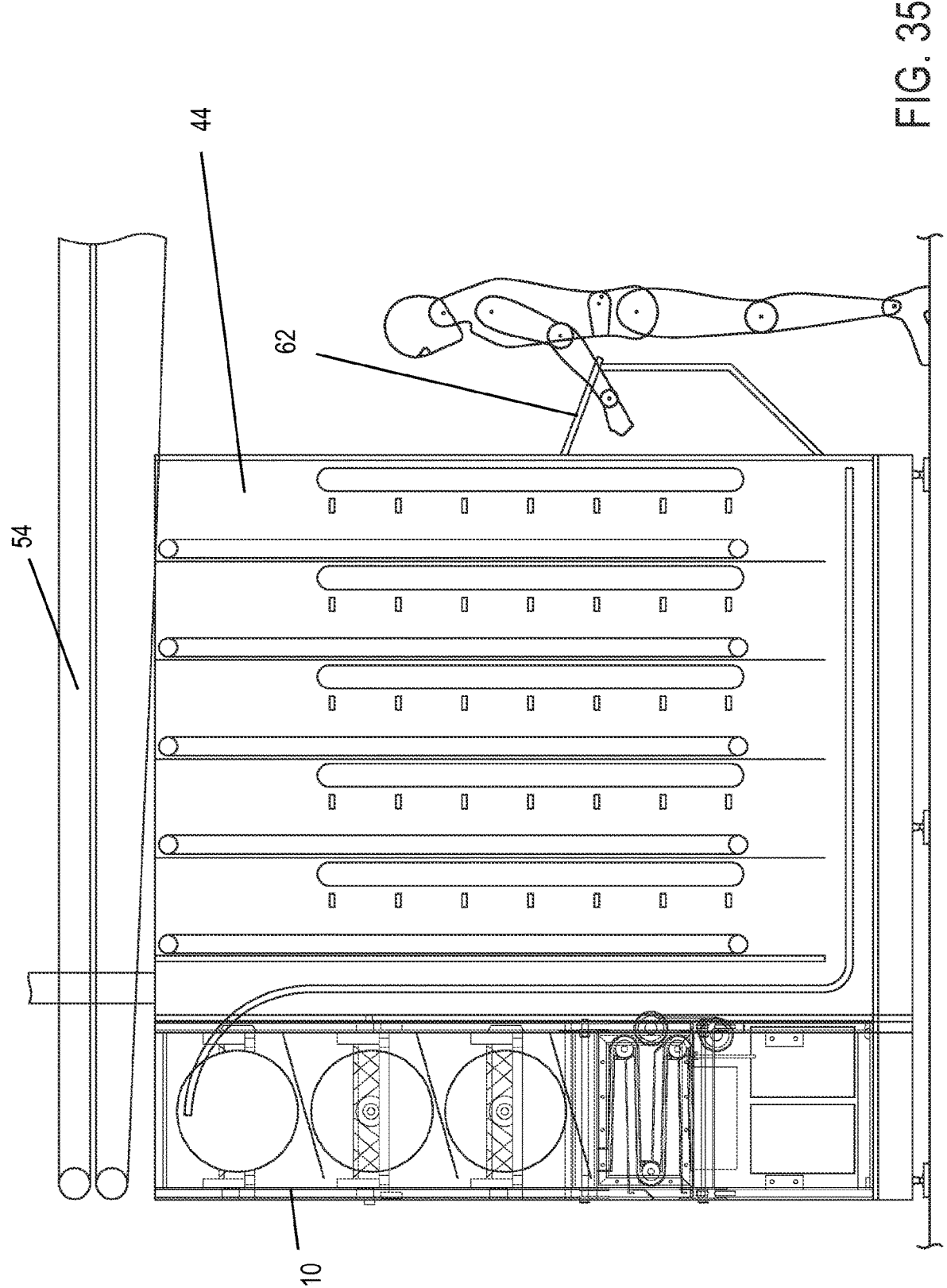
FIG. 35 is a front view of the in-line selective shredding device and the hygiene product buffer device of FIG. 33.
Figure 36:
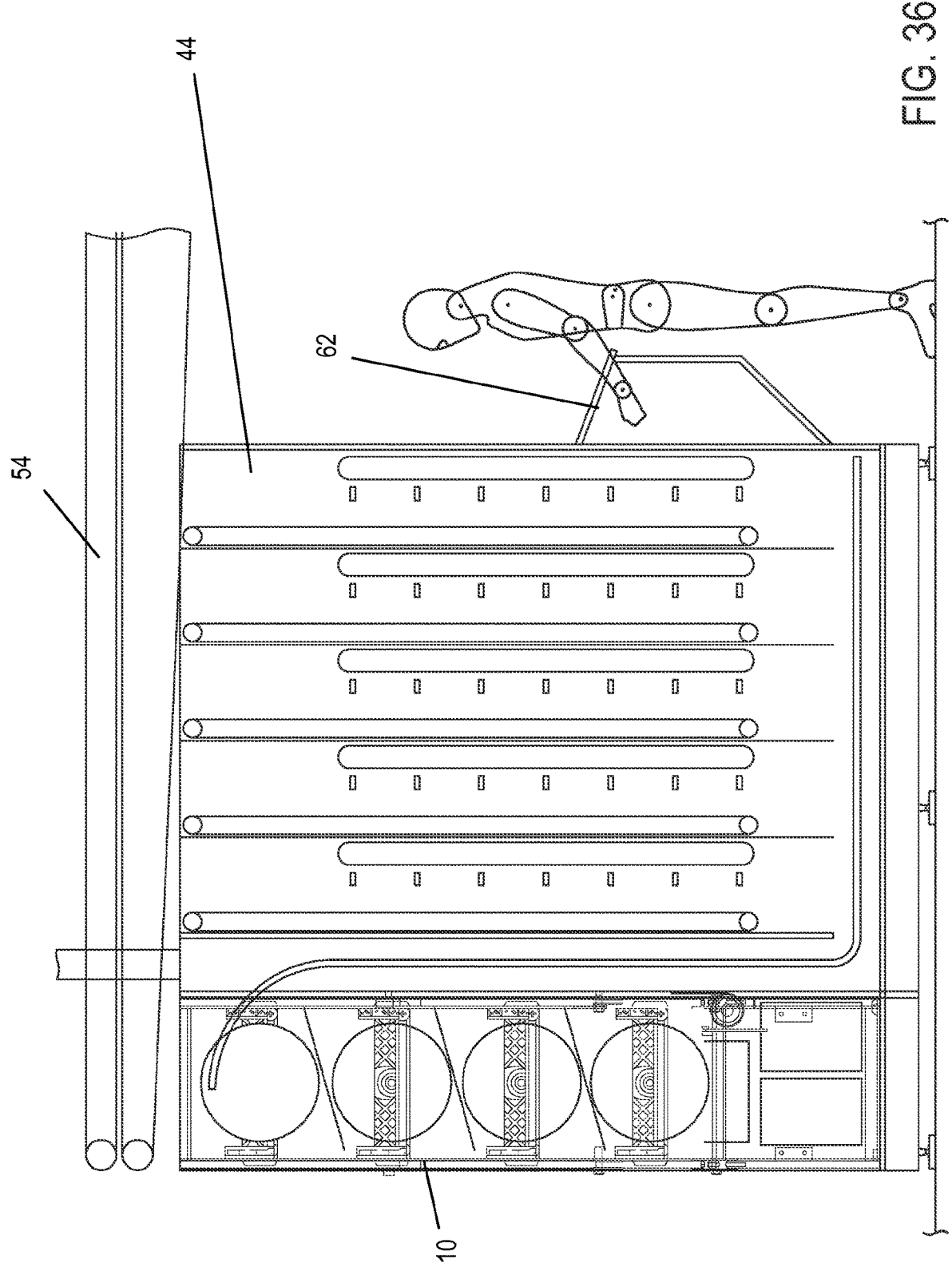
FIG. 36 is a front view of a hygiene product buffer device coupled to a three-stage selective shredding device that includes the centrifugal separation design, according to certain embodiments of the present invention.

FIGS. 33 and 35 illustrate other embodiments of a buffer design, where the hygiene product buffer device 44 is positioned to the side of the selective shredding device 10. FIGS. 33 and 35 illustrate also illustrates the hygiene product buffer device 44 design coupled to a three-stage selective shredding device 10 coupled to a vibration device 30. FIG. 36 illustrates the hygiene product buffer device 44 design coupled to a three-stage selective shredding device 10 that includes the centrifugal separation design. In each design, a box 76 positioned to the left at the base of the selective shredding device 10 separates dust from SAP, which is shown in FIG. 25, and a box 78 to the right at the base of the selective shredding device 10 comprises a vision system 80 and particle removal system to remove any unforeseen particles that may still remain in the pulp stream leaving the selective shredding device 10 (the details of the vision system 80 is shown in detail in FIG. 26).

Figure 25:
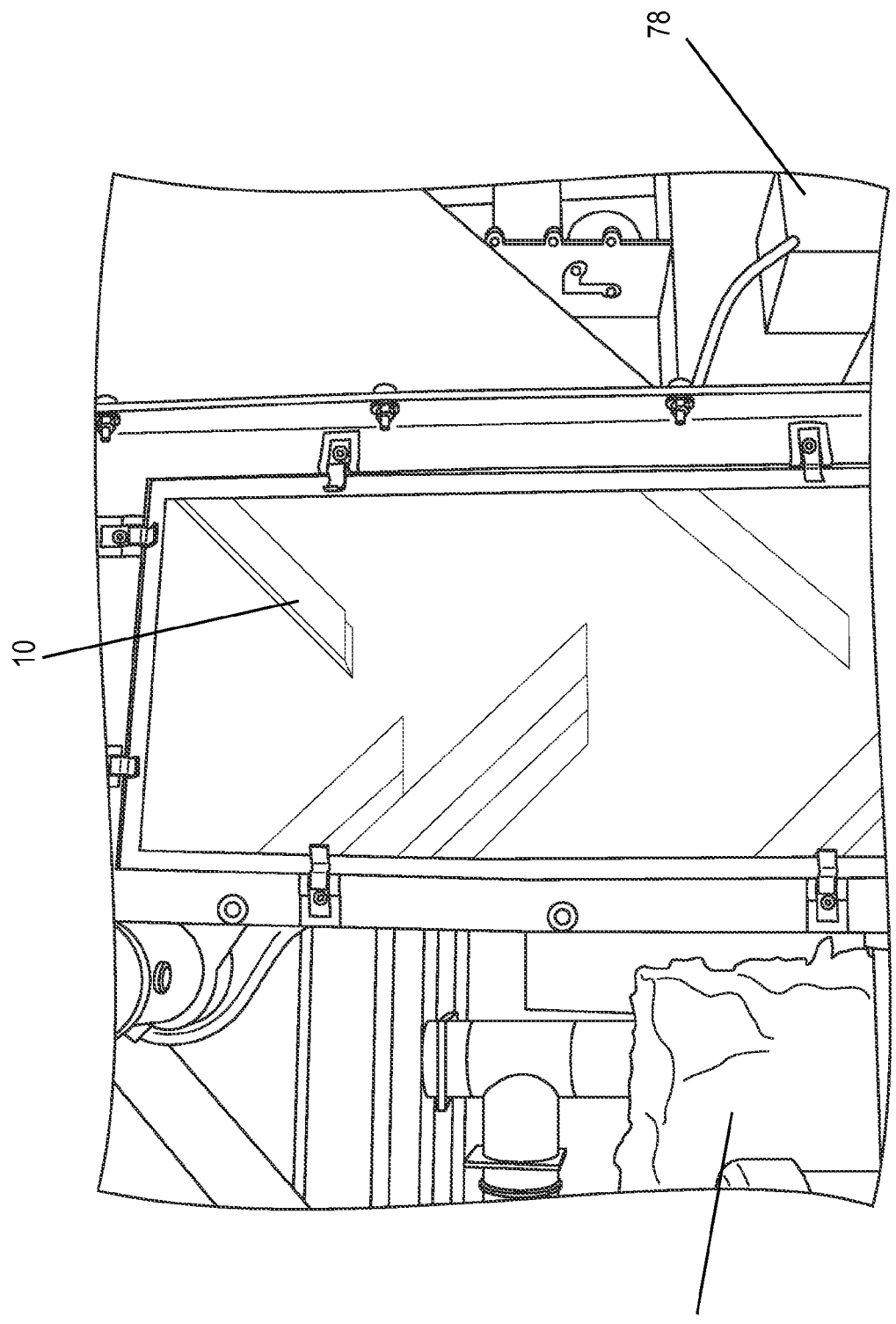
FIG. 25 is a perspective view of a selective shredding device, according to certain embodiments of the present invention.
Figure 26:
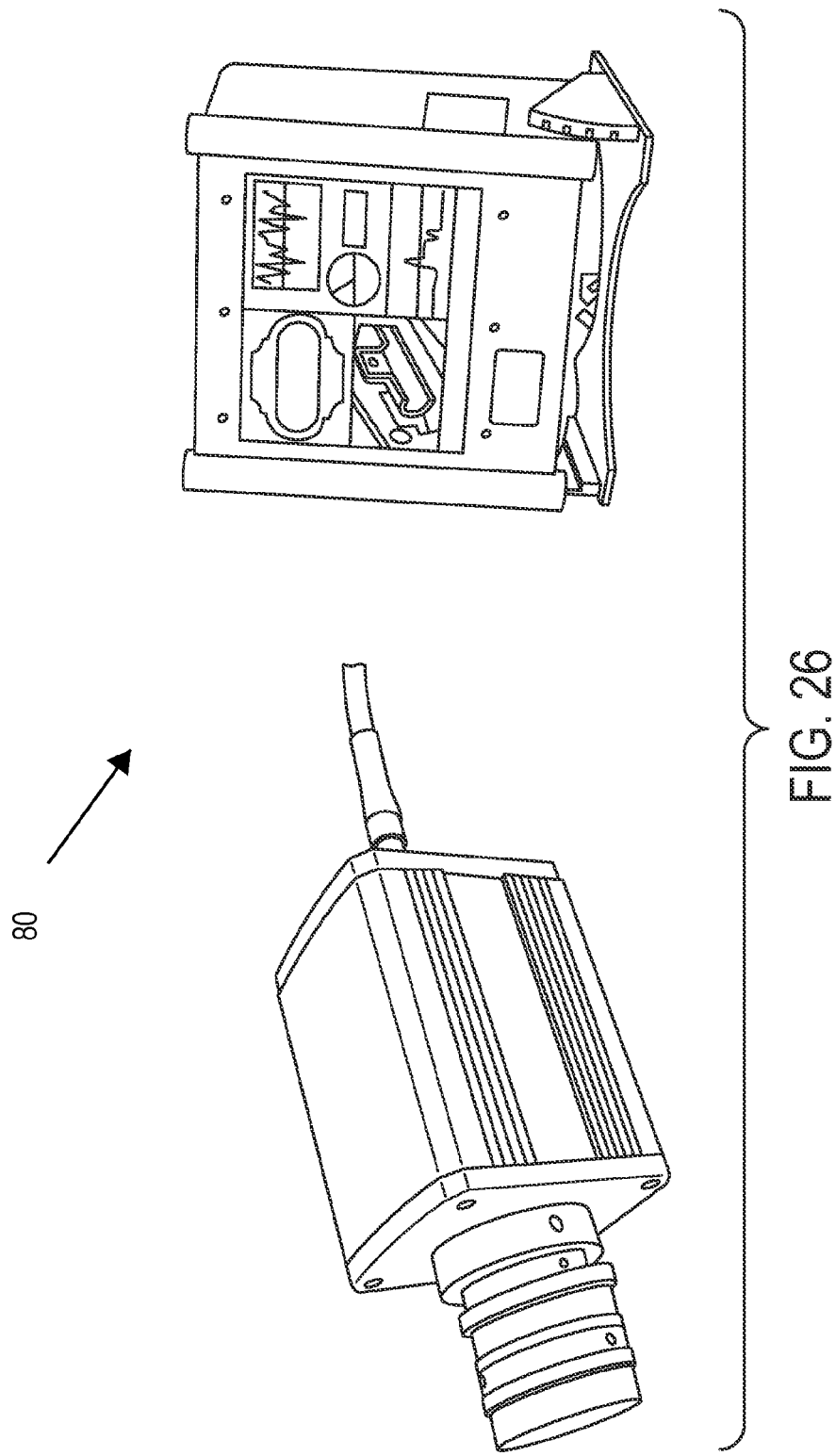
FIG. 26 is a perspective view of a vision system for use in inspecting pulp streams leaving a selective shredding device, according to certain embodiments of the present invention.

The process outlined in FIG. 25 passes air at a pre-defined speed through a falling curtain of SAP and dust material. With the mass of the SAP being larger than the mass of the dust, the air stream is able to remove the finer dust particles from this stream. This process, however, requires vertical space for the process to function adequately as multiple passes through air streams are required. In the scenario outlined in the present description where an in-line process is used, creating sufficient space for such a process will be detrimental to process simplicity and machine operator access. Passing the SAP and dust stream through a revolving device 22, which rotates at an angle of 4 degrees but could range between 0-90 degrees at a speed of 0.95 G but could range between 0.0001 G and 1 G, would allow the materials inside the revolving device 22 to become airborne. By passing air through this revolving device 22 at a defined speed, dust particles would exit the revolving device 22 within the air stream while SAP could exit the revolving device 22 via the apertures 26. Such a revolving device 22 would only require a space of 100-150 mm in height for SAP throughput volumes typical with an in-line process.

In certain embodiments, a hatch 62 with a restricted access may be included for operators to re-feed bagged product into the hygiene product buffer device 44. The bags may include a bar code that may be scanned to track the time of production of the bagged product. The hatch 62 may include a separate divider for bagged products. To keep control of what is put back into the system, the hatch 62 may be protected with a locking system, which only allows specifically allocated people to feed product back into the system, and, any access to the hatch 62 is electronically monitored (person/time etc.). The hatch 62 may be opened with a barcode key, but more preferably a works ID card utilizing RFID technology or similar could also be used.

Figure 24:
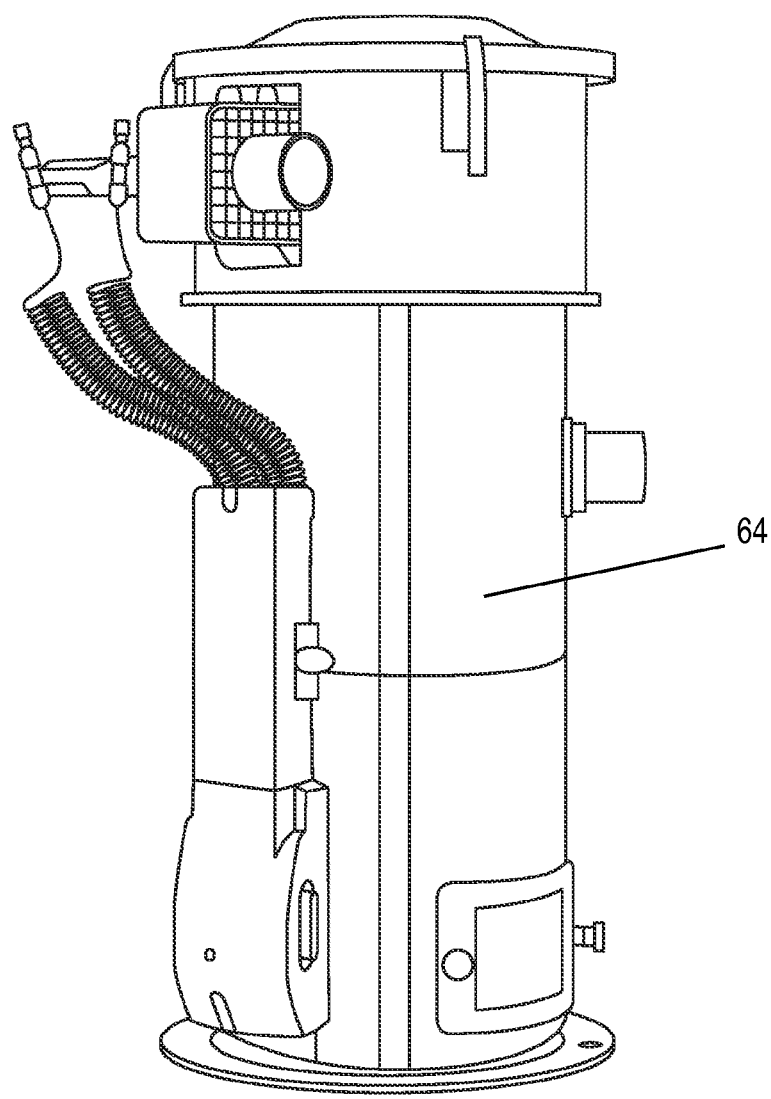
FIG. 24 is a perspective view of an air vacuum device used in the transport of materials, according to certain embodiments of the present invention.

Once all processing is completed, SAP is sent back to the production line SAP in-feed system. A variety of systems could be used to accomplish this, the most typical would be the use of air vacuum device 64 that uses air pressure differentials within a pipe to transport granulate particles, such as SAP. A metal detector could, for instance, be placed in this material stream to ensure no metal contaminants were contained within the material stream. Such as device 64 is shown in FIG. 24.

Once all processing is completed, the pulp is sent back to the production lines' pulp in-feed system. A variety of hygiene product transport devices may be used to accomplish this, the most typical would be the use of the air vacuum device 64 shown in FIG. 24, which uses air pressure differentials within a pipe to transport fibers, such as pulp fibers. The air vacuum device 64 may further comprise one or more vacuum nozzles, wherein each vacuum nozzle is configured to transport between 1-10 hygiene products 12 at any given time.

In certain embodiments, the hygiene product transport device may be connected between a hygiene product reject device 60 and a hygiene product diverting device or between the hygiene product diverting device and a hygiene product buffer device 44 or between the hygiene product buffer device 44 and the in-line selective shredding device 10. The hygiene product 12 transport device can transport between 1 and 1,000,000 hygiene products 12 per hour. The hygiene product transport device may further comprise 1 or more conveyor systems and/or 1 or more conveyor links.

Figure 27:
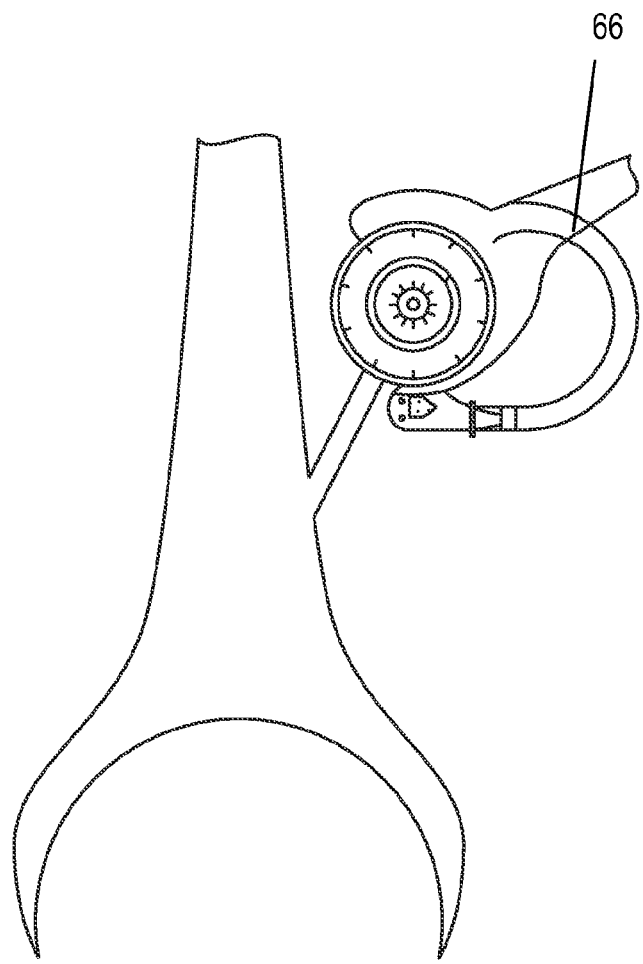
FIG. 27 is a side view of a secondary laydown process, according to certain embodiments of the present invention.

The hygiene product transport device may be connected to the hygiene product buffer device 44, but is typically be connected directly to the core forming process, either being fed directly into a hammer mill, or directly after the hammer mill, or in the ducting between core laydown and hammer mill, or on the core laydown drum. To ensure pressure differentials are not lost, a fan may be placed in the ductwork. This fan would ensure that the core forming laydown process is not affected, and, also ensure that fibers are fully open prior to re-entry back into the core forming process. To ensure a constant volume of pulp is fed into the core forming process, a secondary laydown process 66 may be used, either linear or circular, which would store fibers in a reserve tower in an overfed scenario, then scarf and return fibers to ensure volumetric fiber throughput after the scarfing process is constant. In certain embodiments, the pulp fiber stream is connected to a volumetric metering device, wherein an output of the volumetric metering device is re-processed back into the core forming process. To ensure pulp levels in the hygiene product 12 were according to product specifications, the system may send a signal to a hammer mill pulp in-feed roll drive to change an in-feed speed in relation to an amount of re-claim pulp being reprocessed back into the core forming process so that the virgin pulp in-feed speed automatically adjusts according to re-processed pulp in-feed volumes. Such a process 66 is shown in FIG. 27. Further embodiments to this process could include a metal detector, which could be placed in this material stream to ensure no metal contaminants were contained within the material stream.

Typically, common reclaim systems are centrally located and mean that hygiene products 12 would be collected in a central location, separated, and SAP/pulp fed back to a small number of hygiene product conveyors and, as such pulp/SAP re-feed rates could be very high, and typically would be in the 15%-20% range, with 80% to 85% being virgin materials. In certain embodiments, during normal running mode, a percentage of pulp re-feed is similar to a percentage of scrap produced, and wherein during periods of production issues, the percentage of pulp re-feed is increased up to 100% and re-applied at lower thread-up speeds. With the in-line selective shredding process described in the present description, as pulp and SAP streams are fed back to the original convertor, re-feed amounts are very low. A converter producing 1% scrap would therefore only have a 1% re-feed amount. Not only does this allow product formula cars to be standardized across all production systems, the smaller amount of re-feed materials can more easily be diverted to a specific point in the hygiene product 12.

Plastic particles being removed from the process would typically transported using air to a central location that is connected to a pelletizer, baler, former, or pyrolysis process, where the particles may be baled, formed into logs/bricks/pellets, or converted back into oil using a variety or chemical processes such as pyrolysis.

Figure 38:
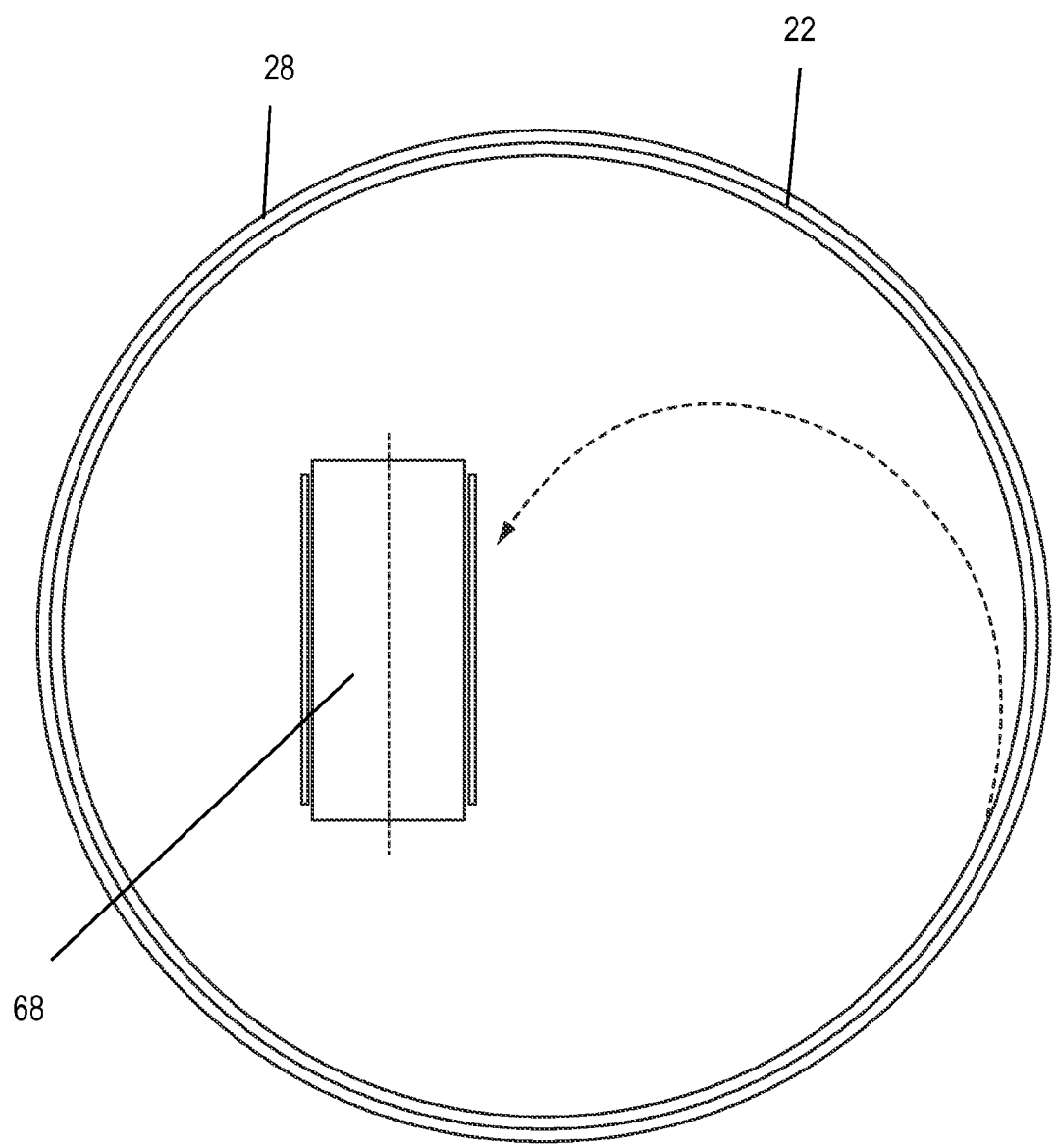
FIG. 38 is a schematic illustration of a trajectory path of plastic stream component being thrown onto an electrostatically charged conveyor by a rotation of a revolving device, according to certain embodiments of the present invention.

Plastic particles being taken from the process, in certain applications, particularly where feminine hygiene pads are being recycled, may include silicon release paper. Should silicon release paper be included in the plastic return flow, then the subsequent value of the plastic return may be reduced, and environment impact may be more severe. To solve this problem, a revolving drum (Outlined in FIG. 38) is used to throw plastic stream components onto an electrostatically charged conveyor 68. As the plastic components 20 have different electrostatic properties compared to the silicon release paper, components with the lowest adhesion force will fall from the conveyor 68. Such as device may be located in the on-line selective shredding and sieving process, but would be most likely located at the central receiving area.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this description. Accordingly, the present invention is not limited to the embodiments described above or depicted in the drawings, and various embodiments and modifications may be made without departing from the scope of the claims below.

That which is claimed is:

1. A multistage shredding and sieving system comprising an apparatus for shredding hygiene products, said hygiene products comprising plastic, pulp and superabsorbent polymer (SAP), wherein said apparatus comprises more than one revolving device, and two or more opposing rotating shafts, wherein 1 to 100,000 fingers are attached to the said two or more opposing rotating shafts that rotate at equal or differential speeds, wherein the fingers are configured to damage the hygiene products without using a shear cut or crimp cut process, wherein each of said revolving devices forms a stage of said multistage system, and each of said revolving devices has a structure comprising a plurality of apertures, wherein a diameter of each aperture ranges from 1 to 1,000,000,000 microns, and said apertures being configured in size and shape to allow pieces or components or sub-assemblies of said hygiene products to pass through said apertures, wherein the diameter of apertures of a revolving device is progressively reduced within subsequent stages of the system, thereby separating pulled and/or torn apart plastic, pulp and SAP components of said hygiene products.

2. The multistage system of claim 1, wherein the revolving device exerts a force between 0.05-0.998 G on an inner surface of said revolving device or between 0.05-0.998 G on any surfaces within the revolving device.

3. The multistage system of claim 1, where a rotational axis of each of said revolving devices is positioned in a non-horizontal axis at an angle to a horizontal axis to allow one or more hygiene products or pieces of hygiene products to be transported along the rotational axis of each of said revolving devices.

4. The multistage system of claim 3, wherein the angle of the revolving device and/or an angle of a shredding device within the revolving device is adjustable relative to a plane of a floor and are adjustable to control throughput speeds of the hygiene products or pieces of the hygiene products within the revolving device.

5. The multistage system of claim 3, wherein the angle of the revolving device and/or the angle of the shredding device within the revolving device are adjusted according to throughput of a hygiene product production process.

6. A multistage system of claim 1, wherein said more than one revolving devices comprise said two or more rotating shafts on which an impeller, or T hammer, or flat hammer, or flying knife, are attached, wherein the number of impellers, or T hammers, or flat hammers, or flying knives ranges between 1 to 10,000.

7. A multistage system of claim 1, connected directly to a hygiene product production process.

8. The multistage system of claim 7, wherein a hygiene product buffer device is located between an in-line selective shredding device and the hygiene product production process.

9. The multistage system of claim 7, wherein a pulp fiber stream is connected to a reserve tower.

10. A multistage system of claim 1, wherein the revolving device is a revolving cylinder having a diameter between 1 mm-10,000 mm, wherein the revolving cylinder rotates around an axis oriented between +4 degrees to −4 degrees relative to a horizontal axis and between +90 degrees to −90 degrees at a rotational speed, wherein rotation of the revolving cylinder creates a force between 0.000 IG and IG on an inner surface of the revolving cylinder, wherein an air stream passes through the revolving cylinder between 0.0001 meters per second up to 10,000 meters per second, wherein a stream of SAP and dust particles are passed into the revolving cylinder and the dust particles are removed from the revolving cylinder via the air stream passing through the revolving cylinder.

* * * * *